US008639464B2

(12) United States Patent
Artiuch et al.

(10) Patent No.: US 8,639,464 B2
(45) Date of Patent: Jan. 28, 2014

(54) FLOW METER DIAGNOSTIC PROCESSING

(75) Inventors: Roman Leon Artiuch, Houston, TX (US); Paul Stephen Hooks, Halstead (GB)

(73) Assignee: Dresser, Inc., Addison, TX (US)

( * ) Notice: Subject to any disclaimer, the term of this patent is extended or adjusted under 35 U.S.C. 154(b) by 705 days.

(21) Appl. No.: 12/347,860

(22) Filed: Dec. 31, 2008

(65) Prior Publication Data
US 2009/0187356 A1    Jul. 23, 2009

Related U.S. Application Data

(60) Provisional application No. 61/022,025, filed on Jan. 18, 2008.

(51) Int. Cl.
*G01F 1/12*    (2006.01)

(52) U.S. Cl.
USPC ............ 702/100; 702/45; 702/54; 702/85; 702/127

(58) Field of Classification Search
USPC ................ 702/100, 45–54, 85, 127
See application file for complete search history.

(56) References Cited

U.S. PATENT DOCUMENTS

| | | | |
|---|---|---|---|
| 3,795,131 | A | 3/1974 | Wade et al. |
| 5,072,416 | A | 12/1991 | Francisco et al. |
| 5,656,784 | A | 8/1997 | Butch |
| 5,700,950 | A | 12/1997 | Woollums et al. |
| 6,505,134 | B2 | 1/2003 | Poleshuk et al. |
| 6,654,697 | B1 | 11/2003 | Eryurek et al. |
| 6,678,624 | B2 | 1/2004 | Normen |
| 6,681,189 | B1 | 1/2004 | Morrison et al. |
| 6,813,588 | B1 | 11/2004 | Daugert et al. |
| 6,886,414 | B2 | 5/2005 | Gutierrez et al. |
| 7,212,953 | B1 | 5/2007 | Artiuch |
| 7,295,934 | B2 | 11/2007 | Hairston |

(Continued)

FOREIGN PATENT DOCUMENTS

| | | |
|---|---|---|
| AU | 1262876 | 10/1977 |
| CN | 1346435 | 4/2002 |

(Continued)

OTHER PUBLICATIONS

European Search Report, Application No. 09150775.6, mailed Jun. 4, 2009, 5 pages.
"Testing Large-Capacity Rotary Gas Meters," by Bean, et al, Research Paper RP1741, vol. 37, Sep. 1946.

(Continued)

*Primary Examiner* — Sujoy Kundu
*Assistant Examiner* — Elias Desta
(74) *Attorney, Agent, or Firm* — Hiscock & Barclay LLP

(57) ABSTRACT

Apparatus and associated systems and methods relate to automated learning of a baseline differential pressure (dP) characteristic to monitor the performance of a field-installed gas flow meter by comparing on-line dP measurements to the learned baseline dP characteristic. In an exemplary embodiment, a first baseline dP characteristic may be learned in a first mode over a first predetermined period of time according to a first set of learning criteria, and a second baseline dP characteristic may be learned in a second mode over a second predetermined period of time according to a second set of learning criteria. The first period of time may be substantially shorter than the second period of time. The first set of criteria may be substantially more relaxed than the second set of criteria. During the second mode, meter performance degradation may be diagnosed by comparing measured dP against the first baseline dP characteristic.

17 Claims, 29 Drawing Sheets

(56) References Cited

U.S. PATENT DOCUMENTS

| | | |
|---|---|---|
| 7,458,280 B2 | 12/2008 | Wehrs et al. |
| 2004/0249583 A1 | 12/2004 | Eryurek et al. |
| 2005/0273278 A1* | 12/2005 | Sprague .................. 702/45 |
| 2006/0036404 A1 | 2/2006 | Wiklund et al. |
| 2007/0192046 A1* | 8/2007 | Hairston .................. 702/45 |
| 2008/0215259 A1 | 9/2008 | Hairston |
| 2008/0221822 A1 | 9/2008 | Laverdiere et al. |

FOREIGN PATENT DOCUMENTS

| | | |
|---|---|---|
| EP | 1 821 082 | 8/2007 |
| GB | 1211931 | 11/1970 |
| GB | 2392501 | 3/2004 |
| WO | WO2006/020870 | 2/2006 |

OTHER PUBLICATIONS

"Differential Testing of Rotary Gas Meters" by R. B. Crawford dated May 8, 1968 presented to the American Gas Association Distribution Conference.

"Rotary-Type Gas Displacement Meters," ANSI B109.3 approved Apr. 13, 2000.

"Differential Testing of ROOTS® Rotary Meters," RM-90, published Sep. 1998.

IM 5700.3 RPM Series Rotary Meter, American Meter Company.

U.S. Appl. No. 11/734,646, filed Apr. 12, 2007, Non-final Office Action mailed Dec. 23, 2008, 11 pages.

European Application No. 07102304.8, European Search Report, dated Jun. 4, 2009, 9 pages.

Chinese Office Action for CN Application No. 200910002839.8; dated Mar. 8, 2013; Applicant Dresser, Inc. 19 pages.

* cited by examiner

| Legend | |
|---|---|
| ——— Predetermined dP Characteristic | * FIGS. 6A-B assume any other parameters used to calculate dP (e.g., temp., pressure, specific gravity) are constant |
| —··—··— Learned dP Characteristic | |
| ———— Predetermined dP Characteristic Threshold | |
| ·········· Learned dP Characteristic Threshold | |

FLOW METER DIAGNOSTIC PROCESSING

CROSS-REFERENCE TO RELATED APPLICATIONS

This application claims priority under 35 U.S.C. §119(e) to U.S. Provisional Patent Application entitled "Flow Meter Diagnostic Processing," Ser. No. 61/022,025, to Artiuch, et al, and filed on Jan. 18, 2008. This application is related to the U.S. Patent Application entitled "Flow Meter Differential Pressure Monitoring," Ser. No. 11/870,758, to Hairston, and filed on Oct. 11, 2007, which is a continuation of U.S. Patent Application entitled "Flow Meter Performance Monitoring System," Ser. No. 11/355,148, to Hairston, and filed on Feb. 15, 2006, now U.S. Pat. No. 7,295,934, the entire contents of both of which are hereby incorporated by reference.

TECHNICAL FIELD

Various embodiments may relate generally to diagnostic apparatus and methods for testing gas volume flow meters.

BACKGROUND

Gasses, such as natural gas, may be transported, distributed, and/or sold to customers through a system of transmission and distribution lines. For purposes such as billing and inventory control, for example, gas metering systems may be installed at various locations along these gas lines. Gas metering systems may measure the volume of gas that flows through a particular gas line. Some gas metering systems include a gas meter and an electronic or mechanical volume corrector.

One type of gas meter is a rotary gas meter. In some rotary gas meters, gas flowing through the meter causes a set of impellers to rotate within a cylinder. This type of meter is normally referred to as a rotary positive displacement meter. As the impellers turn, they measure a displaced volume of gas that is fixed and determined by the area between the impeller and cylinder. Each impeller rotation indicates that a certain volume of gas has flowed through the meter. This is normally referred to as "actual" volume as measured by the primary flow element that is in this case a rotary positive displacement meter. Buying and selling of natural gas typically requires that the actual volume be converted to "standard" volume to account for the contraction or expansion of gas due to varying gas pressure and gas temperature. In general, these effects may be described by Boyle's and Charles' Law. To convert actual volume to standard volume, some gas metering systems use an electronic volume corrector to correct actual volume measurement originating from the rotating impellers to account for temperature or pressure of the gas in the meter.

In general, the performance of a meter is unlikely to improve over time, as bearings in the gas meter become worn or contaminated, for example. As bearing friction increases, for example, volume measurement accuracy of a rotary flow type meter may decrease as gas leaks around the impellers. To monitor the meter performance, performance standards for a particular meter may be identified when the meter is installed, for example. Over the life of the meter, the meter's performance may be compared to the initial standard.

One performance standard involves differential pressure (dP) across the meter. dP measurements may be periodically taken to check for possible degradation in meter performance after installation. In some jurisdictions, additional dP tests may be performed at scheduled intervals (e.g., 3-5 years) by personnel who bring a portable manometer into the field to test the meter and compare the results to the baseline performance characteristic. Although dP testing does not measure meter accuracy, such testing may indicate the operational condition of the meter without using a large and heavy transfer prover. dP testing may be performed on meters in the field by an operator who applies a portable manometer to the meter. To protect the manometer from pressure transients when making a differential pressure measurement, the operator may open and close a number of valves in a sequence of steps.

A baseline dP performance characteristic may be made before installation, such as at a meter factory, in a meter shop environment, or in the field. In the field, a baseline dP performance characteristic may be generated during the installation/commissioning process by an installer who plots a point on a chart to indicate a measured differential pressure at a flow rate. The baseline dP performance characteristic may be recalled for comparison if future tests are performed.

SUMMARY

Apparatus and associated systems and methods relate to automated learning of a baseline differential pressure (dP) characteristic to monitor the performance of a field-installed gas flow meter by comparing on-line dP measurements to the learned baseline dP characteristic. In an exemplary embodiment, a first baseline dP characteristic may be learned in a first mode over a first predetermined period of time according to a first set of learning criteria, and a second baseline dP characteristic may be learned in a second mode over a second predetermined period of time according to a second set of learning criteria. The first period of time may be substantially shorter than the second period of time. The first set of criteria may be substantially more relaxed than the second set of criteria. During the second mode, meter performance degradation may be diagnosed by comparing measured dP against the first baseline dP characteristic.

In some implementations, measured dP may be compared against a predetermined or learned baseline dP characteristic to determine if the measured dP exceeds a threshold value above a baseline dP characteristic. If the threshold is exceeded, then the system may automatically generate an electronic signal to request repair or replacement of the meter. After installation, some embodiments collect dP data over time and/or over a range of flow rates to automatically learn a baseline dP characteristic under installation conditions.

In some examples, substantially continuous monitoring of measured dP may be used to update the first baseline dP characteristic during at least a portion of the second mode. While being updated, the first baseline dP characteristic may be compared against the measured dP to determine if the measured dP exceeds a threshold value above the first baseline dP characteristic. In some examples, once a threshold number of measurements have been used to learn the first baseline dP characteristic, meter performance degradation may be diagnosed during the first mode by comparing measured dP against the first baseline dP characteristic.

In another aspect, baseline dP characteristics may be divided into characteristic segments. The characteristic segments may be non-overlapping regions of a baseline dP characteristic. Of multiple characteristic segments for a baseline dP characteristic, one segment may correspond to a measured dP based upon various other parameters, including flow rates, line pressures, specific gravities of the fluid flowing through the meter, and/or temperatures. A characteristic segment may be learned during the first mode and/or the second mode. A characteristic segment may be learned independent of the other segments of a baseline dP characteristic. Meter performance degradation may be diagnosed by comparing the measured dP against a segment of the baseline dP characteristic to which it corresponds.

In another exemplary aspect, if the measured dP exceeds a threshold value above a baseline dP characteristic, then the system may automatically generate an electronic signal to be sent to an external element. The electronic signal may be a signal to actuate the external element. In some examples, the external element may be a fluid control element, such as a bypass valve. In some examples, the external element may be an alert element, such as a light source. In some examples, there may be multiple threshold values. Whether the external device is actuated and/or a degree of actuation may depend upon which of the multiple threshold values the measured dP exceeds.

Other embodiments may learn a baseline dP characteristic for installation conditions while the flowing conditions are under manual operator control. A system may switch from a default baseline dP characteristic to a learned baseline dP characteristic, for example, upon achieving a predetermined confidence level. Some embodiments may adjust or further refine the baseline dP characteristic based on line pressure and/or temperature at the time dP of measurement. Some embodiments may further correct volume or flow rate signals for line pressure and/or temperature. Further embodiments provide a passive apparatus to protect a dP sensor against transients in line pressure and/or excess differential pressure across the dP sensor.

A baseline characteristic dP curve may include a set of expected dP values at various parameters, including flow rates, line pressures, specific gravities of the fluid flowing through the meter, and/or temperatures. An exemplary system may monitor dP relative to a baseline dP characteristic curve derived from a factory or meter shop, and then switch over to monitoring dP relative to a learned baseline dP curve developed after installation using a self-characterization procedure. In various embodiments, the self-characterization procedure may be manually controlled using actively controlled flow rates, or automatically generated by making dP measurements over time on uncontrolled flow rates, for example.

In further embodiments, drift or DC offset of a dP transducer may be substantially removed using a procedure that operates upon detection of a substantially zero flow condition. Some embodiments may permit dP measurement and/or baseline dP self-characterization operations to be performed within time, temperature, and/or pressure limits after removing the offset from the dP transducer. For example, after a timer has expired, performance monitoring using dP measurements may be suspended until the DC offset reduction procedure can be performed again.

Some embodiments may provide one or more advantages. For example, embodiments may continuously and automatically monitor the performance of a meter to detect certain failure modes. This may provide earlier and/or less labor intensive identification of a meter accuracy problem, thereby reducing volume measurement errors and some financial transactions (e.g., billing) that rely on the accuracy of the meter over the meter's service life. Some embodiments may integrate measuring, calculating, and diagnostic capabilities with a gas meter to reduce or eliminate the need to transport and attach portable test equipment. Some embodiments may provide for internal recoding of historical or other data, which data may replace paper charts and tables, and may be displayed or otherwise transmitted to communicate the condition of a meter. Some embodiments may automatically learn or self-characterize a performance characteristic during operation, without operator intervention, and without regard to a prevailing gas load. Some embodiments may automatically switch from a factory default performance characteristic to a learned performance characteristic learned in the field, thereby improving the accuracy with which the dP test may be used to detect performance problems.

Further advantages of various embodiments may include protection for a test measuring device from damage against pressure surges, flow constrictions, and/or plugged or leaking hoses or fittings, and without manipulation of valves to measure differential pressure. Embodiments may further automatically compensate for drifting measurement values due to time, temperature, and/or static line pressure. Still further, some embodiments may operate using electrical energy generated by flow-induced rotation of an element in the meter.

Some embodiments may further provide, for example, a capability for a field-installed meter to automatically and rapidly self-characterize a baseline dP characteristic against which measured dP may be compared to determine certain failure modes of the meter during the second mode of baseline dP characteristic learning. Accordingly, some implementations may operate to refine the initial first baseline dP characteristic while performing self-diagnostic monitoring operations.

The details of one or more embodiments are set forth in the accompanying drawings and the description below. Other features, objects, and advantages will be apparent from the description and drawings.

DESCRIPTION OF DRAWINGS

Like reference symbols in the various drawings indicate like elements.

DETAILED DESCRIPTION OF ILLUSTRATIVE EMBODIMENTS

Figure 1:
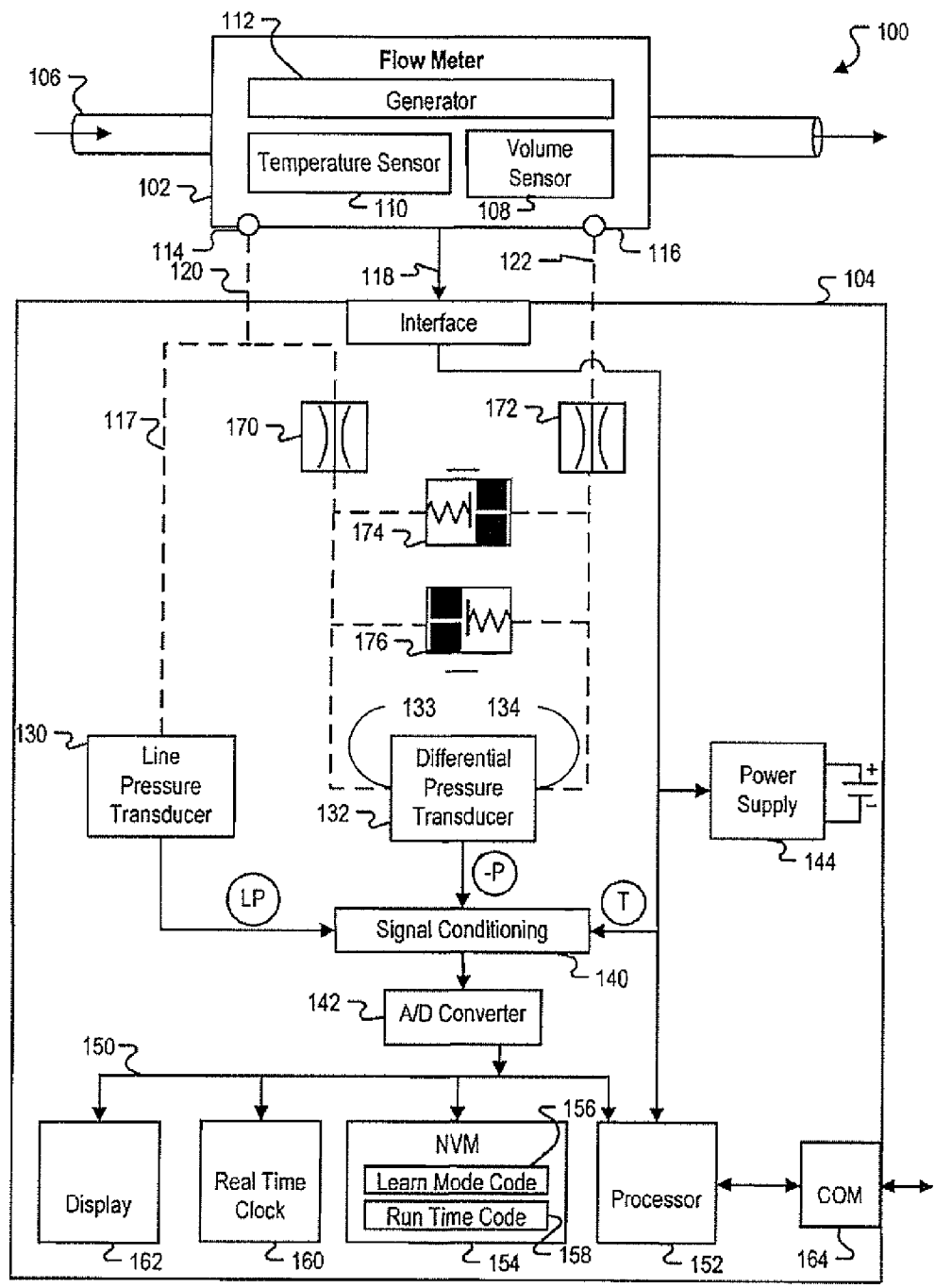
FIG. 1 shows an exemplary flow measurement system used to measure a differential pressure of a volume of gas flow in a gas distribution system.

FIG. 1 shows an exemplary embodiment of a flow measurement system 100 that can measure gas flow through a gas distribution or transmission line. The flow measurement system 100 includes a gas flow meter 102 and a processing system 104. When gas flows through the meter 102, the meter 102 communicates measured parameter information to the processing system 104 using electrical and pneumatic signals. The system 104 may process the signals to measure, among other things, a volume of gas flowing through the meter 102. As gas flows through the meter 102, the processing system 104 can measure a differential pressure (dP) across the meter 102. A measured dP value that is substantially elevated relative to a baseline dP characteristic value may indicate a performance problem, such as contamination or wear of the bearings, that might reduce the gas volume measurement accuracy of the system 100. Examples of a flow measurement system 100 are described at least with reference to FIG. 1 in a U.S. Patent Application assigned to the same assignee as Ser. No. 11/355,148, to Hairston, entitled "Flow Meter Performance Monitoring System," and filed on Feb. 15, 2006, the entire contents of which are incorporated herein by reference.

If the processing system 104 detects that the dP exceeds a threshold value above the baseline dP characteristic, then the system 104 may automatically generate an electronic message or signal to request maintenance, repair or replacement of the meter 102. The threshold value may be based on a stored baseline dP characteristic curve, which may be a set of expected dP values at various line pressures and/or temperatures. In various operating modes, the processing system may use a factory default characteristic dP curve or a learned dP curve that may be developed in situ using a self-characterization procedure.

In this example, the meter 102 is installed to measure gas flowing through a gas line 106. The gas line 106 may transport gasses, such as natural gas, argon, butane, carbon monoxide, carbon dioxide, ethane, nitrogen, oxygen, propane, or air, for example. A similar embodiment using a flow element intended for the measurement of liquids may likewise measure dP across the meter to indicate the performance of the liquid meter. The meter 102 may include, for example, a rotary positive displacement type flow meter, a diaphragm positive displacement meter, or a turbine meter. Each of these meter types have moving measurement elements such as impellers, rotary pistons, diaphragms, or blades that may be subject to drag and a corresponding increase in dP across the element or elements.

In some implementations, dP measurements may be affected by variables that may be unique to a particular installation of the meter 102. For example, components connected to the gas line 106 (e.g., regulators, valves), the distance between the meter 102 and the components attached to the gas line 106, elevation, or other factors may cause a dP reading of the meter 102 to differ from the stored dP baseline. In some implementations, the meter 102 may implement a self-characterization procedure to learn one or more dP values for one or more set of operating conditions (e.g., gas flow, gas pressure, temperature, specific gravity of gas).

The meter 102 includes a volume sensor 108, which may detect the rotation of impellers, for example. In response to gas flowing through the meter 102, the volume sensor 108 may generate an electrical (e.g., pulses) output signal, which the processing system 104 can process to facilitate gas volume measurement. In various embodiments, the volume sensor 108 may be found in the processing system 104 and detect the rotation of a shaft emanating from the meter 102 that indicates a volume of gas as measured by the meter impeller, for example.

Motion of a measurement element, impeller for example, may be supported within the housing of the meter 102 by bearings of one or more types, such as ball bearings, journal bearings, shaft bearings (i.e., axial and/or radial), and the like. Wear or contamination of these bearings may induce drag on the rotating measurement element and correspondingly increase the dP across the element.

The volume sensor 108 may include one or more Hall effect, inductive, optical, proximity, Wiegand, or magnetic switch sensors that generate a fixed number of pulses per revolution of a pair of impellers, for example. As another example, the volume sensor 108 may use any of the aforementioned sensor techniques to detect rotation of a turbine. As another example, the volume sensor 108 residing in the processing system 104 may use any of the aforementioned sensors techniques to detect rotation of a shaft emanating from the meter 102.

In various embodiments, the meter 102 may include additional elements. In this example, the meter 102 includes a temperature sensor 110 to sense the temperature of the gas flowing through the meter 102. The processing system 104 may use the temperature information from the temperature sensor 110 to convert actual volume to standard volume based on Charles' Law. The temperature information may also be used to normalize measured dP information before it is compared to factory default or self-characterized dP data stored in the processing system 104, for example. As another example, the measured temperature may direct the comparison of measured dP information to factory default or self-characterized dP data corresponding to that temperature, either directly or through interpolation of adjacent data points. In other embodiments, the meter 102 may include a line pressure transducer 130 and/or differential pressure transducer with adjoining restrictor elements (170, 172) and pressure limiting valves (174, 176). The functions of these are described later.

In this example, the meter 102 also includes a generator 112 to convert mechanical energy of the rotating impellers, for example, into electrical energy which may be temporarily stored (e.g., as charge on a battery or capacitor) and/or delivered to operating circuits in the system 100. Such a generator may be provided in some embodiments to supply electrical operating power to the processing system 104. Some embodiments may combine the generator 112 with the volume sensor 108 into a single functional element or assembly. Embodiments of the generator 112 are described at least with reference to FIGS. 1 and 6 in co-pending U.S. Patent Application assigned to the same assignee as Ser. No. 10/419,522, to Gutierrez et al., entitled "Power Generating Meter," and filed on Apr. 21, 2003, the entire contents of which are incorporated herein by reference.

To communicate measured parameter information to the processing system 104 using electrical and pneumatic signals, the meter 102 further includes an inlet pressure port 114, and outlet pressure port 116, and an interface for information link 118. Pneumatic lines 120, 122 (e.g., flexible pressure tube, pipe) may each connect at one end to the inlet and output ports 114,116 using any suitable pressure connection coupling, including, for example, soldered, quick-disconnect, or Pete's Plugs (e.g., Pete's Plug® Model #100 is commercially available from Peterson Equipment Company, Incorporated of McKinney, Tex.). In some embodiments, pneumatic lines 120, 122 may not be required as the meter 104 may allow direct connection of the line pressure 130 and differential pressure 132 transducers.

The link 118 may carry analog and/or digital signals from sensors within meter 102. The means of carrying the signals may include wired (e.g., wire harness, cable) and/or wireless (radio frequency, optical fiber, infrared, Bluetooth, cellular) data communication and a suitable communication protocol (e.g., RS-232, proprietary or custom protocol). The data link 118 may provide uni-directional data flows from the meter 102 to the system 104, or communications may be bi-directional, including control commands from the system 104 to the meter 102.

In some embodiments, the meter 102 and the system 104 may be integrated in a single device, which may simplify or shorten the pneumatic lines and/or the data link 118. For example, the link 118 may be implemented as traces on a circuit board, or as an optical signal. In some embodiments, one or both pneumatic lines may be located within a package or a housing that contains the meter 102 and/or the processing system 104. In other embodiments, the system 104 may be separate and independently located from the meter. For example, an analog or digital wireless transceiver may be connected as an interface to the link 118. In various embodiments, the data link 118 and each of the pneumatic lines 120, 122 may include a plug on one, two, or neither end. The pneumatic lines 120, 122 may be secured and/or include a strain-relief mechanism within the housing (not shown) of the processing system 104.

The processing system 104 receives pneumatic signals via the pneumatic lines 120, 122. The processing system 104 processes the pneumatic signals to determine information about line pressure and differential pressure in the meter 102. In this example, the pneumatic signals are detected in the system 104 by a line pressure transducer 130 that measures an inlet line pressure at the meter 102 via the inlet pressure port 114, and by a differential pressure transducer 132 that measures the difference between the inlet pressure and the outlet pressures at the meter 102 via the outlet pressure port 116. The pneumatic line 120 provides substantially continuous and uninterrupted fluid communication from the inlet pressure port 114 to the line pressure (LP) transducer 130 via a pneumatic line 117. The pneumatic line 120 also branches off to provide fluid communication from the inlet pressure port 114 to an input port 133 of the differential pressure (dP) transducer 130. The pneumatic line 122 provides fluid communication from the outlet pressure port 116 to a second input port 134 of the differential pressure transducer 132.

The differential pressure transducer 132 may be, for example, a model DP96 pressure sensor commercially available from Measurement Specialties, Inc. of Hampton, Va. Other pressure transducers are also available from Honeywell International, Inc. of Morristown, N.J., and from Sensotech of Barleben, Germany.

The processing system 104 also receives data, power, and/or control signals for monitoring the meter and for measuring volume over the link 118. The volume sensor 108 output may include pulses that indicate gas volume measurement. The temperature sensor may output an analog or digital signal, for example. The generator 112 may output a regulated or unregulated voltage or current, which may be AC, DC (e.g., from rectified AC, or a DC generator). Such signals may also be high frequency, digital, analog (e.g., sinusoidal, square wave, pulses), or other encoded signal format, and may be in electrical, optical, or mechanical form suitable for conversion to stored measurement information as will next be described.

Volume, pressure, temperature, voltage, or current signals may be arranged for processing by signal conditioning circuitry 140 and an A/D converter 142. The signal conditioning circuitry 140 may include analog amplification and/or scaling means to modify the input signal so it may be more suitable for interface to the A/D converter 142. The signal conditioning circuitry 140 may also include common ancillary components necessary for proper or reliable operation such as limiting devices (e.g., clamp circuits, resistor divider), protection devices (e.g., ESD, electrical fast transient, surge, lightning, reverse voltage), discrete circuit elements (e.g., diodes, filters, chokes, MOVs, transzorbs), frequency response filters (e.g., noise reduction), signal separation (common-mode rejection), comparators (e.g., with or without hysteresis), DC or AC coupling, and/or integrators/differentiators, for example. Volume, pressure, and temperature signals, if in digital or pulse form, may bypass the signal conditioning circuitry 140 and the A/D converter 142 to directly interface to the processor 152. In some embodiments, the A/D converter 142 and/or signal conditioning circuitry 140 may be integrated with the processor 152 and one or more subsystems such as non-volatile memory 154, real-time clock 160, and communications 164, for example. In some embodiments, the signal conditioning circuitry 140 may include analog multiplexing that may permit one of multiple input signals to be digitally selected for processing by the A/D converter 142. After signal conditioning, if any, analog values of signals may be sampled and converted to a digital value representation by the A/D converter 142. The A/D converter may include sampling and digitization of one or more signals, such as with analog multiplexing and/or multiple A/D converters, for example.

The A/D converter 142 processes, either through the signal conditioning circuitry 140 or through a direct interface, a line pressure (LP) signal output by the line pressure transducer 130 and a dP signal output by the dP transducer 132. In this example, the A/D converter 142 also processes a temperature (T) signal received from the temperature sensor 110 over the link 118. In some embodiments, the A/D converter 142 may also process, for example, an input signal from a gas calorimeter, gas chromatograph, densitometer, or other device that measures gas composition or characteristics used for converting measured volume to energy units (i.e., British Thermal Units, therms). The A/D converter 142 may also measure an output voltage from the generator 112, the supply voltage provided by a power supply 144, and/or a potentiometer setting (not shown) that may be provided as an input.

In embodiments, the processing system 104 may operate using electrical power generated by the generator 112 to supply power to the power supply 144. In other examples, the processing system 104 may operate using electrical power from stored energy (e.g., battery), an external power source, fuel cell, solar power, or a combination of these.

The A/D 142 outputs a serial or parallel output signal of data representing samples of the input signal(s) onto a digital bus 150. The bus 150 couples to a processor 152 and a non-volatile memory (NVM) 154. The processor 152 may include one or more processing devices that are operable to execute instructions (i.e., software, firmware) to perform operations. The NVM 154 may store program, control, data, metadata, factory calibration settings, baseline dP characteristic values, learned dP values, and/or other information for access by the processor 152.

For example, the processor 152 may access instructions stored in the NVM 154, such as a learn mode code 156 module (discussed in detail with reference to FIGS. 8A-8B) and/or a run time code module 158 (discussed in detail with reference to FIGS. 3-6). The learn mode code module 156 may include instructions that, when executed by the processor 152, cause the processor 152 to perform operations to self-characterize a baseline dP curve. A self-characterized baseline dP curve may be generated for the rotary flow meter after installation, or in response to an operator's request. The run time code module 158 may include instructions that, when executed by the processor 152, cause the processor 152 to perform operations to check the differential pressure to evaluate the performance of the meter.

The processor 152 and NVM 154 may be integrated in a single device (e.g., ASIC), or implemented in several devices (e.g., chipset). In some exemplary embodiments, the processor 152 may include a microcontroller, microprocessor, DSP, and/or math co-processor, and the NVM may include ROM, EPROM, EEPROM, flash, a disc drive, or a combination of one or more of such devices. In some embodiments, some random access memory (RAM) (not shown) may be provided for volatile data storage (e.g., scratch pad memory). The processor may include or operate in conjunction with analog and/or digital components, including discrete and/or integrated devices, for example, state machines, drivers, transceivers, combinational logic, sequential logic, analog signal processing circuits, I/O circuits and devices, various support circuitry, and/or such components in combination.

In this example, the processor 152 is operably coupled to communicate with a real time clock (RTC) 160 and a display device 162 via the bus 150. The RTC 160 may provide date/time stamp information that may be stored and associated with data (e.g., dP, LP, and T) that is collected during operations, such as learning a baseline dP characteristic. The RTC 160 may be used to indicate timestamps on test data for the rotary flow meter 102. In addition, test and maintenance operations may be performed periodically according to a programmable schedule monitored and initiated by the RTC 160. The date/time stamp information may also be accessed when it is necessary to identify, for example, flowing gas conditions, weather conditions or other events in existence when data was collected. The time information RTC 160 may also be used to determine when to start and/or stop data collection for self-characterization of a base line dP curve (e.g., stop after 1 full year), and may also serve as a time base for functions such as the DC offset reduction function, which is described in further detail with reference to FIG. 3.

The processor 152 may send information to the display device 162 to be displayed to a user. The display device may include a display screen (e.g., LCD, LED), and/or other visual indicators. In other examples, the system 104 may also include audible indicators (e.g., speaker coupled to voice synthesizer, annunciator, buzzer) and/or user input devices (e.g., touch screen, keypad, switches, buttons, dials, input pointing device).

In addition, the processor 152 is coupled in this example to a communication interface (COM) port 164. The COM port 164 may provide for one or two way communication with other devices. For example, the COM port 164 may provide for downloading historical flow and/or dP data, uploading default baseline dP characteristic information, configuration information, control commands, or revised or supplemental programming code from a programmer device. In another example, the COM port 164 may be used to link to a download terminal, laptop, or handheld computer, for example, to send collected measurement and/or maintenance request signals. For example, if the processing system 104 determines that the dP exceeds a threshold above a baseline dP characteristic, then that status information and/or request for maintenance may be communicated to a compatible processor-based device via the COM port 164.

The COM port 164 may include one or more physical interfaces and use any suitable protocol, such as wired (e.g., USB, Firewire, RS-232/422/485, CAN, I2C, SPI, Ethernet), optical (e.g., fiber-optic, infrared), and/or wireless (e.g., Bluetooth, CDMA, TDMA, EDGE, AM, FM, FSK, PSK, QAM, or other suitable transmission technique and/or protocol). In some embodiments, the COM port 164 may include a transmitter, receiver, power amplifier, antenna, and/or modem.

In some embodiments, the COM port 164 may include one or more digital and/or analog inputs and/or outputs. For example, the COM port 164 may include outputs that trigger or otherwise control external devices such as alarms, valves, safety equipment, pagers, or other devices that may be controlled by digital and/or analog electrical signals.

The pneumatic lines 120, 122 provide fluid communication of the pressure state of the gas entering and exiting the meter 102. As such, any pressure transients in the gas may be communicated to dP transducer 132. Pressure transients may be caused by sudden changes in demand, initial pressurization of the gas line 106, upstream or downstream pressure regulator operation, or lock-up of the impellers in the meter 102, for example.

The processing system 104 includes a protection system for the dP transducer 132. The protection system includes series restrictor elements 170, 172 in the fluid communication paths between each input port of the dP transducer 132 and the inlet pressure port 114 and outlet pressure port 116, respectively. The restrictor elements 170, 172 protect the dP transducer 132 against fast pressure transients of the line pressure. The restrictor elements may be, for example, a pin hole or sintered metal type flow restrictor. Snubber Fitting model B-4-SA-EG manufactured by Swagelok Company of Solon, Ohio, limits flow to 0.05 liters per minute and is an example of restrictors designed to protect pressure gauge elements for pressure surges.

The protection system further includes differential pressure limit valves 174, 176. In this example, two opposing one-way valves are shown. In other examples, the functions of the valves 174, 176 may be integrated into a single two-way valve. Each of the valves 174, 176 opens when a differential pressure across the valve reaches a limit. When the valve opens, pressure may be relieved sufficiently to protect the dP transducer 132 from being subjected to more than a rated differential pressure limit. The valves 174, 176 may be a valve similar to a stem valve on a car tire, for example. In other examples, the valves may be poppet valves, and may be spring loaded. In one example, the valves 174, 176 may be arranged to substantially limit the differential pressure across the dP transducer 132 to within about ±1 psi. Check valve model MCV-1 manufactured by Clippard Instrument Laboratory, Inc. of Cincinnati, Ohio is an example of a commercially available poppet valve suitable for some embodiments.

The relationship between the flow characteristics of the restricting elements 170, 172 and that of the pressure limiting valves 174, 176 may influence the effectiveness of the protection system. For example, if the restricting element limits flow to 0.05 liters per minute, and if the pressure limiting valve opens at 0.5 psid and has a pressure drop of 0.02 psi at 0.05 liters per minute, then the maximum pressure the dP transducer will see is 0.52 psid. If the differential pressure under an external fault condition (i.e., pressure surge) results in a pressure at the inlet pressure port 114 of 105 psig and a pressure at the outlet pressure port 116 of 5 psig, then the following pressures will be observed: The dP between 114 and 116 will be 100 psid. With the pressure limiting valve 176 limiting the pressure across the dP transducer 132 to 0.52 psid, then the remainder of the 100 psid pressure will be equally split by the restricting elements (170, 172). Each restricting element 170, 172 will drop 49.74 psid. Using simple subtraction, for example, the pressure at the junction of restricting element 170 and dP transducer 132 drops from 105 psig to 55.26 psig. Using addition, the pressure at the junction of the restricting element 172 and dP transducer 132 rises from 5 psig to 54.74 psig. As a result, the differential pressure across the dP transducer 132 may be limited to 0.52 psid (55.26 psig minus 54.74 psig) protecting it from an extreme pressure surge.

In some embodiments, any of the restricting elements 170, 172 and/or the pressure limiting valves 174, 176 may also be integrated into the meter 102.

In various embodiments, the housing (not shown) for the processing system 104 may include plastic, aluminum, composites, and/or steel, for example.

In some applications, there may be different actions taken at different thresholds. For example, in a system having three thresholds at 20%, 50%, and 70%, the processing system 104 may generate different messages depending on which threshold is exceeded. At the lower threshold, a warning light may be flashed. At a middle threshold, a status message may be made ready for download at a future maintenance check. Above a high threshold, the processing system 104 may transmit a wireless message or a message over a WAN requesting immediate service for the meter. In such messages, the processor 152 may include identifying information for the meter.

Messages sent or received via the COM port 164 may be in the form of packet-based messages, for example, or in the form of a data stream. In some embodiments, messages may be routed over a communication channel according to message header information that may be appended to a payload of data containing status, baseline characteristic, and/or collected data information, for example.

A self-characterized (learned) baseline curve may be developed over a relatively long period of time (e.g., up to about 2 years or more) and over a wide range of flow rates, temperatures, and/or line pressure conditions.

Further refinement of characteristic dP may be accomplished by interpolating between adjacent dP curves based on measured gas temperature and/or pressure conditions present at substantially the same time that a dP reading is taken. In a like manner, dP readings that correspond to a flow rate percentage lying between stored data points residing in NVM 154 may be compared to a calculated baseline value using adjacent data point values.

Other methods may be used to essentially store baseline dP characteristic curve data, such as the use of one or more algorithms that mathematically represent the baseline curve at any given flow rate percentage. In further embodiments, multiple algorithms, each mathematically representing one of a number of baseline dP characteristic curves for a specified gas temperature and/or pressure, may be used. In another embodiment, a single algorithm may mathematically represent baseline dP characteristic curves as a function of flow rate, temperature, specific gravity and/or line pressure.

As will be described below, example methods depicted as flow diagrams in FIGS. 2A-2N and 7-16 include operations that may be performed generally by the processing system 104. The operations of methods 200 and 700-1600 may be stored in the NVM 154, for example, as instructions in one or more subroutines, code modules, or objects that may be called for execution by the processor 152. Operations may also be supplemented or augmented by other processing and/or control elements that may be incorporated by the system 104. Some or all of the operations may be performed by one or more processors executing instructions tangibly embodied in a signal. The processing may be implemented using analog and/or digital hardware or techniques, either alone or in cooperation with one or more processors executing instructions.

Figure 2A:
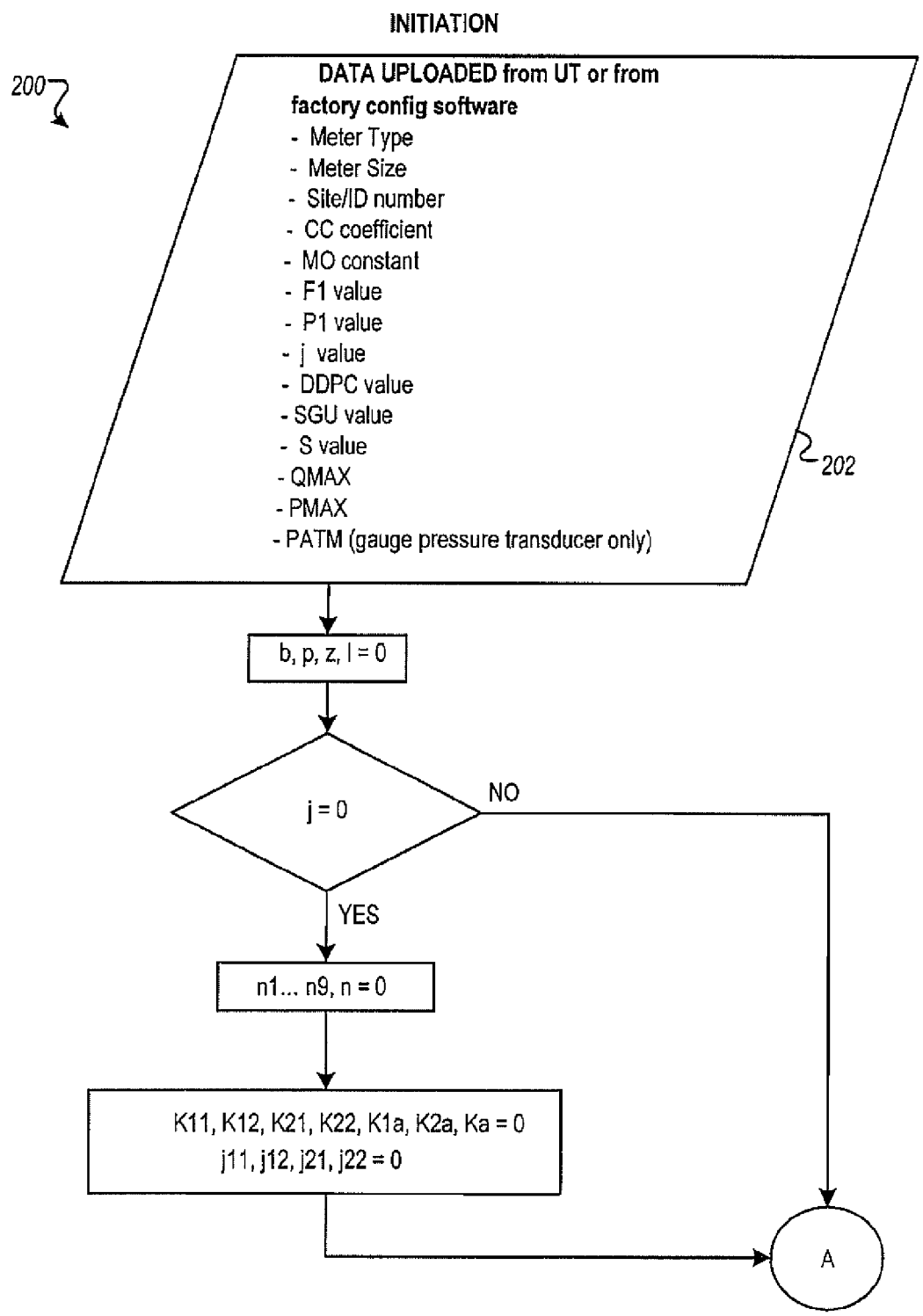
FIGS. 2A-2N depict a flow diagram of an exemplary method for differential pressure self-characterization and monitoring.
Figure 2B:
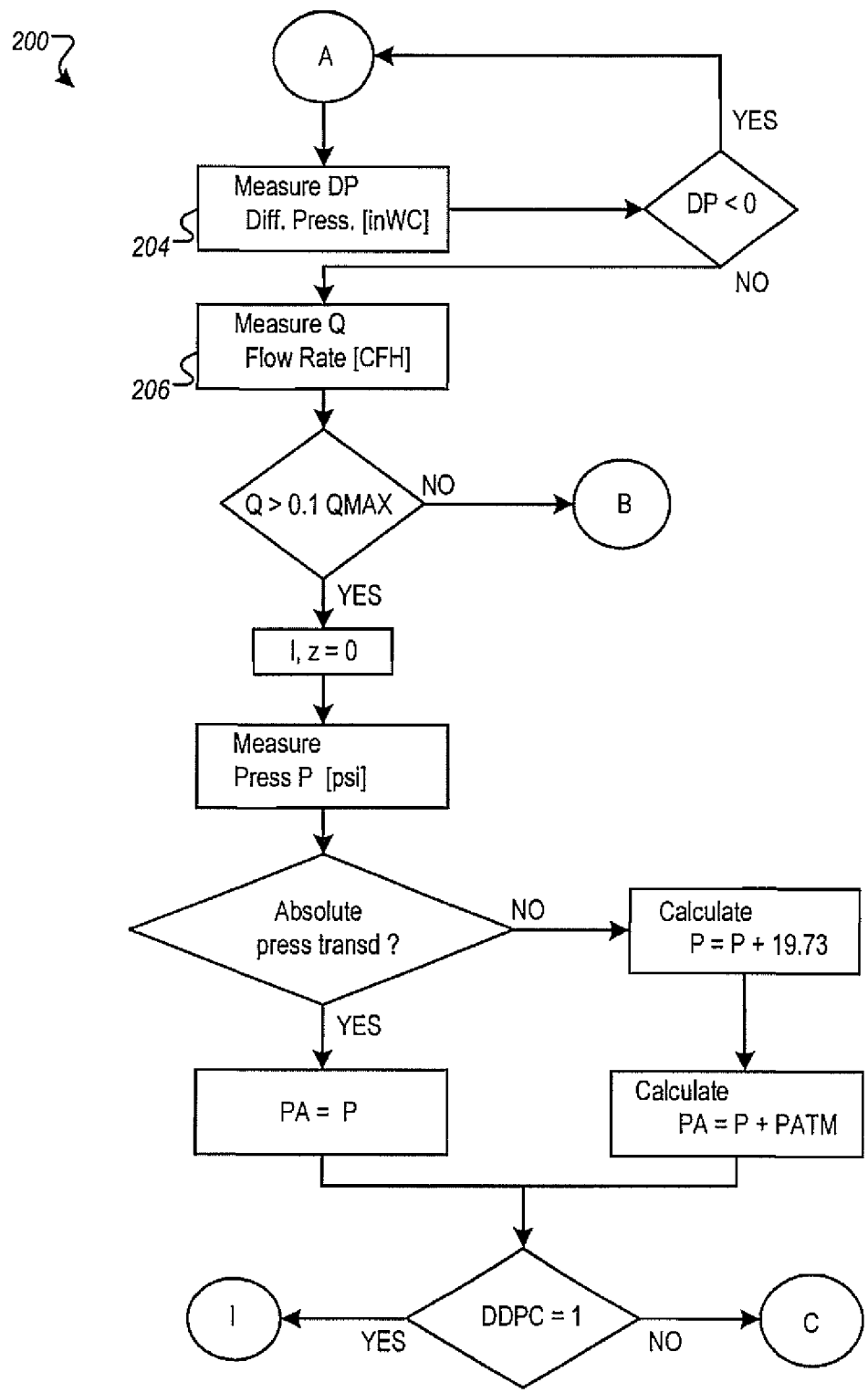
Figure 2C:
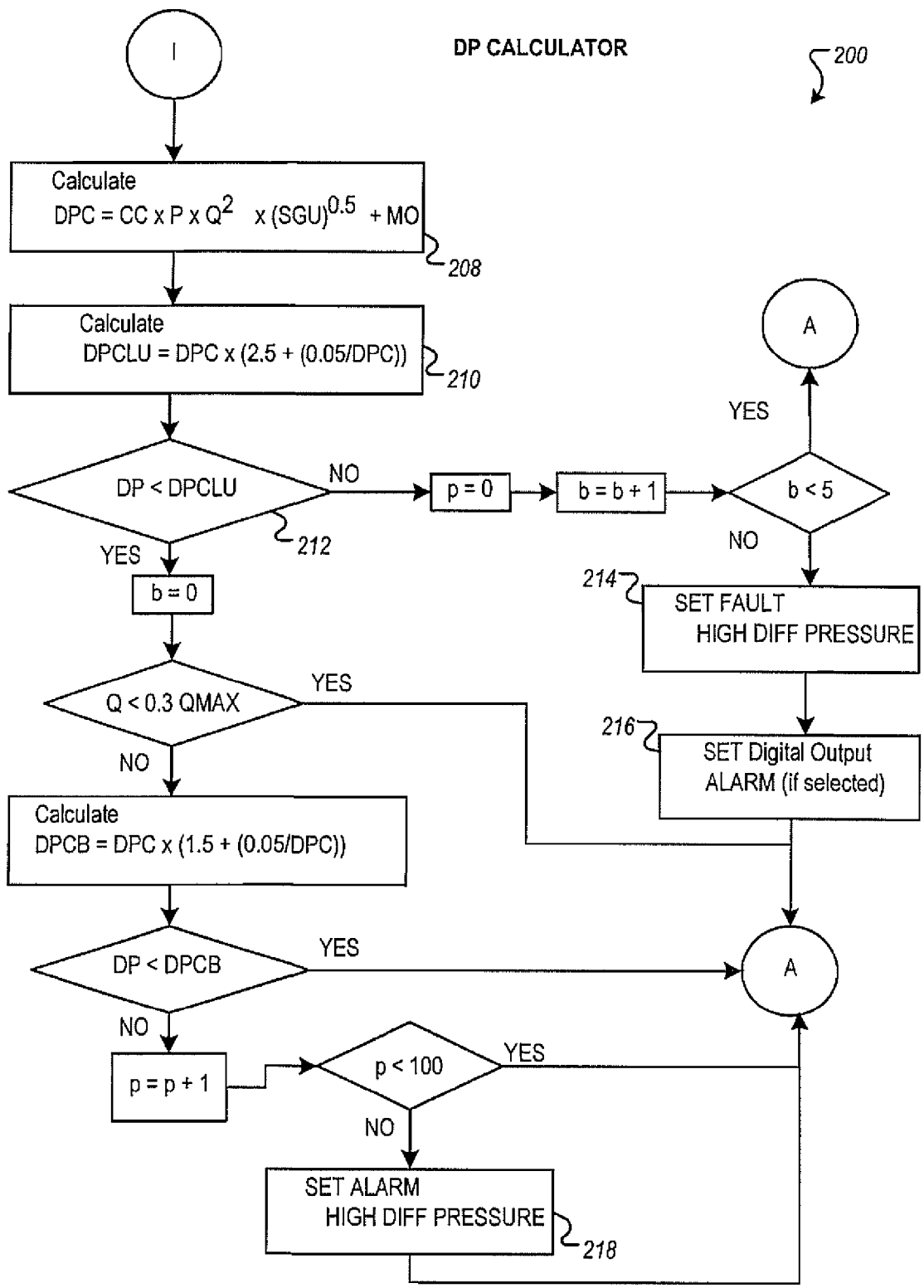
Figure 2D:
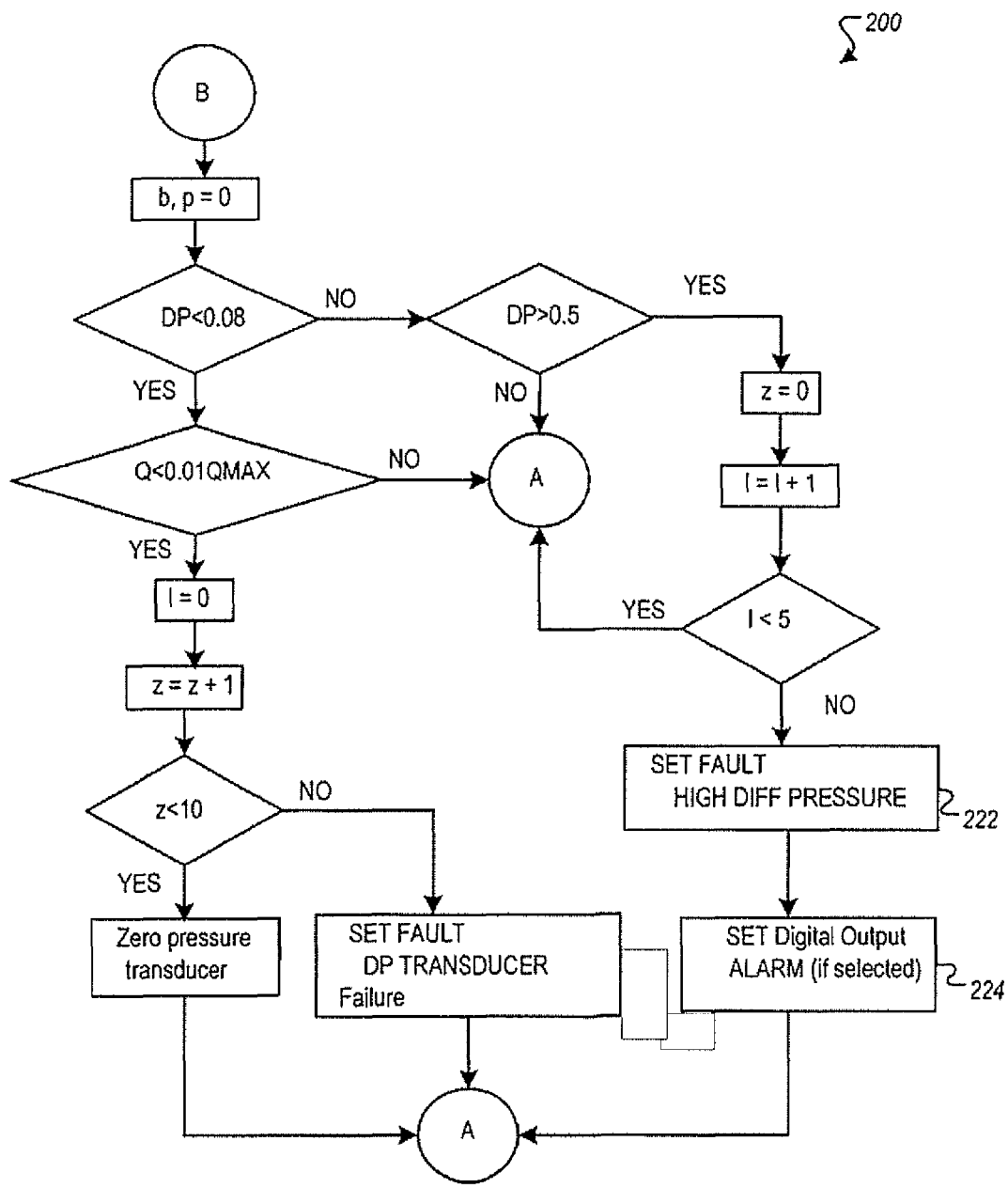
Figure 2E:
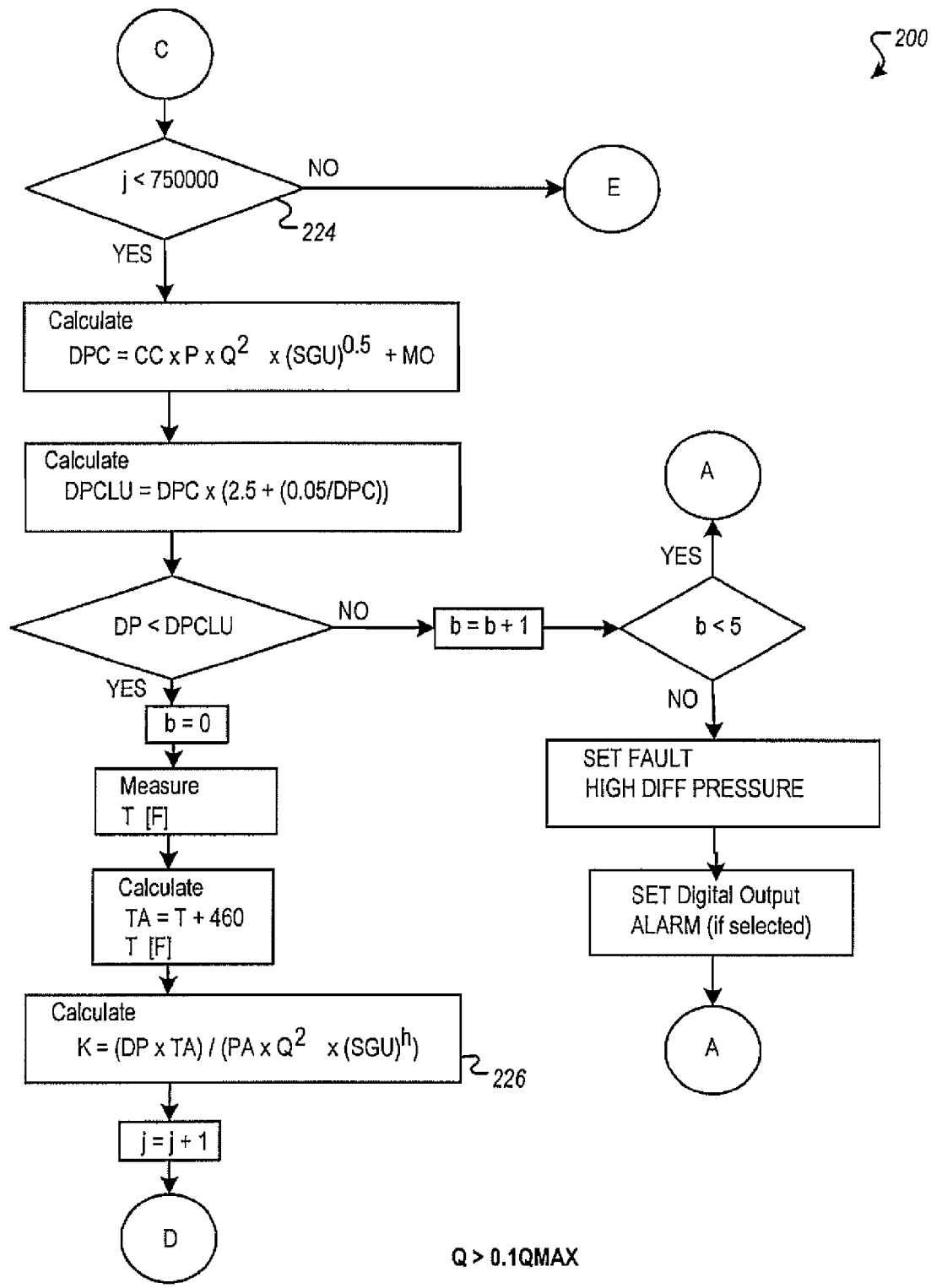
Figure 2F:
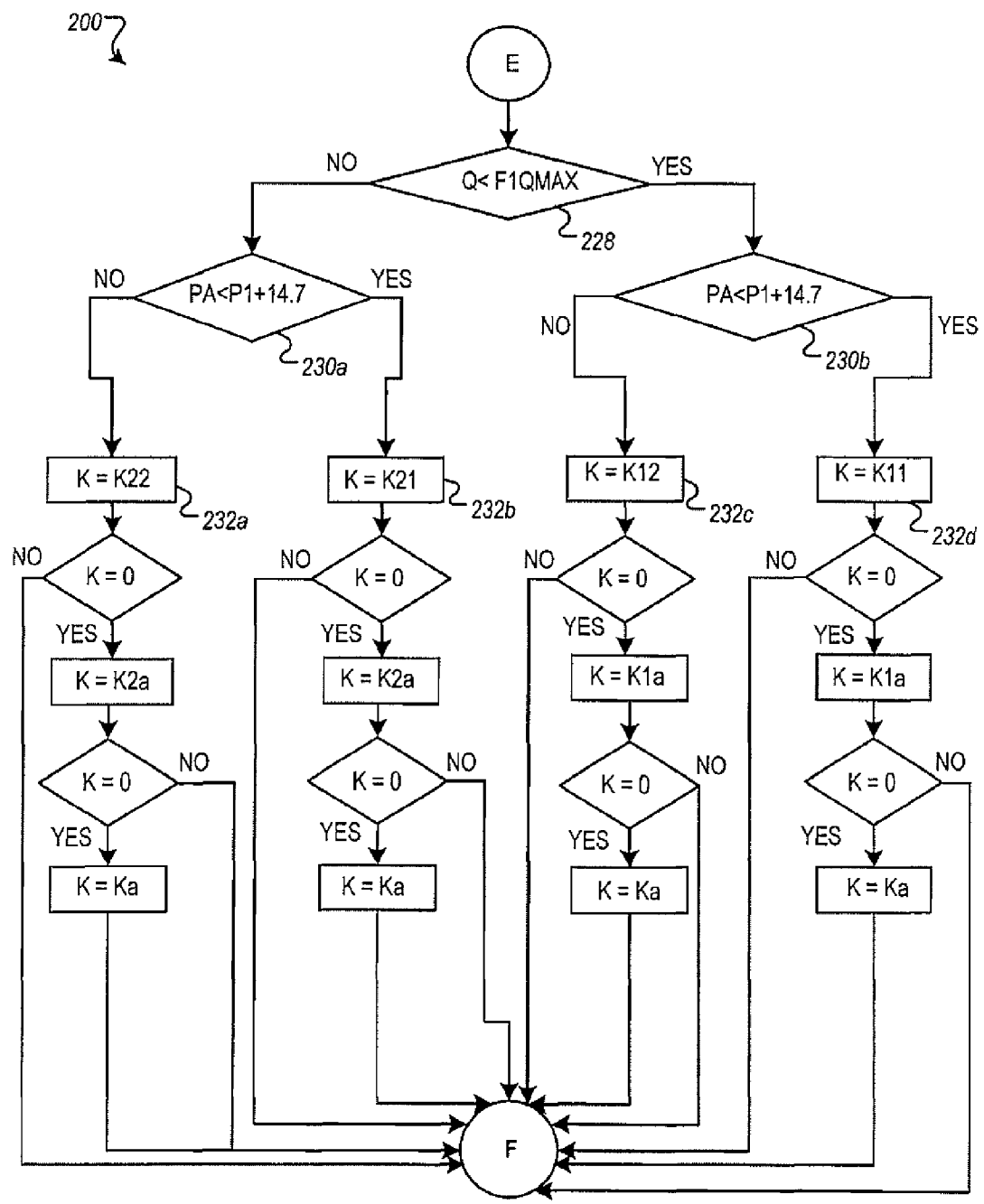
Figure 2G:
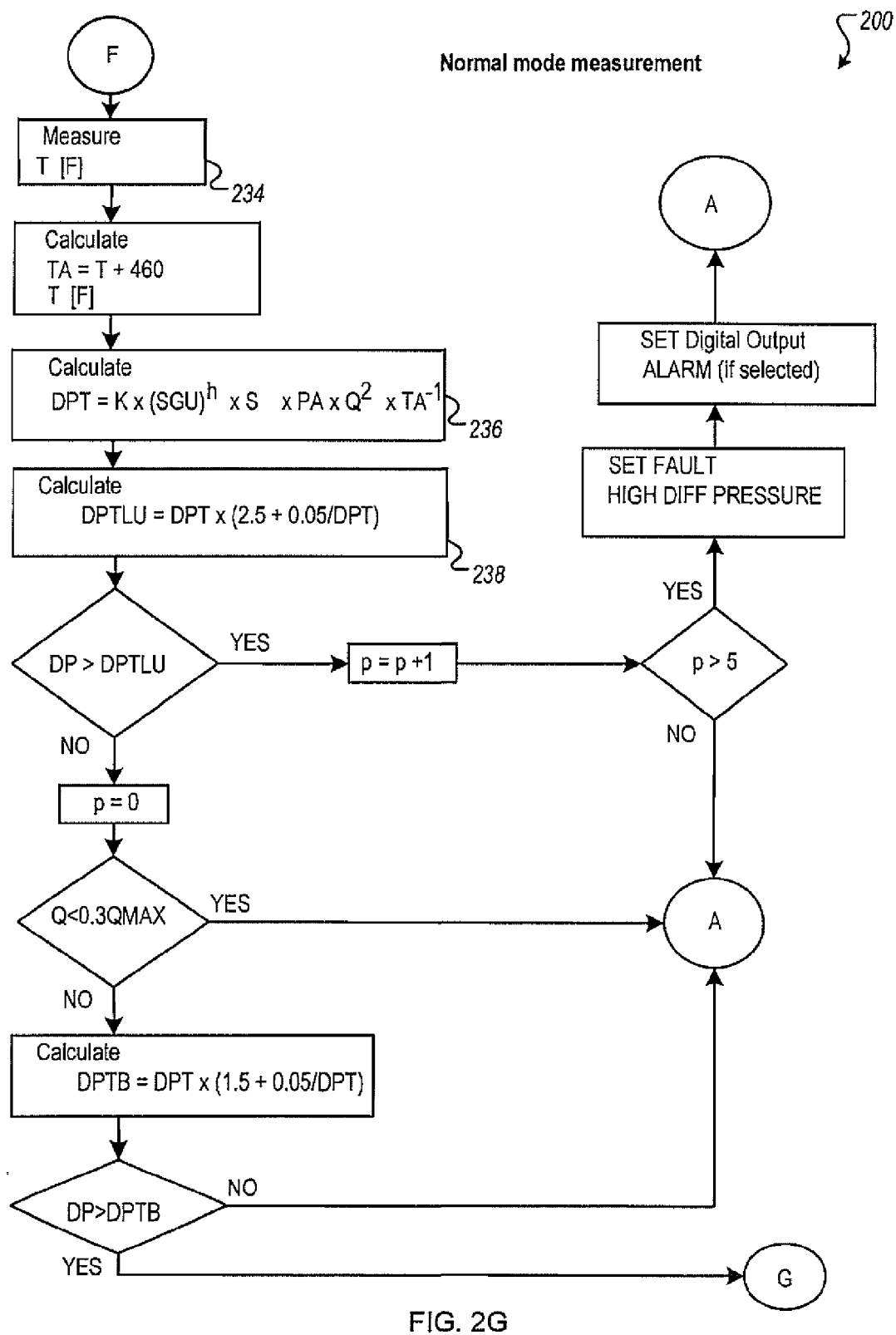
Figure 2H:
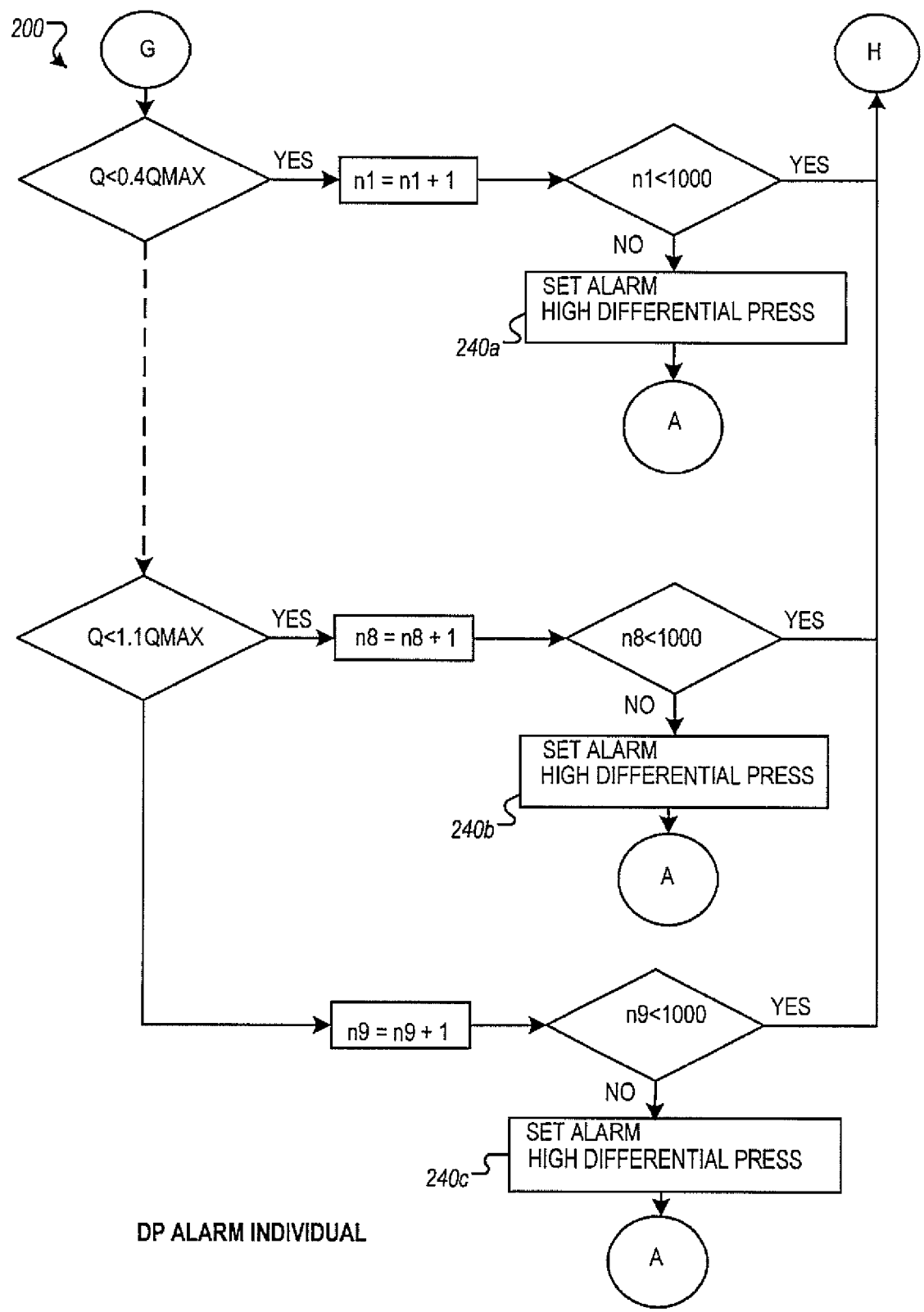
Figure 2I:
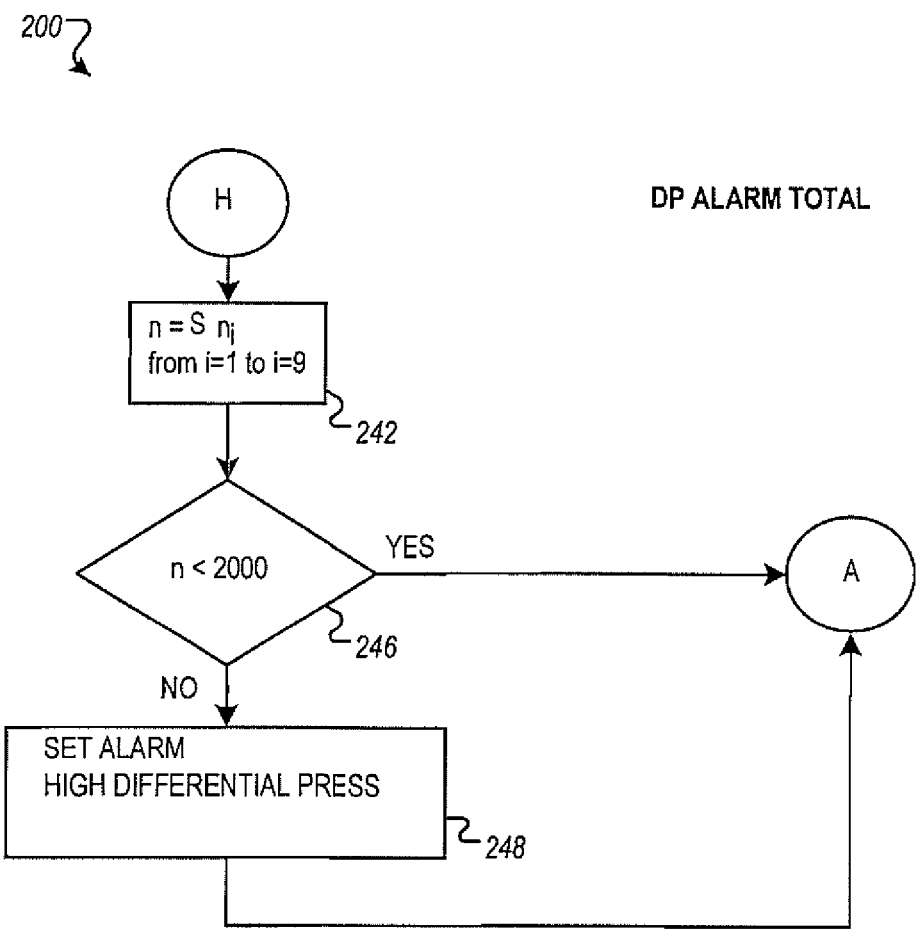
Figure 2J:
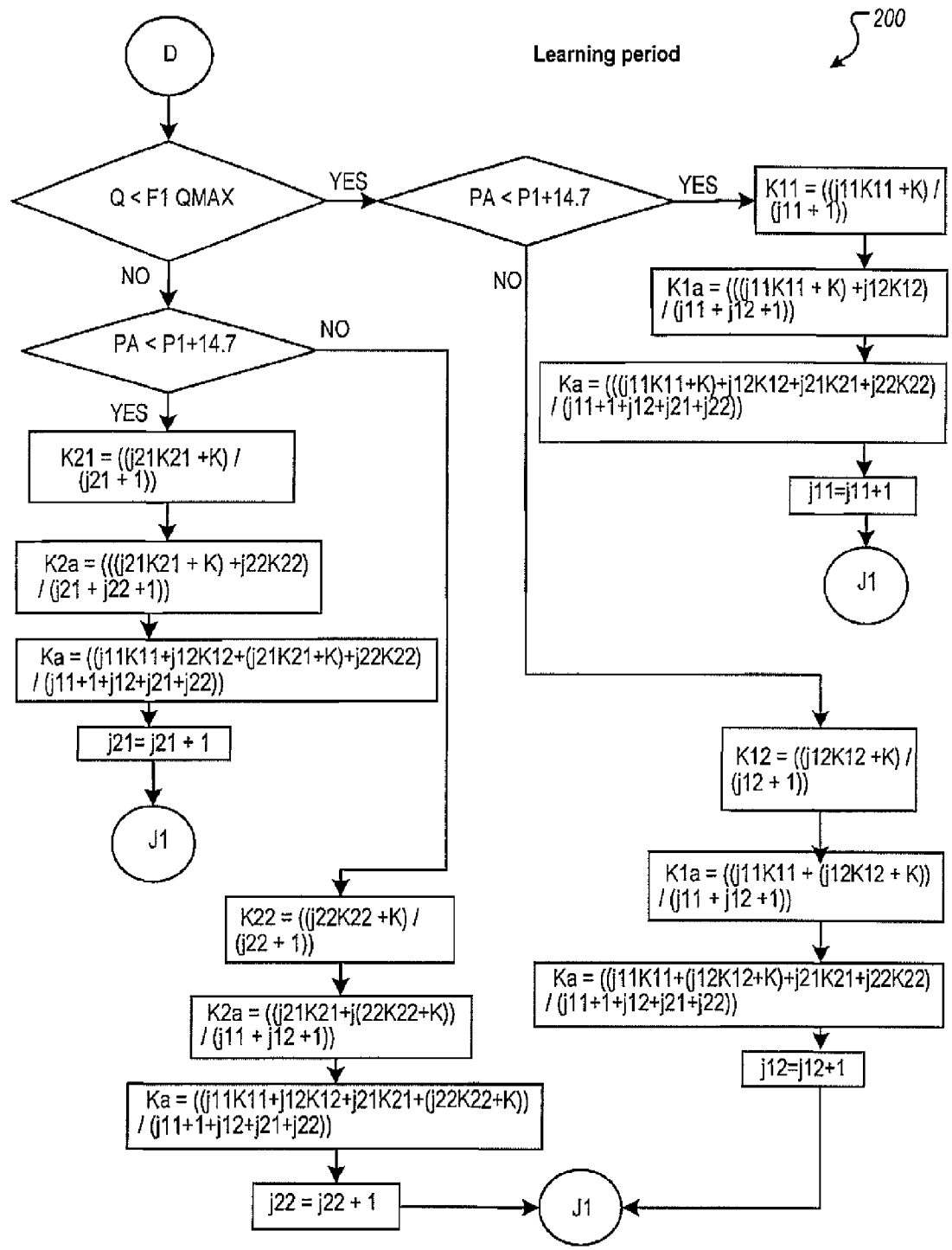
Figure 2K:
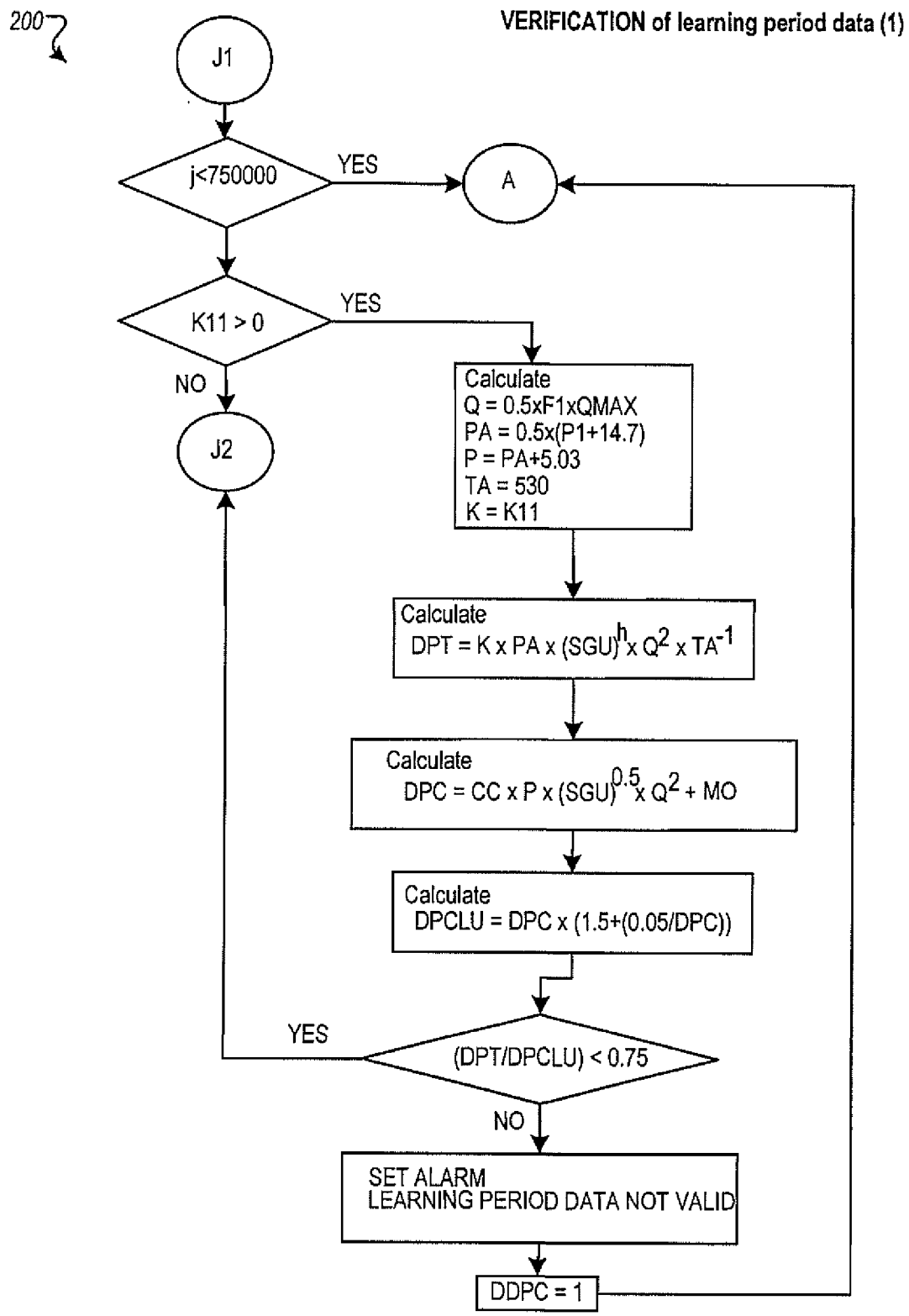
Figure 2L:
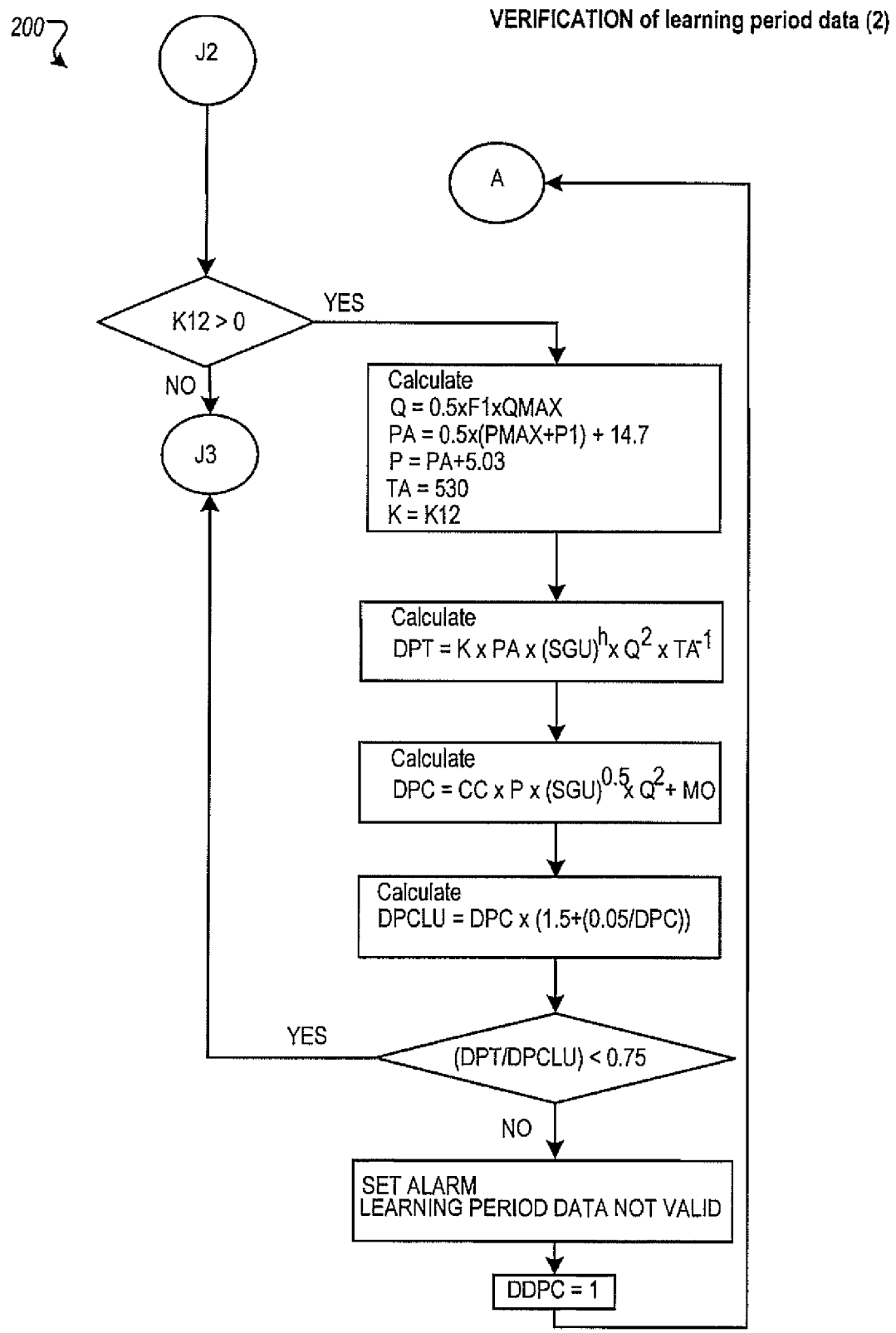
Figure 2M:
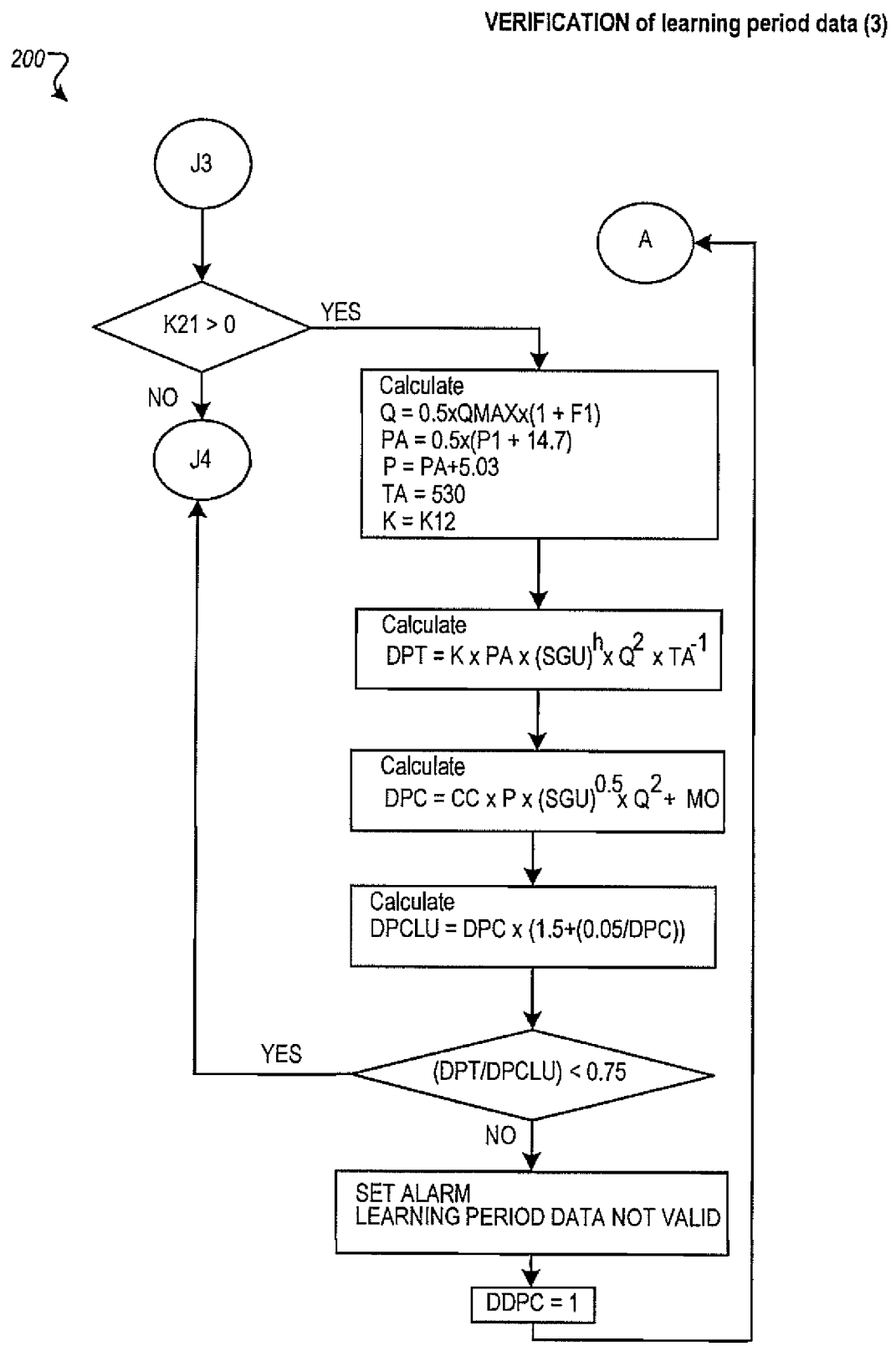
Figure 2N:
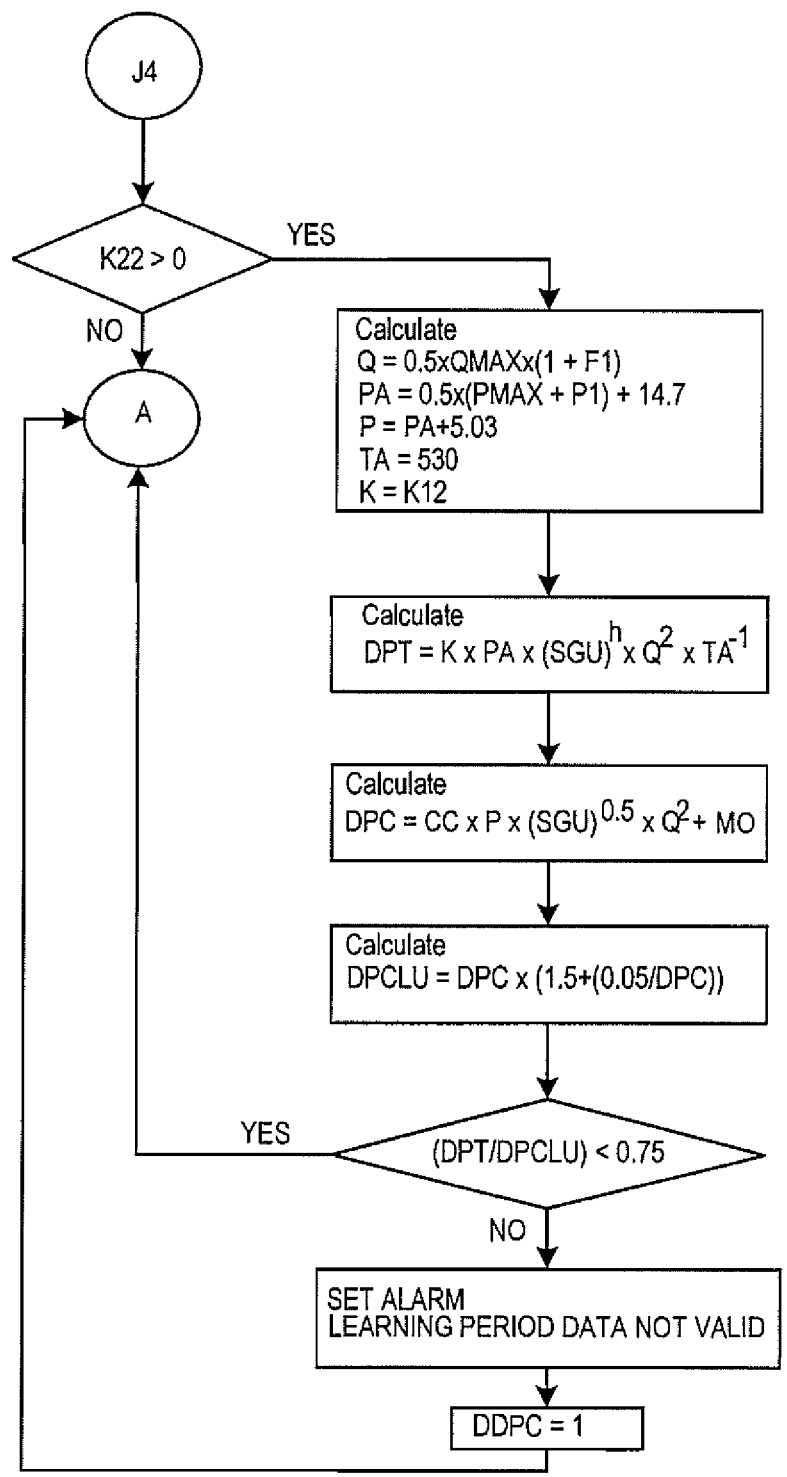

FIGS. 2A-2N depict a flow diagram of an exemplary method 200 for differential pressure self-characterization and monitoring. In general, the method 200 uses a mathematical model to calculate dP. For a period of time (e.g., a month, a year, two years, five years), the method 200 uses preconfigured values to calculate dP while the method 200 periodically uses measured physical values (e.g., pressure, flow, temperature, specific gravity of gas) to calculate and update one or more values that may be used to calculate dP. After the period of time has passed, the method 200 uses the calculated values rather than the preconfigured values for dP calculations.

FIG. 2A is a flow diagram of an example initialization portion of the method 200. A collection of configuration data is loaded 202 for use by the method 200. The configuration data may include, for example, meter type data, meter size data, site identifiers, flow rate limits, pressure limits, specific gravity of gas, calibration data, and/or other data that may be used for the calculation of dP. Other steps of the example initialization portion of the method 200 set internal values to zero under certain conditions, for example such as during the very first time the method is executed.

FIG. 2B is a flow diagram of an exemplary meter performance test portion of the method 200. The dP value obtained from a dP transducer is read 204 and a flow rate (Q) is read 206. If the flow rate is greater than a predetermined threshold, then the method 200 branches to a set of transducer test steps that will be described with respect to FIG. 2D. If the flow rate is less than or equal to the predetermined threshold, then an example dP limit calculation is performed.

FIG. 2C is a flow diagram of the example dP limit calculation portion of the method 200. A theoretical dP is calculated 208, and a high pressure fault limit is calculated 210. The theoretical dP is compared 212 to the high pressure fault limit, and if the theoretical dP exceeds the high pressure fault limit for a predetermined number of cycles, a high dP fault is set 214 and a digital alarm output is set 216. In some implementations, the digital alarm output may be used to trigger an external alarm or other equipment, such as a shutdown or bypass valve. Other calculations evaluate whether the flow rate exceeds a calculated high dP alarm threshold, and whether a high dP alarm is set 218.

FIG. 2D is a flow diagram of a portion of the example method 200 for zeroing a pressure transducer and for setting alarm outputs. The dP value and the flow rate values are evaluated, and if the values are outside predetermined limits for a number of cycles a dP transducer fault is set, and/or an high dP pressure fault is set 222. If selected, then an alarm digital output is also set 224.

FIG. 2E is a flow diagram of a portion of the example method 200 for calculating an exemplary differential pressure during a learning period. In this example, the learning period is evaluated 224 to determine if a predetermined number of cycles have been performed. For example, the method 200 evaluates 224 whether 750000 cycles have been performed. In some embodiments, the number of cycles may be determined to substantially represent a period of time, such as a week, a month, a year, or other length of time. In some implementations, the duration of the learning period may be determined by a date that is compared against a real time clock.

In some implementations, the duration of the learning period may elapse after a number of events have been detected, such as high and/or low pressure limits, high and/or low flow limits, high and/or low temperature limits, and/or other events or combinations thereof that may be used to determine whether a learning period has elapsed. If the learning period has not elapsed, then a coefficient (e.g., K) for the dP calculation is determined 226. If the learning period has expired, then coefficients learned during the learning phase are retrieved and used for calculating dP.

FIG. 2F is a flow diagram of a portion of the example method 200 for determining the value of a coefficient used for calculating differential pressure under various combinations of measured conditions. If the flow rate is determined 228 to be above or below a particular rate, and determined 230A-230B to be above or below a particular absolute pressure, then one of four stored learned values of the coefficient K (e.g., K11, K12, K21, K22) may be retrieved 232*a*-232*d* for use in calculating dP.

In some implementations, the method for determining the appropriate value of K may not involve conditional logic. For example, the equation for calculating dP may include coefficients that, depending on the operational conditions, may substantially attenuate or nullify the contributions of certain elements of the equation such that only selected portions of the equation that effectively model the current operational conditions remain.

Although the depicted example shows the method 200 utilizing four stored values for the coefficient K, other combinations of pressure, flow, temperature, specific gravity, and/or other values may be used to determine which learned value of the coefficient K should be used. For example, the range of flow values may be divided into four ranges, while the range of pressure values may be divided into three ranges, thereby defining twelve ranges of pressure and flow from which twelve values of the coefficient K may be determined.

Additional values may be used in various combinations to create one, two, three, or higher dimensional regions which may be used to determine a value for the coefficient K. For example, three regions of flow values, four regions of pressure values, six regions of temperature values may be used to define 72 three-dimensional regions for 72 values of the coefficient K. In some implementations, regions may not be distributed evenly. By way of example, and not limitation, some values may be distributed to span over ranges that vary substantially linearly, logarithmically, exponentially, or non-linearly, such as, for example, based on optimization from empirical test data. For example, regions may be distributed such that more values of the coefficient K may be obtained in ranges near the expected operational values for pressure, flow, temperature, specific gravity, or other values used to calculate dP. Fewer regions and values for the coefficient K may be distributed for ranges that fall outside the expected operational values. In some implementations, this may be done to boost the accuracy of dP calculations for the most commonly encountered conditions, while reducing the amount of memory needed to store values of K for less commonly encountered conditions.

In some implementations, one or more K values may be used to determine a single K value to be used for calculating dP. For example, two or more K values from adjacent regions may be combined (e.g., by averaging, by weighted averaging, by curve fitting, by linear regression) to determine a value of K for use in calculating dP.

FIG. 2G is a flow diagram of a portion of the method 200 for performing an exemplary differential pressure calculation. A temperature value is measured 234 and along with the absolute pressure value, the flow rate, the specific gravity value, a specific gravity compensation value, and the value of the coefficient K, is used to calculate 236 a theoretical dP value. A dP fault limit is calculated 238 from the calculated 236 dP value. The dP value, dP fault limit value, and flow rate are used to determine if a high dP alarm is to be set.

FIG. 2H is a flow diagram of a portion of the example method 200 for setting differential pressure alarms. The illustrated example tests the flow rate Q against various flow rate thresholds. Whenever one or more of the flow rate thresholds is exceeded, one or more integer values are incremented to store the number of times each of the flow rate thresholds has been exceeded. If one or more of the flow rate thresholds is exceeded by more than a predetermined number of times, a high dP alarm is set 240*a*-240*c*.

FIG. 2I is a flow diagram of a portion of the example method 200 for setting a differential pressure alarm. The number of times the various flow rate thresholds have been exceeded is summed 242, and if the summed 242 value is determined 246 to be greater than a predetermined number of times, a high dP alarm is set 248.

FIG. 2J is a flow diagram of a portion of the example method 200 for determining the value of a coefficient used for calculating differential pressure during the learning period. In general, during the learning period, a predetermined value of the coefficient K is used for calculating dP. Values for K are periodically computed (e.g., once per 5 seconds, per 30 seconds, every minute, every 5 minutes, every 15 minutes, every 60 minutes, once per day, once per week, once per month, once per season) and used to update an average K value that corresponds to the region of operational conditions under which the K value was computed.

In some implementations, the computed K value may be averaged with an old K value and stored as the updated K value. In various embodiments, each data sample may be equally weighted to produce an average K value over the learning period. In some implementations, the computed K value may be weighted against the old K value and averaged. For example, the value for K for a particular region (e.g., K12) may have been updated 5000 times, so the next time (the 5001$^{st}$ update) the value of K12 is updated, the old value will be multiplied by 5000, added to the computed K value, divided by 5001, and stored as the new K12 value. In some implementations, the use of weighted averaged or other statistical methods may prevent unusual readings (e.g., infrequent pressure spikes, bad sensor readings) to unduly influence the K values that are being determined during the learning period.

FIG. 2K-2N are a flow diagram of portions of the example method 200 of verifying the calculated dP coefficients K11, K12, K21, and K22 that are used for various pressure and flow conditions. In general, after the learning period has elapsed, each of the learned K values K11, K12, K21, K22 is used to calculate a dP value, and a dP limit value. If the calculated dP value is determined to be greater than or equal to a fraction of the dP limit (e.g., dP is greater than 75% of the dP limit in the illustrated example), an alarm is set to indicate that the learned K value for that region is not valid. Once all learned K values have been tested, the method 200 returns to the portion of the method 200 illustrated by FIG. 2B. If any of the K values K11, K12, K21, K22 have been determined to be invalid, then the method 200 will continue to use the predetermined value for K. If all the learned values of K are valid, the method 200 will use the learned values of K for subsequent calculations of dP.

Figure 3A:
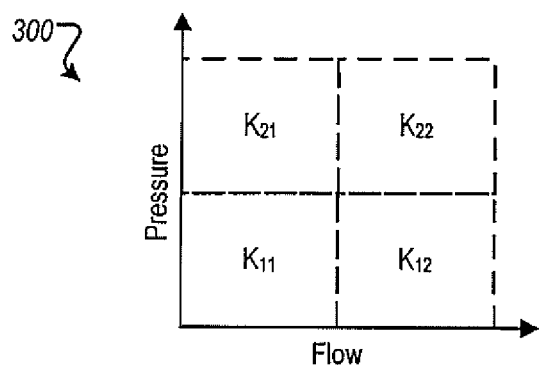
FIGS. 3A-3C are graphs that illustrate several ways one or more coefficients used for calculating differential pressure may be determined from combinations of measured fluid pressures and flows.
Figure 3B:
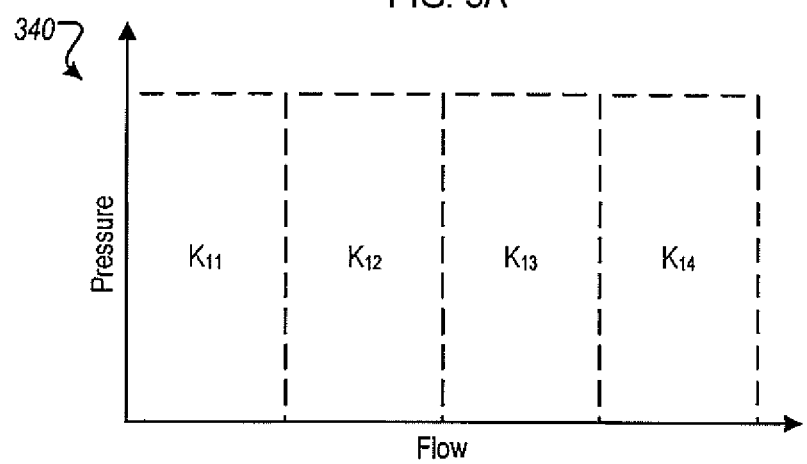
Figure 3C:
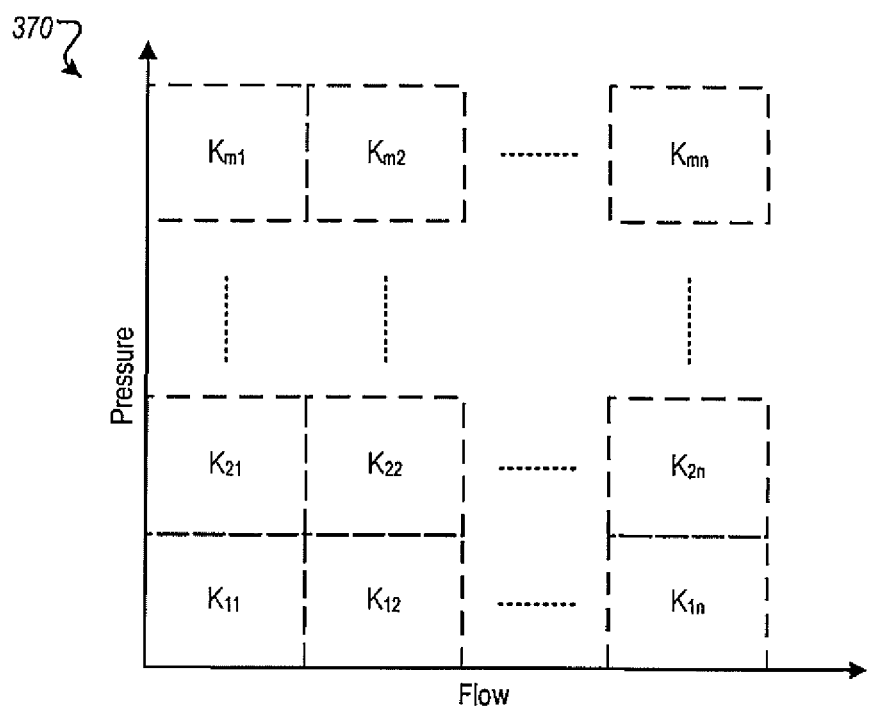

FIGS. 3A-3C are graphs that illustrate several implementations of one or more coefficients used for calculating differential pressure may be determined from combinations of measured fluid pressures and flows. FIG. 3A illustrates an example four-region graph 300. The depicted implementation represents the four coefficient K values described with regard to the method 200 of FIGS. 2A-2N. For example, the graph 300 indicates that the value K11 should used for calculating dP for a combination of low flow and low pressure, whereas the value K21 may be used under conditions of low flow and high pressure. Likewise, the value K22 may be used under conditions of high pressure and high flow, while the value K12 may be used under conditions of high flow and low pressure.

FIG. 3B illustrates an example one-dimensional graph 340. In the illustrated example, values of K are selected based upon flow rates only. For example, the value K11 may be used for a low flow rate at any pressure, while the value K14 may be used for a high flow rate at any pressure.

FIG. 3C illustrates an example two dimensional graph 370 that illustrates that any number of regions may be defined for storing a greater number of coefficient K values. In some implementations, a greater number of regions and stored K values may be used to provide greater accuracy for calculating dP for a given set of operating conditions.

In some implementations, combinations of values other than flow and pressure may be used to define regions and K values. For example, temperature and the specific gravity of gas may be used for the computation of K values. In some implementations, more than one or two values may be used to define multidimensional regions for K values. For example, flow, pressure, and temperature, could all be combined to form a three-dimensional range of values, wherein each three-dimensional region within the range may be associated with a value of K. In another example, flow, pressure, temperature, and specific gravity, or other value, may be combined to form a four or higher dimensional range of values, wherein each region within the range may be associated with a value of K.

Figure 4:
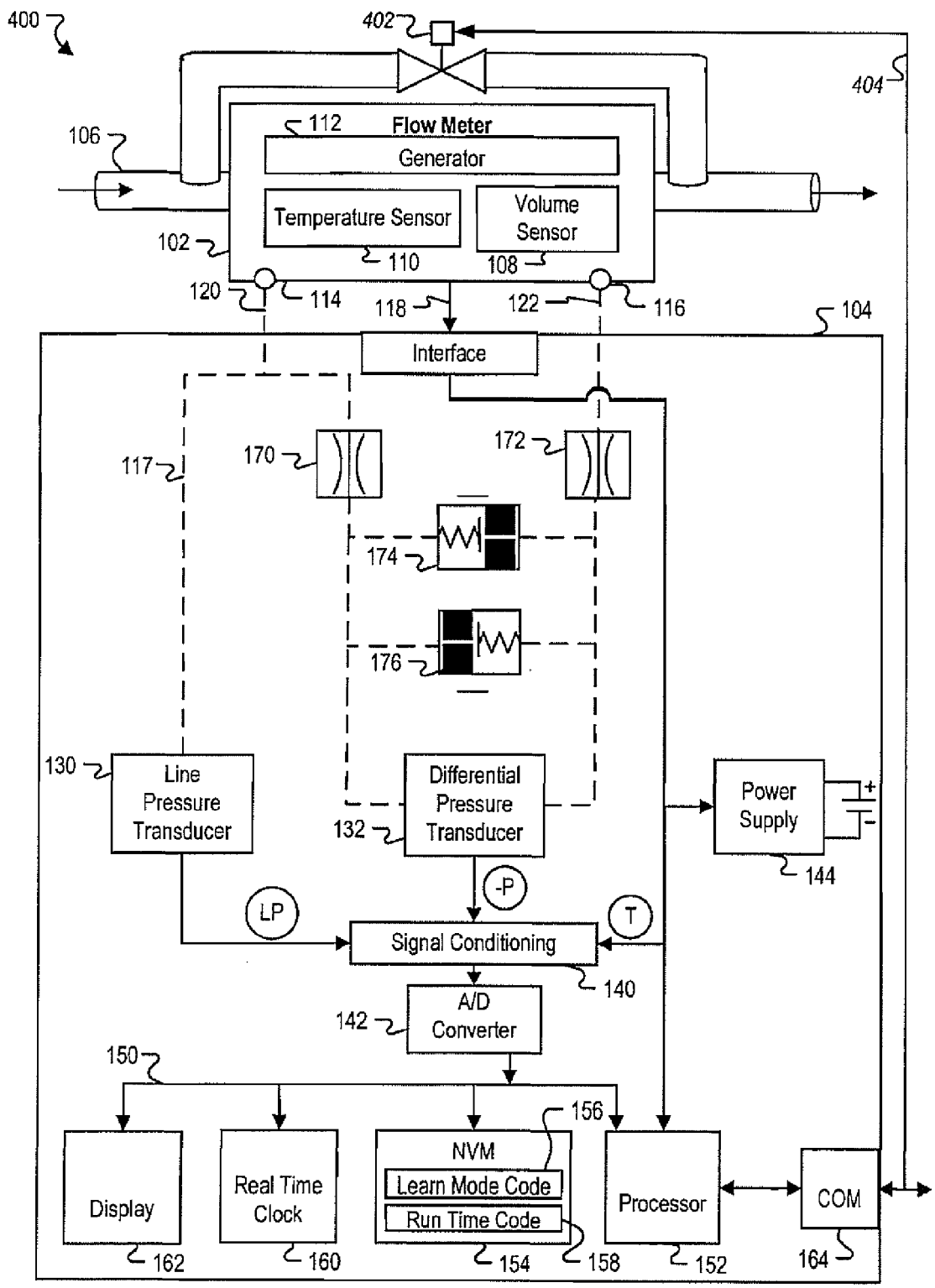
FIG. 4 shows an exemplary flow measurement system used to measure a differential pressure of a volume of gas flow in a gas distribution system that includes a bypass valve.

FIG. 4 shows the exemplary flow measurement system 400 used to measure a differential pressure of a volume of gas flow in a gas distribution system that includes a bypass valve 402. In some embodiments, the flow measurement system 400 may be the flow measurement system 100, modified to include the bypass valve and a digital signal conductor 404. Examples of a flow measurement system 400 are described with reference to FIG. 1 in U.S. Pat. No. 7,295,934 issued to Hairston on Nov. 13, 2007 and with reference to FIG. 1 in U.S. patent application Ser. No. 11/870,758, filed by Hairston on Oct. 11, 2007.

In some implementations, the bypass valve may be activated to allow gas to bypass the flow measurement system 400. For example, if a high dP condition is determined (e.g., the setting 214 of the high dP fault illustrated in FIG. 2C), the processing system 104 may set a digital output of the COM port 164 that is conducted by the digital signal conductor 404 to activate the bypass valve 402.

In some implementations, the meter 102 may be bypassed to prevent an interruption in the flow of gas through the gas line 106. For example, high dP measurements may indicate that the meter 102 is malfunctioning (e.g., wear or interference in the bearings due to contamination or particulate matter in the line) and possibly impeding the flow of gas through the gas line 106. By detecting the high dP condition, the flow measurement system 400 may engage the bypass valve 402 to bypass the malfunctioning meter 102, thereby removing an impediment to the gas flowing though the gas line 106.

In some embodiments, the gas line 106 may include a shutoff valve that may be activated by a digital signal. For example, the flow measurement system 400 may detect a high flow rate and differential pressure, and determine that these conditions may be indicative of a leak in the meter 102 or downstream a break in the gas line 106. The flow measurement system 400 may respond to the measured flow and pressure readings by activating the shutoff valve to stop the leak.

In some embodiments, a mathematical model may be used to characterize the relation between dP and other parameters (e.g., flow rate, line pressure, temperature, specific gravity) in the flow measurement system 400. The mathematical model may include a coefficient that may be related to the particular size and type of meter for which the mathematical model is to be implemented. In some embodiments, the coefficient may be learned over a period of time, such as approximately one year, by measuring various pressure and flow rate value combinations that occur during the learning period.

In some embodiments, the flow measurement system 400 may use default coefficients to calculate dP during the learning period, and use learned coefficients to calculate dP after the learning period has elapsed. In some embodiments, at the end of the learning period the learned coefficients may be compared to the default values to determine if the learned values should be used for calculating subsequent values of dP. For example, if at the end of the learning period the learned coefficient values and the default values differ greatly, an alarm may be set to indicate that the learned values may be faulty. In some embodiments, the flow measurement system 400 may continue to use the default coefficient values for dP calculations if the learned values appear to be faulty. For example, the flow measurement system 400 may store faulty coefficients if there is a malfunction in the flow meter 102 during the learning period.

The ranges of measured combinations of pressure and flow values can define a mathematical "surface" of coefficient values. In some embodiments, the range of combined vales may be divided into smaller areas, where each area may be represented by a single coefficient value. For example, the coefficient value that represents an area may be calculated by averaging all the coefficient values included within the area. In some embodiments, the range of flow rate values may be separated into two ranges by flow rate threshold, and the range of pressure values may be separated by a pressure threshold. Although the described example results in four regions and four coefficient values (e.g., 2 flow ranges multiplied by 2 pressure ranges equals 4 regions), other examples may use other criteria to define one, two, three, four, five, or more ranges wherein each range is associated with a representative coefficient value.

In some implementations, measured pressure and flow values may be used to determine which of the learned coefficient values to use for calculating dP. The dP value that is calculated from the measured pressure and flow values may be compared to a theoretical dP value. In some embodiments, an alarm may be set when the measured dP value and the theoretical dP values differ by more than a predetermined amount. For example, a high differential pressure may cause the flow measurement system to set a visual indicator or alarm, audible alarm, communicate the alarm to another device, change an output, and/or provide some other indication of the alarm condition. In some implementations, the high pressure alarm may be used to trigger the opening and/or closing of valves, such as a bypass or shutoff valve.

In some implementations, the flow measurement system 400 may detect relatively smaller and progressive changes in dP measurements, and set a high pressure alarm. For example, a gradual increase in the calculated dP measurement may set an alarm that indicates that the flow measurement system 400 may need repair. Although high pressure fault, high pressure alarm, and faulty learned data events have been described, in some embodiments the flow processing system may also set other alarms. For example, the flow measurement system 400 may set an alarm if a differential pressure transducer appears to have failed.

Figure 5:
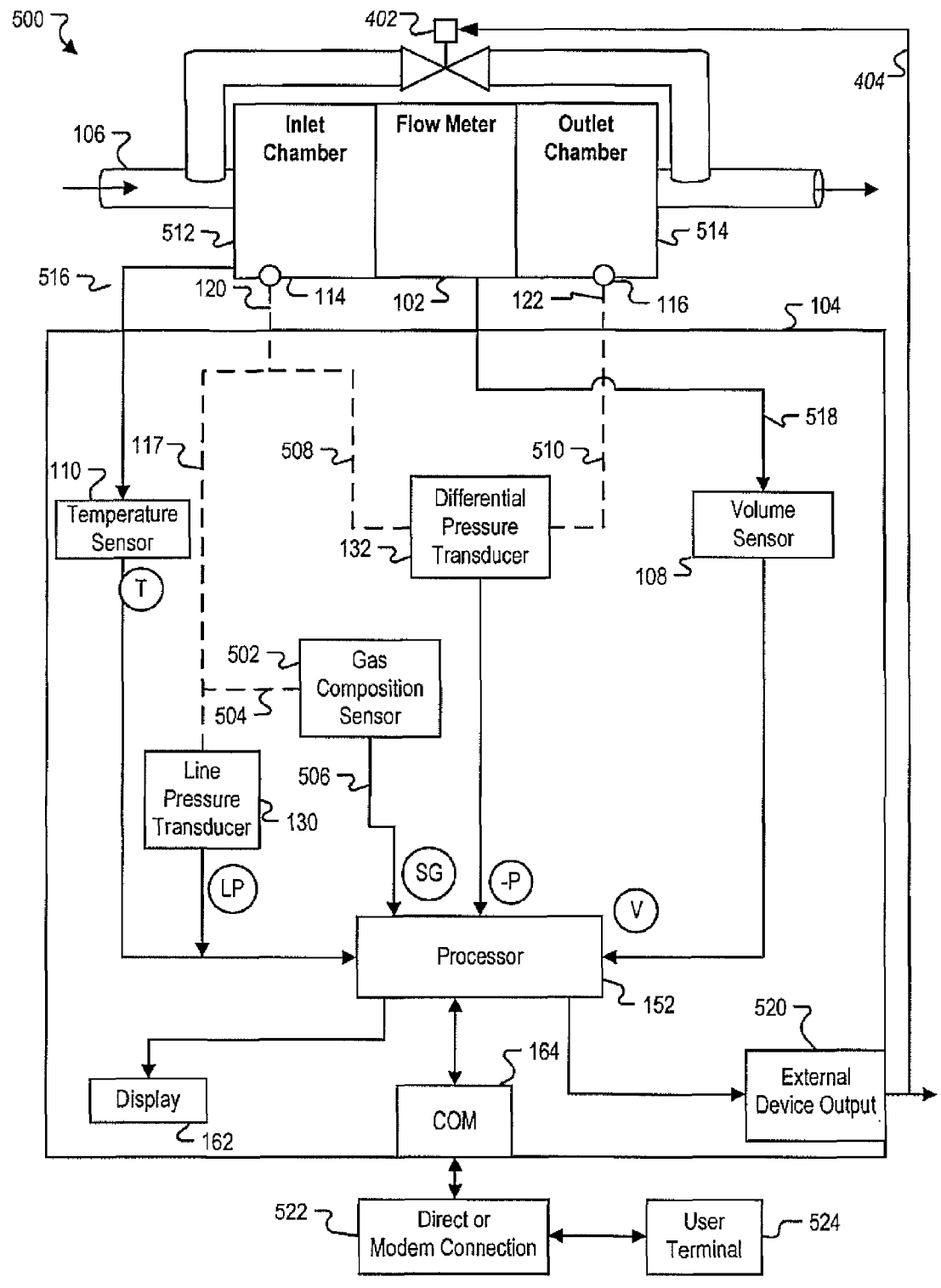
FIG. 5 shows an example flow measurement system used to measure a differential pressure of a volume of gas flow in a gas distribution system that includes a gas composition sensor.

FIG. 5 shows an example flow measurement system 500 configured to measure a differential pressure of a volume of gas flow in a gas distribution system. The flow measurement system 500 as depicted in FIG. 5 is generally similar to the flow measurement system 400 depicted in FIG. 4, but it includes a gas composition sensor 502 to provide certain information about the fluid characteristics that can be incorporated into the baseline dP characterization process. In operation, the flow measurement system 500 may advantageously develop improved dP characteristics over a wide range of gas compositions. Examples of a flow measurement system 500 are described with reference to FIG. 1 in U.S. Pat. No. 7,295,934 issued to Hairston on Nov. 13, 2007 and with reference to FIG. 1 in U.S. patent application Ser. No. 11/870,758, filed by Hairston on Oct. 11, 2007.

The flow measurement system 500 includes a fluid line 504 branching from the pneumatic line 117 to the gas composition sensor 502, an output 506 from the gas composition sensor 502 to the processor 152, and restricted coupling paths 508, 510 to provide fluid communication from the inlet pressure port 114 and the outlet pressure port 116 to the corresponding inputs of the differential pressure transducer 132.

The flow measurement system 500 further includes an inlet chamber 512 to which the inlet pressure port 114 attaches, an outlet pressure port 514 to which the outlet pressure port 116 attaches, a temperature signal probe 516 that provides signals related to temperature from the inlet chamber 512 to the temperature sensor 110, and a volume signal probe 518 the provides signals related to volume from the flow meter 102 to the volume sensor 108. The inlet chamber 512 is located along the gas line 106 further upstream of the flow meter 102. The outlet chamber 514 is located along the gas line 106 further downstream of the flow meter 102.

In the flow measurement system 500, measurements of temperature, line pressure, specific gravity, differential pressure, and volume are provided from the temperature sensor 110, the line pressure transducer 130, the gas composition sensor 502, the differential pressure transducer 132, and the volume sensor 108, respectively, to the processor 152. The processor 152 is able to provide output to the display 162 and is able to provide output to an external device output 520. The processor 152 is further able to send and receive communication from COM port 164.

The flow measurement system 500 also includes the external device output 520 that receives input from the processor 152 and controls external devices (e.g., bypass valve 402) through a signal conductor (e.g., digital signal conductor 404), a direct or modem connection 522 that is able to send and receive communication from the COM port 164, and a user terminal 524 that is able to send and receive communication from the direct or modem connection 522.

Gas composition sensor 502 measures the composition of the gas flowing through the flow meter 102 via the pneumatic tube 504. The output 506 from the gas composition sensor 502 can be provided to the processor 152. The output 506 from the gas composition sensor 502 can be used to characterize the dP of flow meter 102 using a mathematical model, either alone or in tandem with other measured parameters (e.g., flow rate, line pressure, temperature). In some implementations, the output 506 from the gas composition sensor 502 can relate to a measure of specific gravity. In some implementations, the output 506 from the gas composition sensor 502 can relate to a content of nitrogen gas. In some implementations, the output 506 from the gas composition sensor 502 can relate to a measure of gas composition (e.g., a measure of molecular weight).

In some implementations, the gas composition sensor 502 measures specific gravity. An example specific gravity sensor is disclosed with reference to FIG. 2 in U.S. Pat. No. 3,855,845 to Homolka (issued Dec. 24, 1974). Specific gravity relates the molecular weight of a gas to the molecular weight of air at standard temperature and pressure. For example, a typical value of specific gravity for air is 1.0 and a typical value of specific gravity for natural gas is 0.6. A specific gravity measurement by gas composition sensor 502 can be used to characterize the dP of flow meter 102 using a mathematical model, either alone or in tandem with other measured parameters (e.g., flow rate, line pressure, temperature).

In some implementations, the gas composition sensor 502 is not included in the flow measurement system 500. In such implementations, a specific gravity value for the gas flowing through the gas line 106 and the flow meter 102 may be provided from an external source. For example, the specific gravity value for gas flowing through the flow meter may be provided to the flow measurement system 500 by a gas company supplying gas for the gas line 106.

Restricted coupling paths 508, 510 are provided to in flow measurement system 500 instead of adjoining restrictor elements (170, 172) and pressure limiting valves (174, 176). Both the restricted coupling paths 508, 510 and restrictor elements (170, 172) and pressure limiting valves (174, 176) can protect the differential pressure transducer 132 from damage due to sudden increases and decreases in line pressure. The restricted coupling paths 508 and 510 can be used as a substitute for restrictor elements (170, 172) and pressure limiting valves (174, 176).

The restricted coupling paths 508 and 510 can be of a sufficient length such that the gas contained within the restricted coupling paths 508 and 510 provides a protective buffer to sudden changes in pressure from the flow meter. For example, the restricted coupling paths 508 and 510 may be composed of ⅛" stainless steel tubing that is 0.5 meters in length. The length of the restricted coupling paths 508 and 510 may vary depending on the size and type of the flow meter 102. In some examples, the restricted coupling paths may be implemented as coiled lengths of flexible tubing of sufficient turns to achieve the desired attenuation of pressure transients in the gas in the meter 102.

Inlet chamber 512 and outlet chamber 514 may provide the sensors 108, 110, 502 and transducers 130, 132 with access to the gas line 106, so as to permit measurement of conditions within the gas line 106. In some implementations, the inlet chamber 512 and the outlet chamber 514 are located in a housing with and/or attached to the flow meter 102. In such implementations, the inlet chamber 512 is located adjacent and upstream the flow meter 102 and the outlet chamber 514 is located adjacent and downstream the flow meter 102. The gas line 106 may connect to the inlet chamber 512, permitting flow from the gas line 106 through the inlet chamber 512, the flow meter 102, and the outlet chamber 514, sequentially.

In some implementations, the inlet chamber 512 and the outlet chamber 514 are separate from the flow meter 102. In such implementations, the gas line 106 may be connected to the flow meter 102, permitting flow from the gas line 106 through the flow meter 102. The inlet chamber 512 and the outlet chamber 514 may be mounted on the gas line 106, with the inlet chamber 512 on the upstream side and the outlet chamber 514 on the downstream side of the flow meter 102. The inlet and outlet chambers 512, 514 may each be mounted over an opening in the gas line 106. In such implementations, the closer the inlet and outlet chambers 512, 514 are mounted to flow meter 102, the more accurately measurements taken via the inlet and outlet chambers 512, 514 may diagnose the flow meter's 102 condition.

In such implementations, the inlet and outlet chambers 512, 514 may be mounted for the purpose of permitting flow meter diagnostic processing for a flow meter 102 which previously did not have a capability to perform diagnostic processing. The inlet and outlet chambers 512, 514, along with the processing system 104, may be mounted at or after the flow meter 102 is installed. For example, an inlet chamber 512 and an outlet chamber 514 may be mounted on a gas line 106 near a flow meter 102 several months after installation of the flow meter 102 in order to provide diagnostic processing for the flow meter 102.

The temperature signal probe 516 may provide a signal from a sensor capable of producing a temperature signal that is located in the inlet chamber 512. The signal produced may be digital or analog. In some implementations, the sensor capable of producing a temperature signal may be a resistance temperature device. In some implementations, the sensor capable of producing a temperature signal may be a semiconductor type sensor capable of transmitting a digital and/or analog signal to the processor 152.

The volume signal probe 518 may provide a signal from a sensor that is located within the flow meter 102 and that is capable of monitoring the rotation of the impellers within the flow meter 102. The signal produced may be digital or analog. In some implementations, the sensor may be a Hall Effect Sensor. In some implementations, the sensor may be a Wiegand Sensor.

Similar to the link 118, described in FIGS. 1 and 4, the temperature signal probe 518 and the volume signal probe 520 may carry analog and/or digital signals from sensors within the inlet chamber 512 and the flow meter 102, respectively. The means of carrying the signals may include wired (e.g., wire harness, cable) and/or wireless (radio frequency, optical fiber, infrared, Bluetooth, cellular) data communication and a suitable communication protocol (e.g., RS-232, proprietary or custom protocol). The data link 118 may provide unidirectional data flows from the meter 102 to the system 104, or communications may be bi-directional, including control commands from the system 104 to the meter 102.

The external device output 520 can control devices external to the processing system 104 by outputting a digital and/or analog signal. The external device output 520 may receive instructions from the processor 152 regarding the signal and/or the external device to which the signal is to be sent. For example, the external device output 520 may, in response to an instruction from the processor 152, send a digital signal along the digital signal conductor 404 to the bypass valve 402 that causes the bypass valve to open. In some implementations, the external device output 520 may also receive a signal from an external device. The received signal may indicate the condition of the external device (e.g., awaiting instruction, out of service, bypass valve is presently closed, etc.) and/or a status of instructed task (e.g., bypass valve successfully opened).

The director or modem connection 522 can provide interaction between the processing system 104, via the COM port 164, and the user terminal 524. In some implementations, the connection 522 may be a port to which a mobile user terminal 524 is physically connected. In some implementations, the connection 522 may be a wireless modem capable of wirelessly communicating, directly or indirectly, with the user terminal 524. In some implementations, the connection 522 may be a wired modem capable of wired communication, direct or indirect, with the user terminal 524.

In some implementations, the user terminal 524 may be a computer terminal that is part of a monitoring station. In some implementations, the user terminal 524 may be a portable device, such as a laptop computer or a handheld device. In some implementations, the user terminal 524 may be a server.

In some implementations, the user terminal 524 may be capable of monitoring and receiving communication regarding multiple meters 102. In some implementations, the user terminal 524 may be capable of viewing present and past sensor and transducer readings for a meter 102. In some implementations, the user terminal 524 may be capable of viewing and/or adjusting present mode of each meter (e.g., learning mode, diagnostic mode, etc.). In some implementations, the user terminal 524 may be capable of viewing and or adjusting the present dP characteristic (e.g., the relationship of parameters used to calculate a theoretical dP) and associated coefficient that is being used by the meter. In some implementations, the user terminal 524 may be capable of viewing and or adjusting the other coefficients that are used in the calculation of a theoretical dP and/or a dP threshold (e.g., an alarm factor, a warning factor, a maximum dP offset value, a dP offset value limit, an overspeed threshold, a number of measurements for learning to be successful, a time within which learning is to be completed, a desired temperature range, etc.).

In some implementations, the processing system 104 may be enclosed within a housing that is separate from the flow meter 102 and/or the inlet and outlet chambers 512, 514. In such an implementation, the processing system 104 may be replaceable with another processing system 104. In some implementations, the processing system 104 may be configured so as to allow the replacement of a sensor (e.g., the volume sensor 108, the temperature sensor 110, the gas composition sensor 502, etc.) and/or a transducer (e.g., the line pressure transducer 130, the differential pressure transducer 132) within the processing system 104. For example, processing system 104 may be configured so as to allow a technician, who has been notified of a problem with the differential pressure transducer 132 via the user terminal 524, to replace the differential pressure transducer 132.

In some embodiments, a mathematical model may be used to characterize the relation between dP and one or more other parameters (e.g., flow rate, line pressure, temperature, specific gravity) in the flow measurement system 500. The mathematical model may include a coefficient that may be related to the particular size and type of meter for which the mathematical model is to be implemented. The mathematical model may also include a coefficient (in some implementations, the mathematical model may include multiple coefficients) for the parameter used to create the model (e.g., flow rate, line pressure, temperature, specific gravity), wherein the coefficient may be related to the particular size and type of meter for which the mathematical model is to be implemented. In some embodiments, the coefficient may be learned over a period of time, such as approximately one year, by measuring various pressure and flow rate value combinations that occur during the learning period. This learning period may be called an extended learning period.

In some embodiments, the flow measurement system 500 may use default coefficients to calculate dP during the learning period, and use learned coefficients to calculate dP after the learning period has elapsed. In other embodiments, the flow measurement system 500 may not have default coefficients available. In such an embodiment, the flow measurement system 500 may enter a rapid learning period during which coefficients to calculate dP are learned over a short period of time (e.g., about one hour, day, week, month, three months). If the rapid learning is successful, then the system 500 may enter the extended learning period, during which the coefficients learned during the rapid learning period may be used for fault and/or lock-up checking.

In some embodiments, the rapid learning period may only be deemed successful if a predetermined number of measurements have been used to create the coefficients to calculate dP. In some implementations, a measurement may only be used when the measured temperature is within a predefined range and/or there has not been a change in pressure from the previous reading greater than a threshold amount (e.g., pressure has not increased or decreased by more than 10 psi). If the rapid learning period is deemed unsuccessful and default coefficients are not available, then the system 500 may indicate that it is unable to operate by generating, for example, a visible indicator message, or a digital maintenance request message for transmission via the COM port 164.

If the rapid learning period is used, the extended learning period may modify the dP coefficients from the rapid learning period and/or it may create new dP coefficients independent from the rapid learning coefficients. In some embodiments, at the end of the learning period the learned coefficients may be compared to the default values and/or the rapid learned values to determine if the learned values should be used for calculating subsequent values of dP. For example, if at the end of the learning period the learned coefficient values and the default values and/or the rapid learned values differ greatly, an alarm may be set to indicate that the learned values may be faulty. In some embodiments, the flow measurement system 500 may continue to use the default coefficient values or the rapid learned coefficient values for dP calculations if the learned values appear to be faulty. For example, the flow measurement system 500 may store faulty coefficients if there is a malfunction in the flow meter 102 during the learning period.

The ranges of combinations of measured parameters (e.g., pressure, temperature, flow rate, and specific gravity) can define a multi-dimensional mathematical "surface" of coefficient values. In some embodiments, the range of combined values may be divided into smaller segments, where each area may be represented by a single coefficient value. The coefficient value that represents a segment may be calculated by averaging all the coefficient values included within the segment. The total number of coefficients can be a function of the number of parameters and the number of ranges per parameter. For example, if there are two ranges of pressure, temperature, flow rate, and gas composition, there could be 16 total segment and 16 corresponding coefficient values (e.g., 2 flow ranges multiplied by 2 pressure ranges multiplied by 2 temperature ranges multiplied by 2 gas composition ranges equals 16 regions).

In some embodiments, the number of ranges per parameter may be determined during and/or after learning of dP coefficients. In such an embodiment, determination of ranges may be based upon the distribution of readings taken during the learning period and there may be distributions of unequal size. In other embodiments, the number of ranges may be predetermined. Other examples may use other criteria to define one, two, three, four, five, 10, 20, or more ranges for each parameter.

In some implementations, measured pressure, temperature, flow rate, and/or gas composition values may be used to determine which of the learned coefficient values to use for calculating a theoretical dP. The theoretical dP value that is calculated may be compared to the dP value measured by the differential pressure transducer 132. In some embodiments, when the measured dP value and the theoretical dP values differ by more than a threshold amount, an alarm and/or warning may be generated. In some embodiments, a measured differential pressure in excess of the threshold may cause the flow measurement system 500 to set a visual indicator. In other embodiments, a measured differential pressure in excess of the threshold may cause the flow measurement system 500 to set an audible alarm. In other embodiments, a measured differential pressure in excess of the threshold may cause the flow measurement system 500 to communicate a digitally encoded alarm message to another processor-based device. In other embodiments, a measured differential pressure in excess of the threshold may cause the flow measurement system 500 to display a message in display 162 regarding the measured differential pressure exceeding the threshold. In some implementations, a measured differential pressure in excess of the threshold may actuate an external device. For example, an external bypass valve may open. In another example, a shutoff valve in line with the gas line 106 may be closed.

Figure 6A:
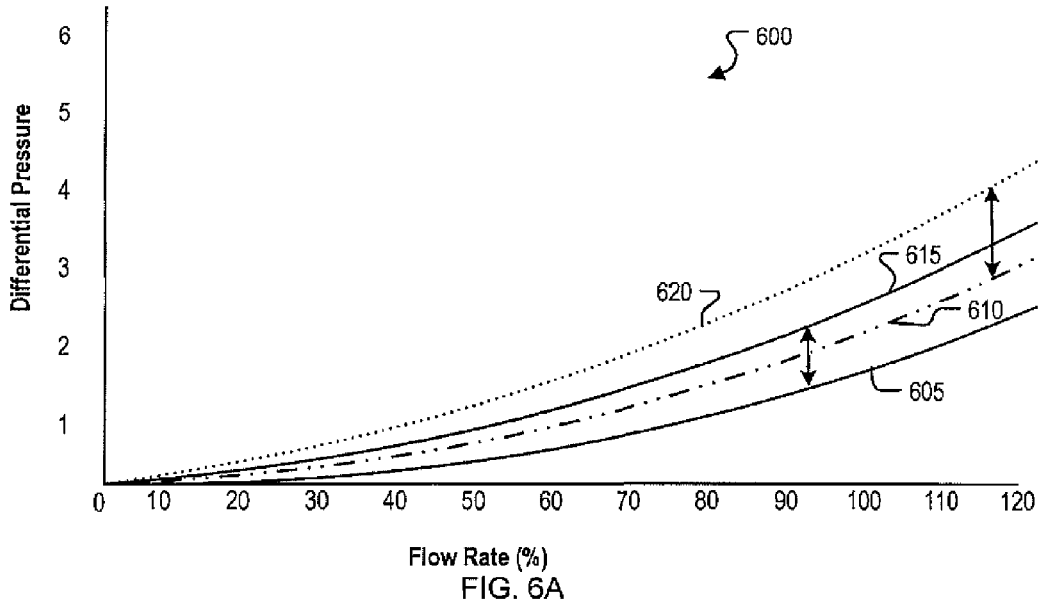
FIGS. 6A and 6B show example predetermined and learned dP characteristics on differential pressure to flow rate graphs.
Figure 6B:
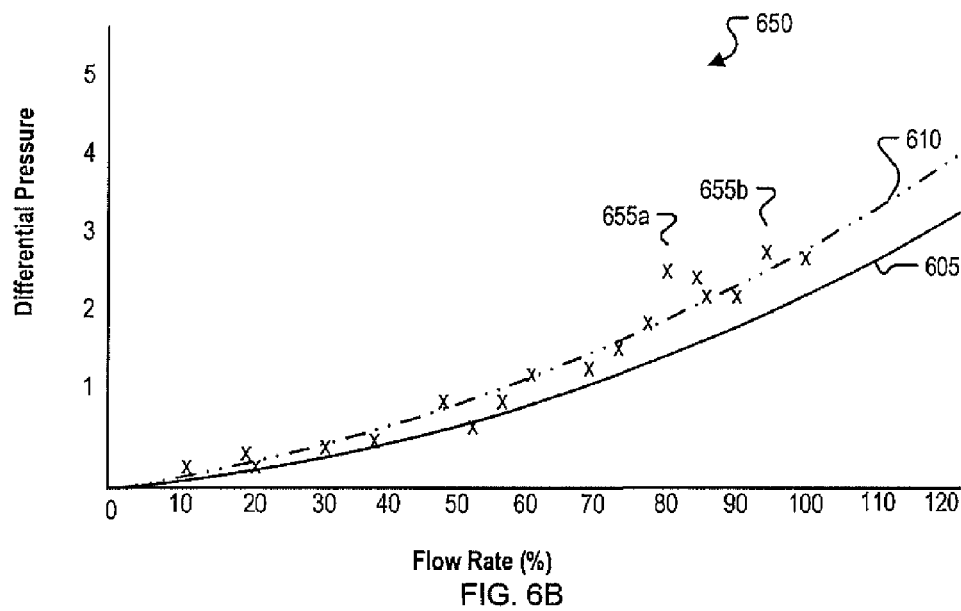

FIGS. 6A and 6B show example predetermined and learned dP characteristics on differential pressure to flow rate graphs 600 and 650, respectively. Graphs 600 and 650 provide a simplified depiction of dP characteristics that may be learned and subsequently used for self-diagnostic monitoring over a particular parameter space as measured by, for example, the flow measurement systems 100, 400, or 500. Examples of predetermined and learned dP characteristics on differential pressure to flow rate graphs 600 and 650 are described with reference to FIGS. 2 and 7 in U.S. Pat. No. 7,295,934 issued to Hairston on Nov. 13, 2007 and with reference to FIGS. 2 and 7 in U.S. patent application Ser. No. 11/870,758, filed by Hairston on Oct. 11, 2007.

Depiction of dP characteristics in graphs 600 and 650 is simplified by assuming that any parameters other than flow rate that may be used to calculated dP (e.g., temperature, pressure, specific gravity) are constant. A multi-dimensional graph may be used to depict dP characteristics wherein none of the parameters used to calculate dP (e.g., flow rate, temperature, pressure, and specific gravity) are constant. For example, graphs 600 and 650 can be a multi-dimensional graphs depicting dP as being a function of flow rate, temperature, pressure, and specific gravity.

FIG. 6A shows example dP characteristics and thresholds on a differential pressure to flow rate graph 600. The depicted example characteristics on graph 600 are a predetermined dP characteristic 605 and a learned dP characteristic 610. The predetermined dP characteristic 605 corresponds to a characteristic determined prior to installation of, for example, any of the flow measurement system 100, 400, or 500. In particular, the learned dP characteristic 610 corresponds to a characteristic determined during the rapid and/or extended learning period. The predetermined dP characteristic 605 and the learned dP characteristic 610 may be stored, for example, in the NVM 154.

In some implementations, the predetermined dP characteristic 605 and the learned dP characteristic 610 are defined by the same relationship amongst parameters (e.g., pressure, temperature, flow, specific gravity, etc.) but differ based upon a coefficient value. For example, if the predetermined dP characteristic 605 and the learned dP characteristic 610 are both defined by the equation dP=coefficient×pressure× flow$^2$×specific gravity×temperature$^{-1}$, then dP characteristic 605 and the learned dP characteristic 610 will differ based upon their respective coefficient values.

In other implementations, the predetermined dP characteristic 605 and the learned dP characteristic 610 may be defined by different relationships amongst the measured parameters (e.g., pressure, temperature, flow, specific gravity, etc.). The predetermined dP characteristic 605 may be developed from gas laws and laboratory experimentation with the same or a similar flow meter. The learned dP characteristic 610 may be developed using flow meter data collected from use of the flow meter on the gas line over an extended period of time. For example, the predetermined dP characteristic 605 may be defined by the equation dP=coefficient×pressure×flow$^2$×specific gravity×temperature$^{-1}$ and the learned dP characteristic 610 may be defined by the equation dP=coefficient×pressure×flow$^{1.5}$×specific gravity×temperature$^{-2}$.

Graph 600 also depicts a predetermined dP characteristic threshold 615 and a learned dP characteristic threshold 620. The predetermined dP characteristic threshold 615 corresponds to the predetermined dP characteristic 605. The learned dP characteristic threshold 620 corresponds to the learned dP characteristic 610. Thresholds 615 and 620 represent a level above which a dP measurement in the differential pressure transducer 132 will trigger an alarm or warning when either the predetermined characteristic 605 or the learned characteristic 610 is used, respectively, by the processing system 104. In some implementations, thresholds 615 and 620 are determined as a percentage above characteristics 605 and 610, respectively. In other implementations, thresholds 615 and 620 are determined as a quantity above characteristics 605 and 610, respectively.

The predetermined dP characteristic 605 and the learned dP characteristic 610, either alone or in tandem, can be used to calculate dP while the flow measurement system is in learning mode and/or in diagnostic mode. In one example, the predetermined dP characteristic 605 can be used to calculate dP during a learning mode while the learned dP characteristic 610 is being created. In another example, the learned dP characteristic 610 can be used to calculate dP during a learning mode while another learned dP characteristic, not depicted, is created.

In some implementations, the predetermined dP characteristic 605 and the learned dP characteristic 610 may each be defined of multiple, non-overlapping segments such that each segment is independently defined of the other segments. The calculation of dP may be filtered to the segment into which the measured flow rate falls. For example, if learned dP characteristic 610 is defined by four segments evenly spaced across the measured flow rate (0-29, 30-59, 60-89, 90-120) and the flow rate is measured at 44%, the calculation will be filtered to use the second segment.

The filtering of dP calculations to the segment of the predetermined dP characteristic 605 and/or the learned dP characteristic 610 corresponding to the measured flow rate may similarly be extended to multiple measured parameters, as demonstrated by graphs 300, 340, and 370 in FIGS. 3A-3C. Graphs 300, 340, and 370 demonstrate how dP calculations can be filtered to a dP characteristic segment, such as K$_{21}$ in graph 300, based upon the measured flow and pressure. In some implementations, segments of the predetermined dP characteristic 605 and the learned dP characteristic 610 are based upon greater than two measured parameters (e.g., pressure, temperature, flow, specific gravity, etc.). In such an implementation, corresponding graphs 300, 340, and 370 may be multi-dimensional and may depict multi-dimensional filtering of dP calculations to a dP characteristic segment based upon ranges of multiple measured parameters.

In graph 600, if the learned dP characteristic 610 and the learned dP characteristic threshold 620 are being used by one of the flow measurement systems, if the dP measured in differential pressure transducer 132 exceeds the learned dP characteristic threshold 620, then the processor 152 may cause the bypass valve 402 to be opened. For example, if the flow rate and dP are measured to be 80% and 4, respectively, the bypass valve 402 may be opened because the measured dP exceeds the learned dP characteristic threshold 620 (threshold dP of approximately 2.25 at 80% flow).

Graph 650 depicts the creation of the learned dP characteristic 610 based upon multiple measurements, such as 655*a-b*, taken during a learning period. The learned dP characteristic 610 can be created to best fit the measurements, such as measurements 655*a-b*, of differential pressure and flow rate taken by the flow measurement system during a learning period. The predetermined dP characteristic 605 and the predetermined dP characteristic threshold 615 (not depicted in graph 650) can be used to check for alarms and warnings while measurements 655*a-b* are being taken during the learning period.

In some implementations, the learned dP characteristic 610 may be based upon the measurements 655*a-b* by calculating a coefficient value for each measurement and then adding the calculated coefficient value to an average of coefficient values. If multiple segments exist for the learned dP characteristic 610, the calculated coefficient may be added to an average of coefficient values for the segment within which the measurement (e.g., 655*a*) falls.

Segments of the learned dP characteristic 610 can be created and defined based upon the measurements 655*a-b*. In one implementation, segments may be dynamically defined by the distribution of measurements 655*a-b*. For example, if one segment is defined for every six measurements 655*a-b*, then the segments for the learned dP characteristic 610 would approximately be 0-48%, 49-78%, 79-120%, In another implementation, the ranges for segments can be predefined and segments of the learned dP characteristic 610 can be used once a threshold number of measurements 655*a-b* within a range have been taken. For example, if the predefined segments are 0-19%, 20-39%, 40-59%, 60-79%, 80-99%, and 100-120% and the threshold number of measurements within a segment is five, then only the segment 80-99% would be ready to use because it is the only segment with at least five measurements 655a-b within its range. In such an instance, the flow measurement system may use the segment from 80-99% from the learning dP characteristic 610, use the predetermined dP characteristic 605 for all other ranges, and continue learning for each segment with a number of measurements less than five.

In some implementations, a transition from using the predetermined dP characteristic 605 to using a segment from the learning dP characteristic 610 may occur once the number of measurements for a segment has reached a predetermined threshold number of measurements. In some implementations, the number of measurements 655a-b for each segment can be checked against the threshold number of measurements at a time interval to determine which of the segments of the learned dP characteristics 610 are ready to be used.

Figure 7:
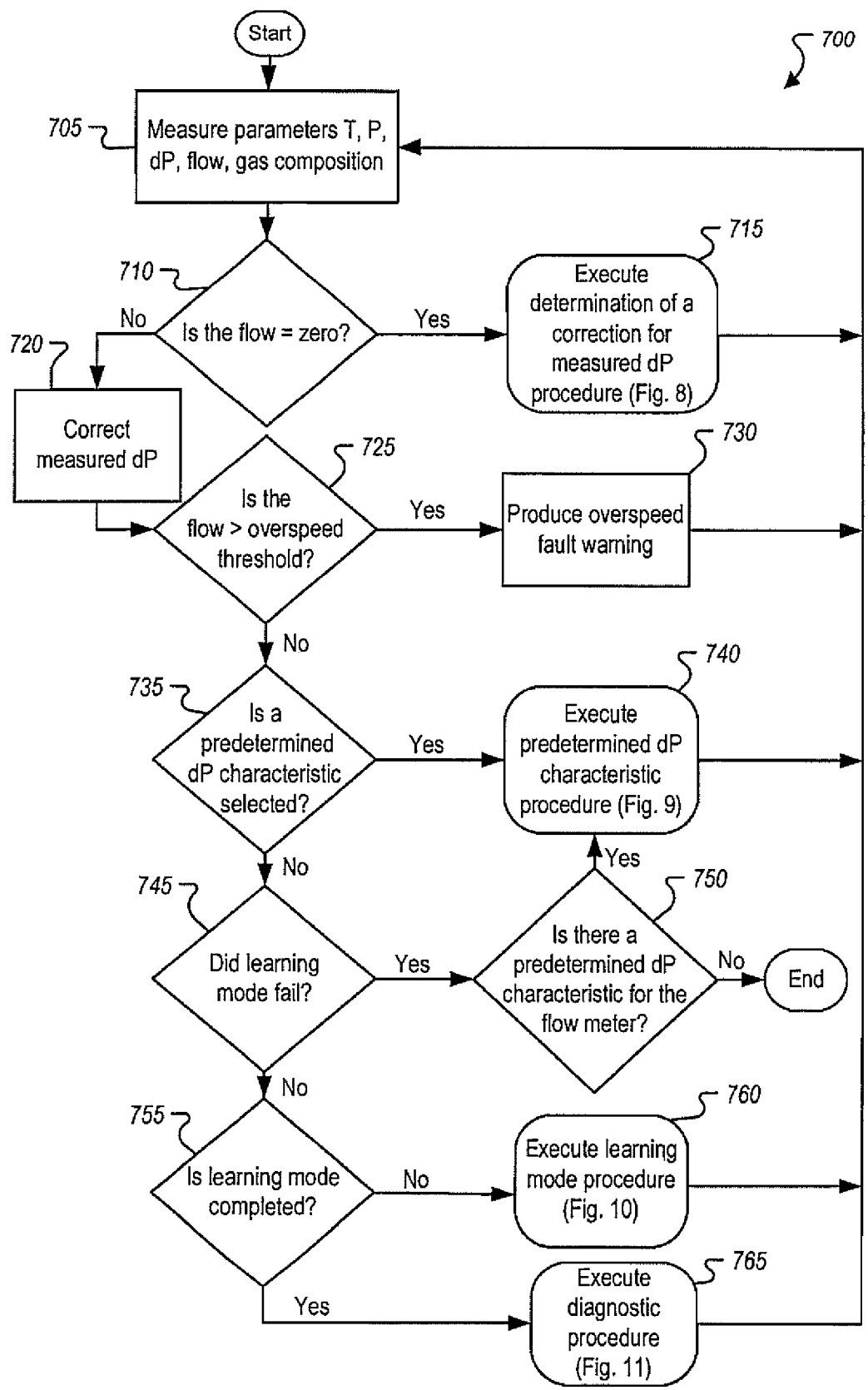
FIG. 7 is a flow chart that illustrates an example learning and diagnostic process for a flow measurement system.

FIG. 7 is a flow chart that illustrates an example learning and diagnostic process 700 for a flow measurement system. Process 700 may be stored in NVM 154 and can be executed by processor 152. Process 700 begins at step 705 by measuring parameters temperature, pressure, differential pressure, flow rate, and gas composition. Measurements at step 705 may be taken by the temperature sensor 110, the volume sensor 108, the line pressure transducer 130, the differential pressure transducer 132, and/or the gas composition sensor 502. Examples of a learning and diagnostic process 700 are described with reference to FIGS. 5-6 in U.S. Pat. No. 7,295,934 issued to Hairston on Nov. 13, 2007 and with reference to FIGS. 5-6 in U.S. patent application Ser. No. 11/870,758, filed by Hairston on Oct. 11, 2007.

Figure 8:
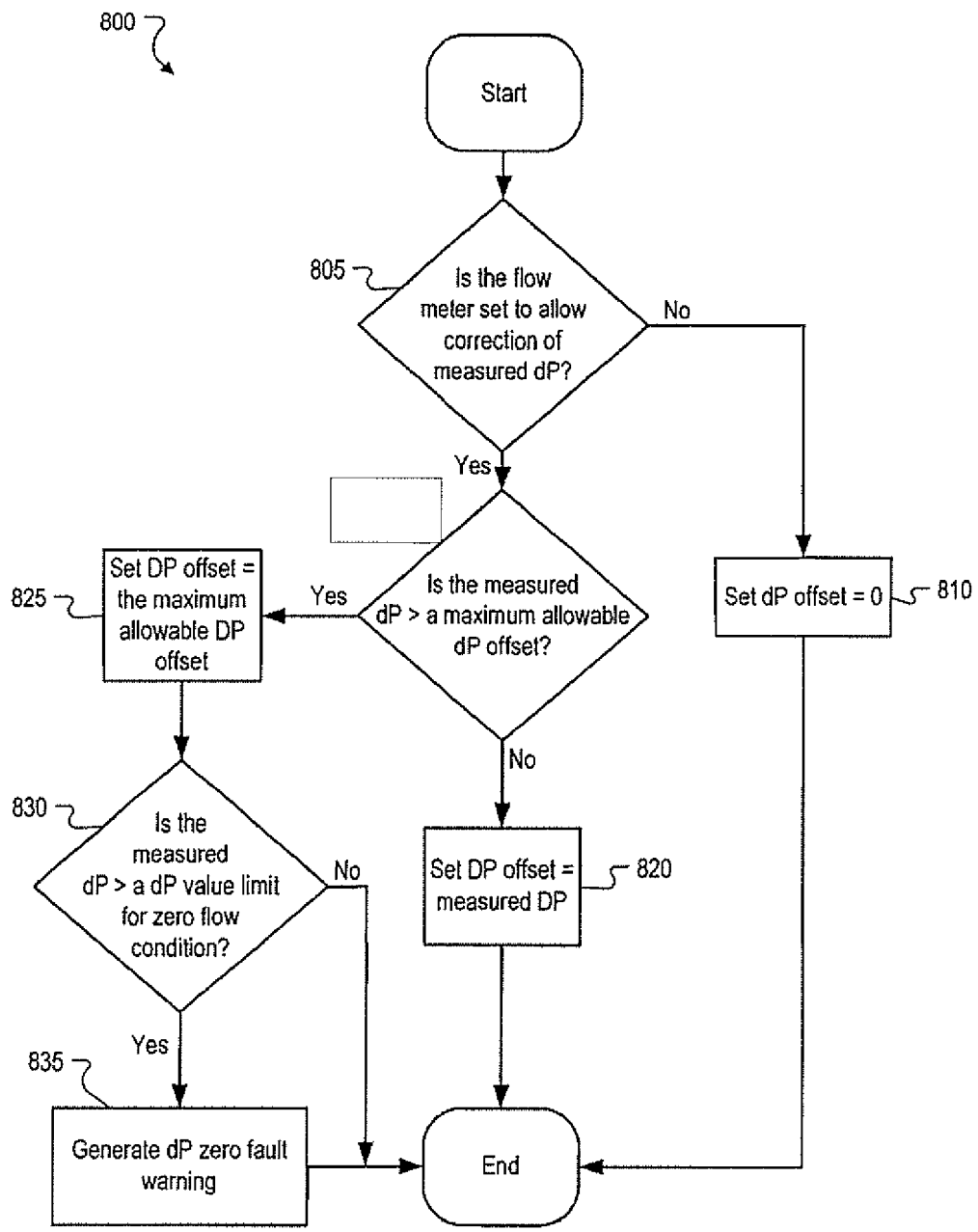
FIG. 8 is a flow chart that illustrates an example dP zero offset process which operates to determine a dP value against which dP measurements in the differential pressure transducer should be offset.

Process 700 then determines whether the flow rate is equal to zero at step 710. If the flow rate is equal to zero, then process 700 executes a determination of a correction for measured dP procedure, as depicted in FIG. 8, at step 715. After determining a correction for measured dP value at step 715, process 700 returns to step 705 to measure parameters. If the flow rate is not equal to zero, then process 700 corrects the measured dP value at step 720. Correction of the measured dP value may be determined at step 720 by subtracting the dP measured in step 705 from a dP offset, which can be initialized before step 705 and adjusted in step 715. The initial dP offset used at step 720 to correct measured dP can be zero (e.g., step 715 is not executed before step 720).

In an implementation where the gas flow meter is a rotary meter, determination of whether the flow rate is equal to zero at step 710 may be performed by determining whether the set of impellers within the flow meter have rotated, even a fraction of a full rotation, within a time period. If the impellers have not rotated within the time period, then process 700 determines the flow rate is equal to zero.

In some implementations, determination of whether the impellers have rotated may be performed using a flow meter that produces multiple magnetic pulses for each revolution of the impellers, such as flow meter containing a Dresser Integrated Micro Corrector Series, Models IMC/W2. In such an implementation, process 700 determines the flow is equal to zero if no pulses are registered during the time period. For example, using a meter that produces 6 magnetic pulses for each full rotation of the impellers, if one pulse is received during the time period, then process 700 will determine the flow is not equal to zero.

The time period within which step 710 may determine whether the impellers have rotated may be defined as a time before step 705 to a time after step 705. In some implementations, the time period may be a time from a previous parameter measurement to a subsequent parameter measurement. For example, if parameters are measured every 30 seconds and step 705 is performed at time X, then the time period may 60 seconds, which is a time from a previous parameter measurement (X−30 seconds) to subsequent parameter measurement (X+30 seconds).

Throughout the learning and diagnostic procedures that are executed from process 700, continuous monitoring of whether a zero flow condition exists permits the process 700 to adjust a value used to correct the measured dP, at step 715, whenever a zero flow condition exists at step 710. Correction of the measured dP may adjust for a common mode pressure offset that may be characterized as inaccuracy of a differential pressure transducer. A common mode pressure offset can be a static differential pressure error that exists when line pressure is supplied to both inputs of the differential pressure transducer. An ideal differential pressure transducer will have a common mode pressure offset equal to zero regardless of the value of other parameters (e.g., temperature, etc.).

The common mode pressure offset can be isolated and detected in a differential pressure reading when the flow rate is equal to zero. The common mode pressure offset of a differential pressure transducer can change over time. In order to compensate for changing common mode pressure offset over the life of the meter 102, process 700 permits dynamic adjustment of the level of correction by executing step 715 whenever the flow is equal to zero at step 710.

For example, average differential pressure measured by a differential pressure sensor may be around 2-3 inches of water column (in WC). A common mode pressure offset may be 1-1.5 in WC. Given that the common mode pressure offset can account for a large percentage of the measured dP, the measured dP should be adjusted to account for common mode pressure offset so as to ensure false alarms and/or warnings are not produced. While common mode pressure offset should be accounted for with regard to all differential pressure transducers, use of a differential pressure transducer with a greater resolution may be preferential for accurately determining the common mode pressure offset. For example, a differential pressure transducer with a resolution of 0.001 or 0.0005 in WC, such as Dresser Measurement Specialty Sensors DP86-001D and DP86-005D, respectively, may determine the common mode pressure offset with sufficient accuracy.

Process 700 then determines whether the flow rate is greater than an overspeed threshold at step 725. Step 725 can be used to determine whether the flow through the meter is moving at a rate fast enough to damage and/or decrease the accuracy of the flow meter 102. The overspeed threshold can be a predetermined value and/or a learned value. If the flow is greater than the overspeed threshold, then process 700 produces an overspeed fault warning at step 730. Producing the overspeed fault warning at step 730 may involve sending an electronic message through the digital signal conductor 404 to a fluid control element external to the meter, such as bypass valve 402. After step 730, process 700 returns to step 705 to measure parameters. In some implementations, gas meter diagnostics in process 700 may end after step 730.

Figure 9:
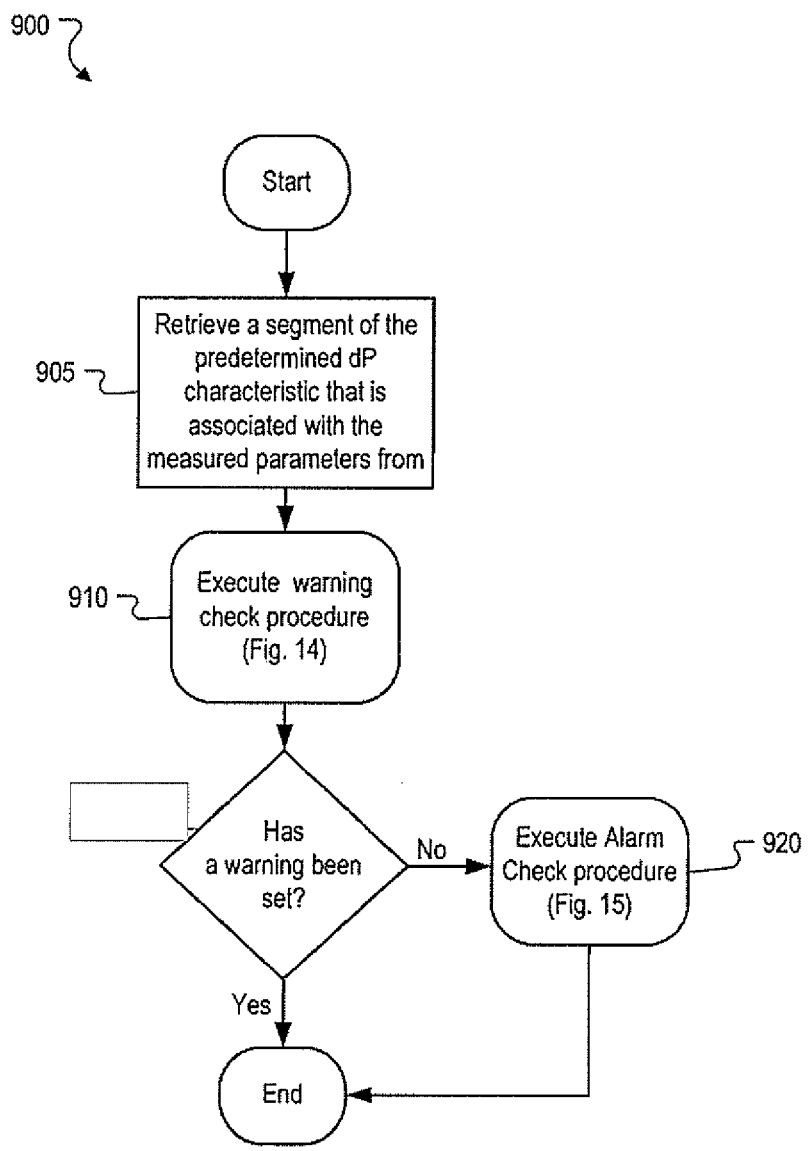
FIG. 9 is a flow chart that illustrates an example process of using a predetermined dP characteristic to check for the presence of warning and alarm conditions in a flow meter.

If the flow is not greater than the overspeed threshold at step 725, then process 700 determines, at step 735, whether a predetermined dP characteristic is selected for use in the diagnostic procedure. The predetermined dP characteristic referenced in step 725 can be the predetermined dP characteristic described in graphs 600 and 650. Selection of a predetermined dP characteristic can occur at a time before step 705 (e.g., default setting) or it can occur afterward (e.g., user selection via COM port 164, selection by processor 152 after execution of process, etc.). If the predetermined dP characteristic is selected, then process 700 executes a predetermined dP characteristic procedure, as depicted in FIG. 9, at step 740. After step 740, process 700 returns to step 705 to measure parameters.

If the predetermined dP characteristic is not selected, then process 700 determines whether learning mode failed at step 745. A learning mode may be conducted by, for example, flow measurement system 100, 400, or 500 to create a learned dP characteristic, such as learned dP characteristic 610. If the learning mode failed, then process 700 determines whether the flow measurement system has a predetermined dP characteristic, such as predetermined dP characteristic 605, for the flow meter 102 at step 750. If there is a predetermined dP characteristic, then process 700 executes the predetermined dP characteristic procedure at step 740. If there is not a predetermined dP characteristic, then process 700 ends—the flow measurement system is without an ability to determine warnings and alarms based upon dP for the flow meter 102.

Figure 10:
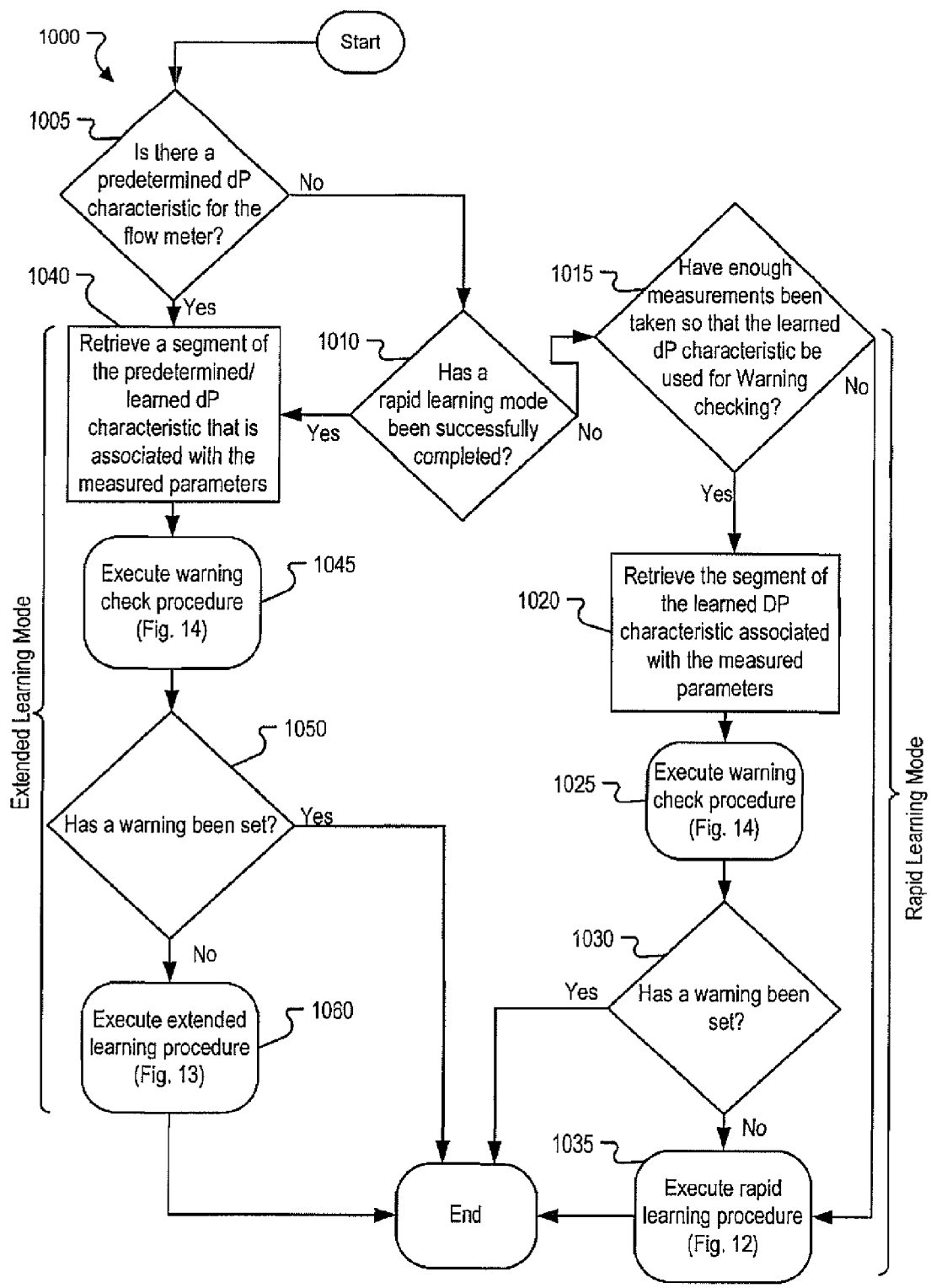
FIG. 10 is a flow chart illustrating an example dP characteristic learning process.

If the learning mode did not fail, then process 700 determines, at step 755, whether the learning mode is completed. If the learning mode is completed, then process 700 executes a learning mode procedure, as depicted in FIG. 10, at step 760. After step 760, process 700 returns to step 705 to measure parameters. If the learning mode is completed, then process 700 executes a diagnostic procedure, depicted in FIG. 11, at step 765. After step 765, process 700 returns to step 705 to measure parameters.

In some implementations, process 700 will delay measuring parameters a predetermined time interval after returning to step 705. For example, after returning to step 705 from step 765, process 700 may wait 30 seconds before measuring parameters. The amount of time delayed before measuring parameters at step 705 may vary depending upon the current mode of the flow measurement system (e.g., learning mode). In some implementations, the time interval is a predefined factory setting. In other implementations, the time interval is received from a source external to the flow measurement system 100, 400, or 500 via the COM port 164. In other implementations, the predefined and/or received time interval may be adjusted by the processor 152, the adjustment being based upon present operating conditions of the flow measurement system 100, 400, or 500.

For example, if for an extended period of time the corrected dP has been within the learned dP characteristic threshold 620 corresponding to the appropriate segment of the learned dP characteristic 610, then the time interval between parameter measurements may be lengthened. Conversely, if the measured dP is near the dP characteristic threshold 620, the time interval between measuring may be shortened. As another example, the time interval may be lengthened or shortened based upon the present supply of power from the power supply 144. If low power is detected, then the time interval may be lengthened. Conversely, if high power is detected, then the time interval may be shortened.

In other implementations, process 700 will continuously measure parameters at step 705 without a delay.

FIG. 8 is a flow chart that illustrates an example determination of a correction for measured dP process 800, which operates to determine a correction value against which dP measurements in the differential pressure transducer 132 should be offset. Process 800 can be executed from step 715 when the flow through the flow meter 102 is zero. A dP offset value determined by process 800 can be used in to corrected a measured dP value in step 720. Other examples of dP zero offset processes are described with reference to FIG. 3 in U.S. Pat. No. 7,295,934 issued to Hairston on Nov. 13, 2007 and with reference to FIG. 3 in U.S. patent application Ser. No. 11/870,758, filed by Hairston on Oct. 11, 2007.

Process 800 starts at step 805 by determining whether the flow meter 102 is set to allow a correction of measured dP. In some implementations, the flow measurement system 100, 400, or 500 is initially configured to not allow a correction of measured dP. In other implementations, the flow measurement system 100, 400, or 500 receives instructions via the COM port 164 to not allow a correction of measured dP. If the flow meter 102 is not permitted to have a correction of measured dP, then the dP offset is set to zero at step 810. After step 810, process 800 ends.

If the flow meter 102 is permitted to have a correction of measured dP, then process 800 determines, at step 810, whether the measured dP is greater than a maximum allowable dP offset. If the measured dP is not greater than the maximum allowable dP offset, then the measured dP becomes the dP offset at step 820—the dP offset is set equal to the measured dP. After step 820, process 800 ends.

If the measured dP is greater than the maximum allowable dP offset, then process 800 uses the maximum allowable dP offset as the dP offset value at step 825—the dP offset is set equal to the maximum allowable dP offset. After step 825, process 800 determines whether the measured dP is greater than a dP value limit for zero flow conditions at step 830. The measured dP being greater than the dP value limit for zero flow conditions may indicate a problem with the flow measurement system. In particular, the problem may be with the differential pressure transducer 132.

In some implementations, the dP value limit for zero flow conditions is a factory predetermined value that is stored in NVM 154. In other implementations, the dP value limit for zero flow conditions is a value received by the flow measurement system from an external source. In other implementations, the dP value limit for zero flow conditions can be a value learned by the flow measurement system and may be based upon a predetermined value and/or a received value.

If the measured dP is not greater than the dP value limit for zero flow conditions, then process 800 ends. If the measured dP is greater than the dP value limit for zero flow conditions, then process 800 generates a dP zero fault warning at step 835. The warning may indicate the differential pressure transducer 132 has a systematic error. Producing the dP zero fault warning at step 835 may involve sending an electronic message through the digital signal conductor 404 to a fluid control element external to the meter, such as bypass valve 402. After step 835, process 800 ends.

FIG. 9 is a flow chart that illustrates an example process 900 of using a predetermined dP characteristic to check for the presence of warning and alarm conditions in the flow meter 102. A warning can indicate a problem with the flow meter 102 that may require immediate attention, such as the flow meter 102 locking-up. An alarm can indicate degradation in performance of the flow meter 102 and can signal the flow meter 102 should be replaced in the near future. Process 900 can be executed from step 740 of process 700. Examples a process 900 of using a predetermined dP characteristic to check for the presence of warning and alarm conditions are described with reference to FIG. 6 in U.S. Pat. No. 7,295,934 issued to Hairston on Nov. 13, 2007 and with reference to FIG. 6 in U.S. patent application Ser. No. 11/870,758, filed by Hairston on Oct. 11, 2007.

Process 900 begins, at step 905, by retrieving a segment of the predetermined dP characteristic associated with the parameters measured in step 705 (e.g., pressure, temperature, flow, specific gravity). For example, if there are 16 segments of the predetermined dP characteristic (e.g., the range for each parameter is divided into 2 segments, the total number of segments is equal to $2^4$ (number of segments^number of parameters)), the one segment into which all of the measured parameters fall will be retrieved. In some implementations, the predetermined dP characteristic may not be comprised of segments. In such an implementation, the entire dP characteristic is retrieved. Retrieval can involve retrieving a dP coefficient and/or the relationship among the dP parameters (e.g., the equation for calculating dP based upon the parameters).

Figure 14:
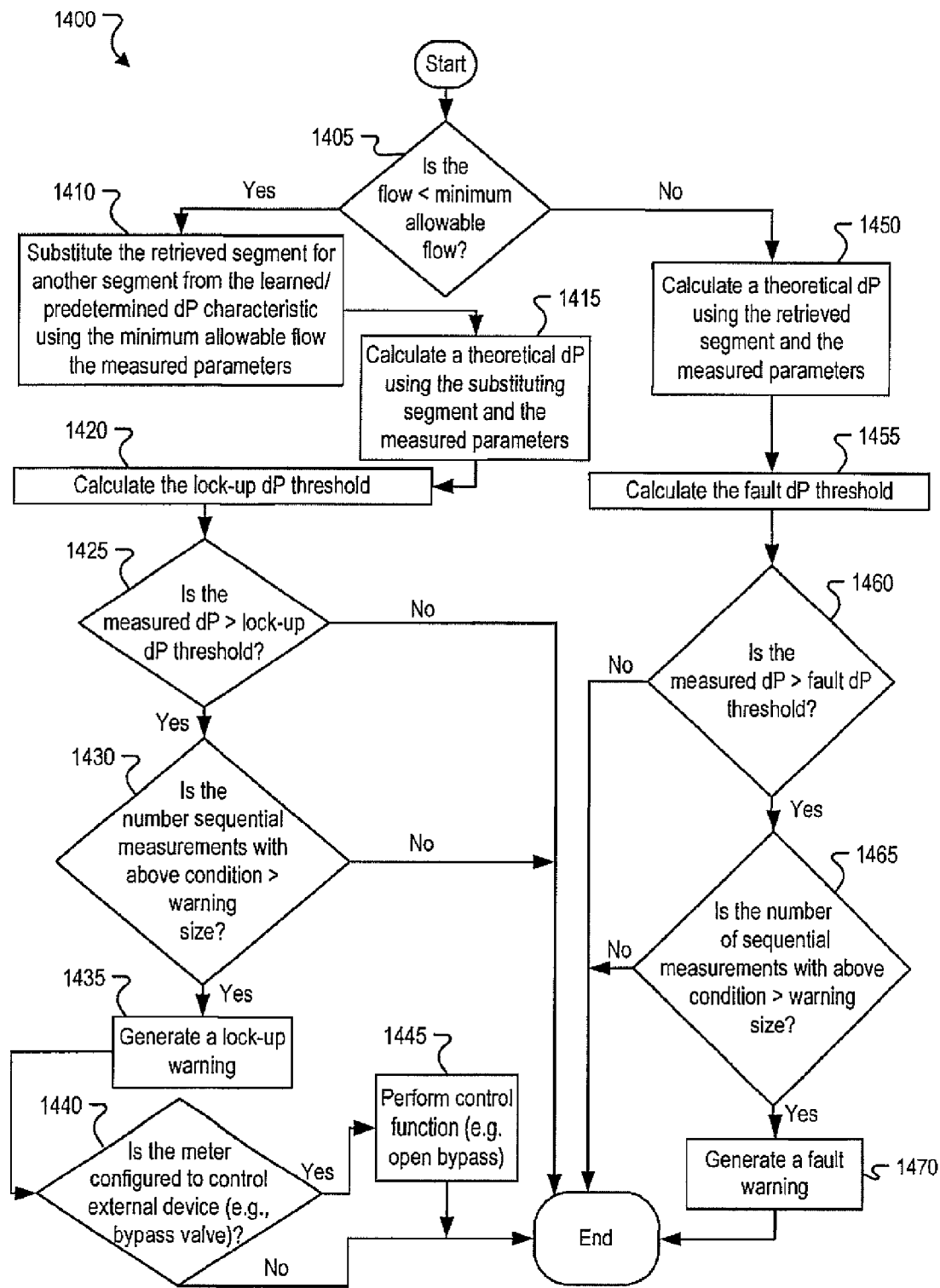
FIG. 14 is a flow chart illustrating an example warning check procedure that determines whether a lock-up or a fault warning condition exists in a flow meter.
Figure 15:
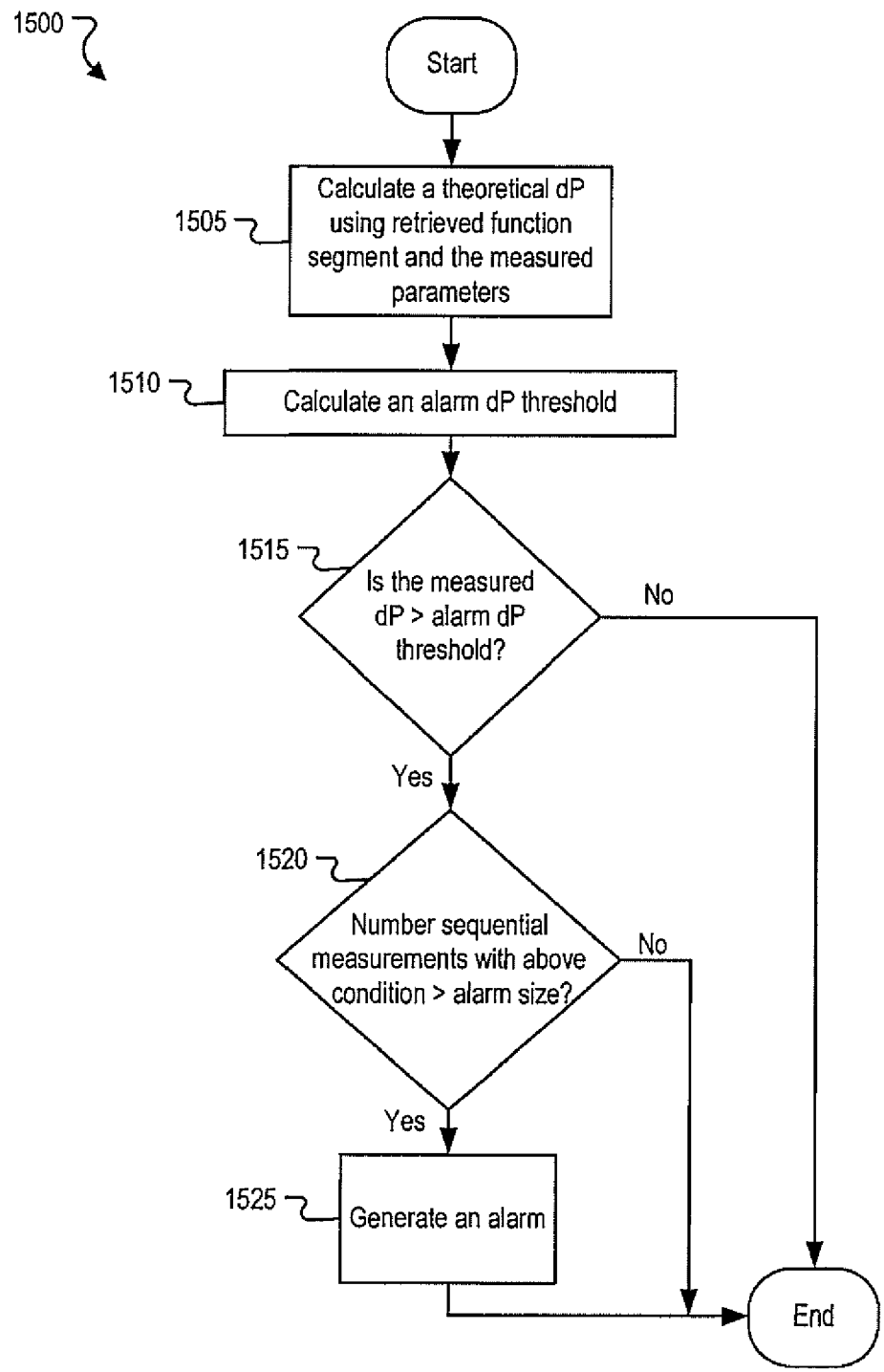
FIG. 15 is a flow chart illustrating an example alarm check process that generates an alarm.

After retrieving the segment, process 900 executes a warning check procedure, as illustrated in FIG. 14, at step 910. Next, process 900 determines whether a warning has been generated during the execution of step 910. If a warning has been generated, then process 900 ends. Generation of a warning may involve sending an electronic message through the digital signal conductor 404 to actuate a fluid control element external to the meter, such as bypass valve 402. If a warning has not been generated, then process 900 executes alarm check procedure, as illustrated in FIG. 15, at step 920. After executing the alarm check procedure, process 900 ends.

FIG. 10 is a flow chart illustrating an example dP characteristic learning process 1000. Process 1000 can be executed from step 760 of process 700. Process 1000 can embody both the rapid learning mode and the extended learning mode for execution by the flow measurement system. Process 1000 can be stored in the NVM 154 and executed on the processor 152. Examples of a dP characteristic learning process 1000 are described with reference to FIG. 8A in U.S. Pat. No. 7,295,934 issued to Hairston on Nov. 13, 2007 and with reference to FIG. 8A in U.S. patent application Ser. No. 11/870,758, filed by Hairston on Oct. 11, 2007.

Process 1000 begins at step 1005 by determining whether there is a predetermined dP characteristic for the flow meter 102. If there is not a predetermined dP characteristic for the flow meter 102, such as predetermined dP characteristic 605, then process 1000 determines, at step 1010, whether a rapid learning mode has been successfully completed. A rapid learning mode can be used to quickly generate a dP characteristic (e.g., over a period of 30 days) for flow meter 102 when a predetermined dP characteristic does not exist.

If the rapid learning mode has not been successfully completed, then process 1000 determines, at step 1015, whether enough measurements have been taken so that a learned dP characteristic be used for warning checking during the rapid learning mode. At step 1015, process 1000 enters rapid learning mode. An example implementation of a rapid learning mode process is depicted in steps 1015-1035. Step 1015 permits a warning check (steps 1020-1030) on the flow meter 102 if a sufficient number of measurements have been taken so as to create a learned dP characteristic, such as learned dP characteristic 610. The number of measurements required at step 1015 can be a predetermined factory setting and/or a setting received via, for example, the COM port 164 from a source external to the flow measurement system.

In some implementations, step 1015 will treat segments of the learned dP characteristic independently. In such an implementation, step 1015 may permit a warning check when there have been sufficient measurements for the segment of the learned dP characteristic associated with the measured parameters.

If there have not been enough measurements taken for the flow meter 102, then process 1000 will execute a rapid learning procedure, illustrated as FIG. 10, at step 1035. By proceeding from step 1015 to step 1035, process 1000 permits the rapid learning mode to gather measurements for the learned dP characteristic without conducting a warning check.

If enough measurements have been taken for the flow meter 102 at step 1015, then process 1000 retrieves the segment of the learned dP characteristic that is associated with the measured parameters at step 1020. The learned dP characteristic is the dP characteristic that is generated by the rapid learning mode. Next, process 1000 executes the warning check procedure, as illustrated by FIG. 14, at step 1025. Process 1000 then determines whether a warning has been generated at step 1030. If a warning has been generated, then process 1000 ends. Generation of a warning may involve sending an electronic message through the digital signal conductor 404 to a fluid control element external to the meter, such as bypass valve 402. If a warning has not been generated, then process 1000 executes a rapid learning procedure, illustrated as FIG. 12, at step 1035. After executing the rapid learning procedure at step 1035, process 1000 ends.

Process 1000 may enter an extended learning period (steps 1040-1060) if there exists a predetermined dP characteristic for the flow meter 102 (step 1005) and/or the rapid learning mode has completed successfully (step 1010). The extended learning mode can produce a learned dP characteristic, such as learned dP characteristic 610, from parameters measured over an extended period of time (e.g., 12 months).

At step 1005, if a predetermined dP characteristic, such as predetermined dP characteristic 605, exists for the flow meter 102, then process 1000 retrieves a segment of the predetermined dP characteristic that is associated with the measured parameters at step 1040.

At step 1010, if the rapid learning mode has been successfully completed, then process 1000 retrieves a segment of the learned dP characteristic that is associated with the measured parameters at step 1040. The learned dP characteristic used at step 1040 is the learned dP characteristic generated by the rapid learning mode.

After retrieving the segment, process 1000 executes the warning check procedure, illustrated in FIG. 14, at step 1045. Next, process 1000 determines whether a warning has been generated at step 1050. If a warning has been generated, then process 1000 ends. Generation of a warning may involve sending an electronic message through the digital signal conductor 404 to a fluid control element external to the meter, such as bypass valve 402. If a warning has not been generated, then process 1000 executes an extended learning procedure, illustrated by FIG. 13, at step 1060. After executing the extended learning procedure at step 1060, process 1000 ends.

In some implementations, the rapid learning mode may be conducted even if a predetermined dP characteristic exists. In such an implementations, the predetermined dP characteristic may be used to check for warnings and/or alarms. At step 1040, the predetermined and the learned dP characteristic may be combined and/or used in tandem to perform the extended learning mode.

Figure 11:
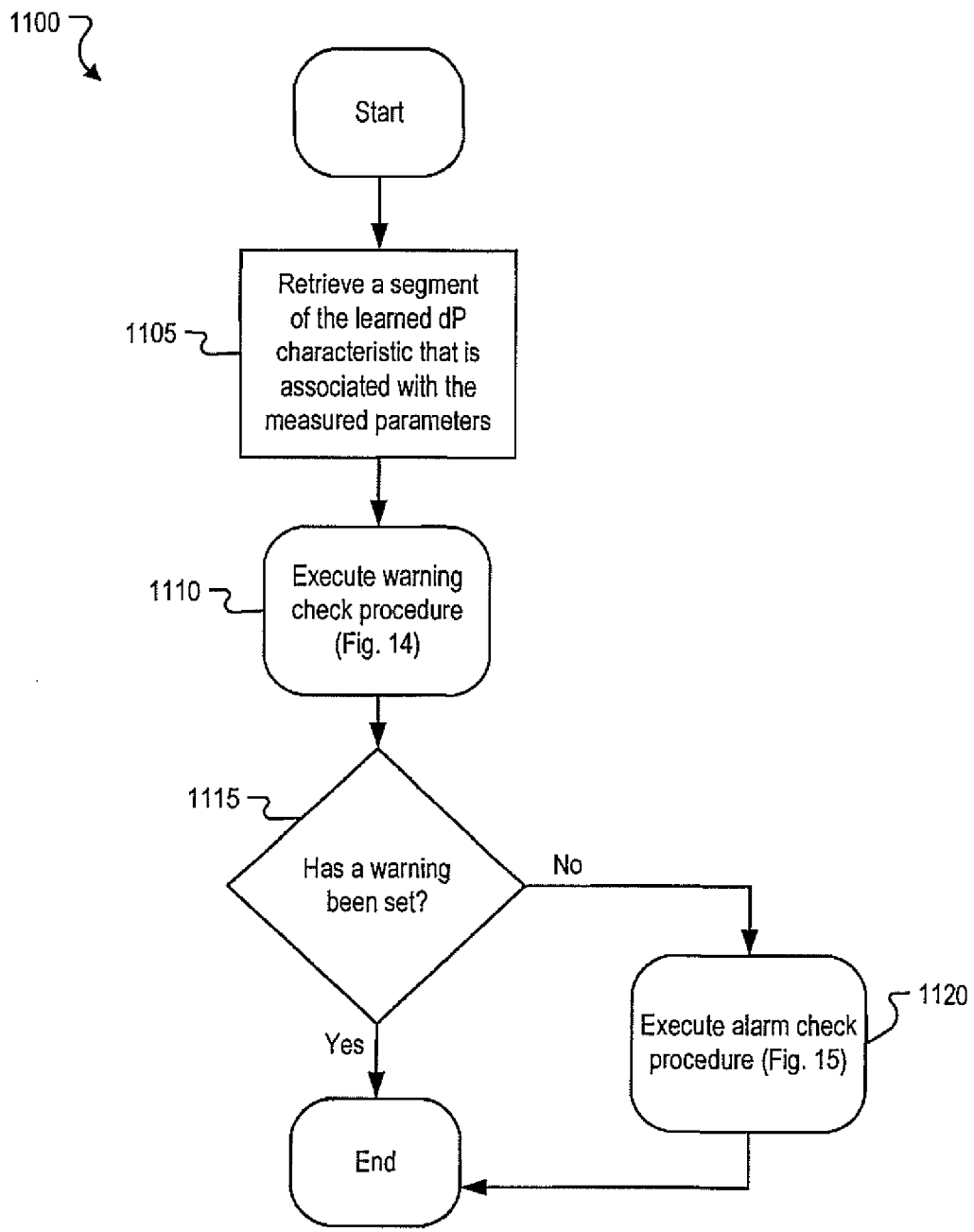
FIG. 11 is a flow chart illustrating an example diagnostic process that determines whether a warning or an alarm condition exists for a flow meter.

FIG. 11 is a flow chart illustrating an example diagnostic process 1100 that determines whether a warning or an alarm condition exists for flow meter 102. Process 1100 is executed from step 765 of process 700. Process 1100 can be executed using a learned dP characteristic, such as learned dP characteristic 610, after a rapid or extended learning mode has completed successfully. Other examples of diagnostic processes are described with reference to FIG. 4 in U.S. Pat. No. 7,295,934 issued to Hairston on Nov. 13, 2007 and with reference to FIG. 4 in U.S. patent application Ser. No. 11/870, 758, filed by Hairston on Oct. 11, 2007.

Process 1100 begins at step 1105 by retrieving a segment of the learned dP characteristic that is associated with the measured parameters. Next, process 1100 executes a warning check procedure, illustrated by FIG. 14, at step 1110. Then, process 1100 determines whether a warning has been generated at step 1115. If a warning has been generated, then process 1100 ends. Generation of a warning may involve sending an electronic message through the digital signal conductor 404 to a fluid control element external to the meter, such as bypass valve 402. If a warning has not been generated, then process 1100 executes an alarm check procedure, as illustrated by FIG. 15, at step 1120. After step 1120, process 1100 ends.

Figure 12:
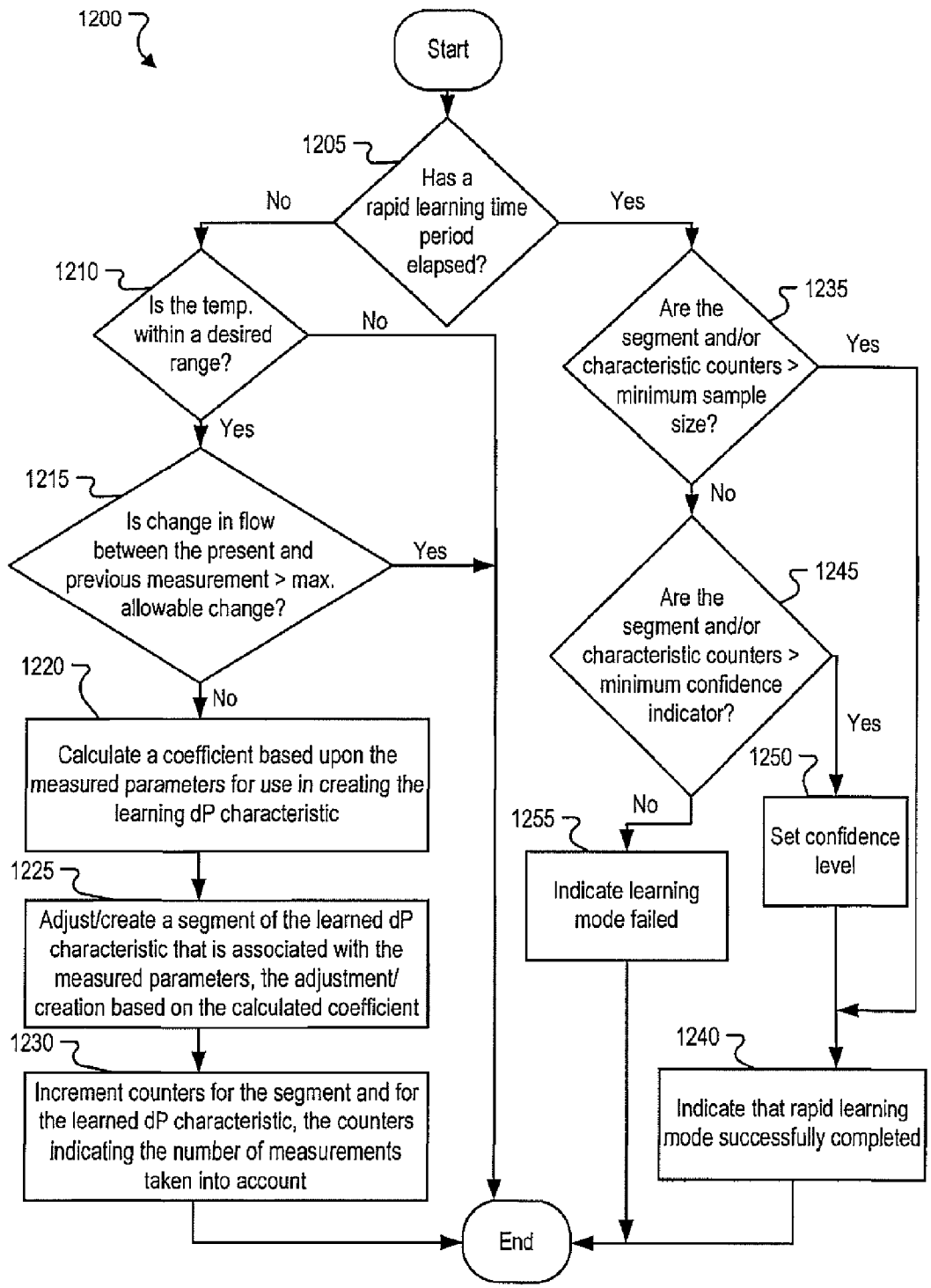
FIG. 12 is a flow chart depicting an example rapid learning process that, over a short period of time, generates a learned dP characteristic for a flow meter.

FIG. 12 is a flow chart depicting an example rapid learning process 1200 that, over a short period of time (e.g., 30 days), generates a learned dP characteristic, such as learned dP characteristic 610, for a flow meter 102 for which there may not have previously existed a dP characteristic. Process 1200 can be executed from step 1035 of process 1000. Process 1200 begins at step 1205 by determining whether a rapid learning time period has elapsed. The rapid learning time period may be a short period of time, such as one day, one week, or one month.

If the rapid learning time period has not elapsed, process 1200 determines, at step 1210, whether the measured temperature is within a desired temperature range. Step 1210 may be used to filter measurements to be used in creating the learned dP characteristic based upon a desirable temperature range. If the measured temperature is outside the desired range, process 1200 ends and the measured parameters are not included in the learned dP characteristic.

If the measured temperature is within the desired range, process 1200 determines, at step 1215, whether a change in the flow between the present measurement and the previous measurement is greater than a maximum allowable change in the flow rate. A large change in flow, upward or downward, may be an indication of an anomalous condition in the flow meter 102. Measurements during an anomalous condition may not be desirable to include in the calculation of the learned dP characteristic. If the change in flow is greater than the maximum allowable change, then process 1200 ends and the measurement is not included in the learned dP characteristic.

Other filtering techniques may be applied to flow meter measurements. For example, only measurements that fall within a desired pressure range and/or specific gravity range could be used to create the learned dP characteristic.

If the change in flow is not greater than the maximum allowable change, then process 1200 calculates, at step 1220, a coefficient based upon the measured parameters for use in creating the learning dP characteristic. For example, a coefficient for a dP characteristic could be calculated with the following parameter measurements: coefficient=(dP×temp.)/(pressure×flow$^2$×specific gravity).

After determining the coefficient at step 1220, process 1200 adjusts or creates, at step 1225, a segment of the learned dP characteristic that is associated with the measured parameters, wherein the adjustment/creation based on the calculated coefficient. Adjustment is performed at step 1225 if the segment already exists. Creation is performed if the segment does not already exist. In some implementations, adjusting can include averaging the calculated coefficient with the other coefficients for the segment.

After adjusting/creating the segment, process 1200 increments counters for the segment and for the learning dP characteristic, the counters indicating the number of measurements taken into account at step 1230. After incrementing the counters, process 1200 ends.

If the rapid learning time period has elapsed, process 1200 determines, at step 1235, whether the segment and/or learned dP characteristic counters are greater than a minimum sample size. The minimum sample size can be a minimum number of measurements used to create the learned dP characteristic. In some implementations, step 1235 is performed only for the learned dP characteristic. If the learned dP characteristic counter is greater than the minimum sample size, then process 1200 indicates, at step 1240, that the rapid learning mode has been successfully completed.

In other implementations, step 1235 is performed for each segment by comparing each segment's counter to the minimum sample size. Each segment with a counter greater than the minimum sample size can be indicated as having been successfully completed at step 1240. In other implementations, step 1235 is performed for the learned dP characteristic and the segments of the learned dP characteristic. After indicating success at step 1240, process 1200 ends.

If segment and/or learned dP characteristic counters are greater than a minimum sample size, process 1200 proceeds to step 1245 to determine whether the segment and/or learned dP characteristic counters are greater than a minimum confidence indicator. A minimum confidence indicator can be a minimum number of measurements taken during the period for which there would be confidence in the resulting learned dP characteristic and/or learned dP characteristic segment.

If the segment and/or learned dP characteristic counters are greater than a minimum confidence indicator, then process 1200 sets a confidence level for the segment and/or learned dP characteristic at step 1250. In one embodiment, the confidence level can be based upon a percentage of the counter over the minimum sample size. In another embodiment, the confidence level can be based upon predetermined confidence levels that correspond to the size of the segment/learned dP characteristic counter.

In some embodiments, the confidence level can be used to determine the learned dP threshold, such as learned dP threshold 620. For example, if the confidence level set at step 1250 for a learned dP threshold is low, the resulting learned dP threshold might be greater (e.g., greater difference between the threshold and the characteristic) than it would be if the confidence level were high—there would be less certainty regarding whether a warning or alarm is being correctly triggered so it might be preferable to provide a larger margin of error.

In some embodiments, a comparison of confidence levels among segments can be used to extrapolate the coefficient and/or parameter associations for segments with a high confidence level to segments with a low confidence level. This can be used to fill-in gaps among the segments. In another embodiment, a confidence level can be used to indicate whether supplemental learning, after the rapid learning and/or an extended learning periods have expired, should be conducted for a segment and/or the learned dP characteristic.

After setting the confidence level at step 1250, process 1200 indicates that the rapid learning mode was successfully completed for the segment and/or dP learning characteristic. After indicating success, process 1200 ends.

If the segment and/or learned dP characteristic counters are not greater than a minimum confidence indicator, then process 1200 indicates that the learning mode failed at step 1255. This indication may be provided for the learned dP characteristic and/or segments of the learned dP characteristic. If a segment arrives at step 1255, process 1200 may attempt avoid indicating the segment as having failed by extrapolating other segments from the learned dP characteristic to the failed segment. If extrapolation is successful, successful completion can be indicated at step 1240 instead of a learning failure at step 1255. After indicating the learning mode failed at step 1255, process 1200 ends.

Figure 13:
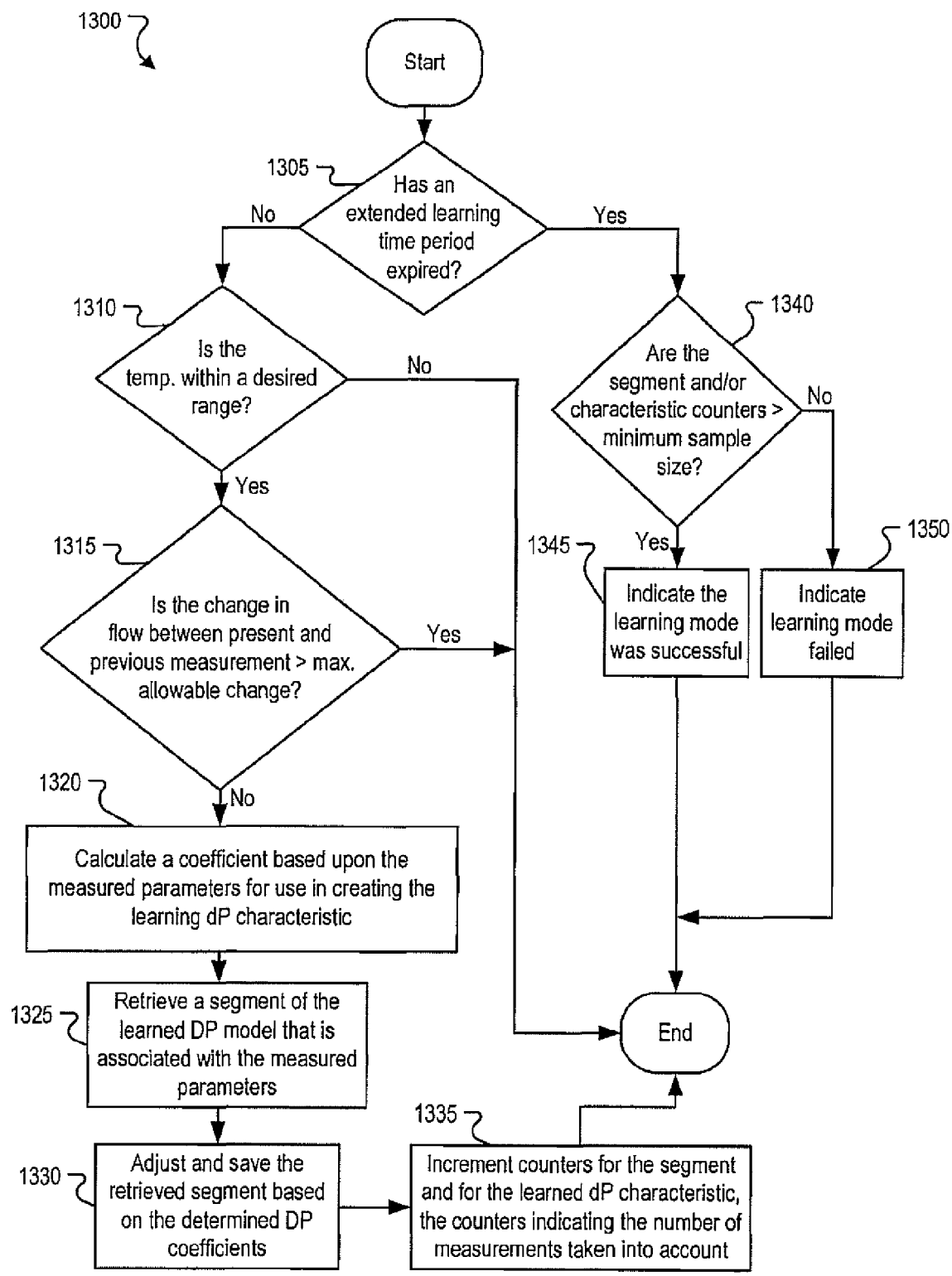
FIG. 13 is a flow chart depicting an example extended learning process that creates a learned dP characteristic.

FIG. 13 is a flow chart depicting an example extended learning process 1300 that creates a learned dP characteristic. Process 1300 may be executed from step 1060 of process 1000. Process 1300 begins at step 1305 by determining if an extended learning time period has expired. Step 1305 is similar to step 1205 regarding a rapid learning time period. However, the extended learning time period can exceed the rapid learning time period. In some implementations, the extended learning period may exceed the rapid learning period by a fixed amount of time (e.g., the extended learning period is twelve months longer than the rapid learning period). In some implementations, the extended learning time period may exceed the rapid learning time period by a factor (e.g., the extended learning period is two times as long as the rapid learning period, the extended learning period is one hundred times as long as the rapid learning period).

For example, if the factor is twelve and rapid learning time period is one month, the extended learning time period will be twelve months. The size of the factor can depend upon the meter and/or the quality of the measurements received during the rapid learning period. Examples of an extended learning process 1300 are described with reference to FIG. 8A in U.S. Pat. No. 7,295,934 issued to Hairston on Nov. 13, 2007 and with reference to FIG. 8A in U.S. patent application Ser. No. 11/870,758, filed by Hairston on Oct. 11, 2007.

If the extended learning time period has not expired, then process 1300 determines whether the measured temperature is within a desired range at step 1310. Like step 1210, step 1310 can serve to filter the parameter measurements that are included in the learned dP characteristic. If the measured temperature is not within the desired range, then process 1300 ends.

If the measured temperature is within the desired range, then process 1300 determines whether the change in flow between the present and previous measurement is greater than a maximum allowable change at step 1315. Similar to step 1215, step 1315 can act to filter out measurements that may be taken while the flow meter 102 is under anomalous conditions. If the change in flow is greater than a maximum allowable change, then process 1300 ends.

If the change in flow is not greater than a maximum allowable change, then process 1300 calculates a coefficient based upon the measured parameters for use in creating the learning dP characteristic at step 1320. Similar to step 1220, step 1320 can calculate a coefficient value for the learned dP characteristic, a coefficient value for a characteristic of the flow meter 102 based upon another parameter, and/or a relationship amongst the parameters.

After calculating the coefficient, process 1300 retrieves a segment of the learned DP model that is associated with the measured parameters at step 1325. Process 1300 then adjusts the segment using the calculated coefficient and saves the adjusted segment at step 1330. The adjustment in step 1330 can be similar to the adjustment described with reference to step 1225. Next, process 1300 increment counters for the segment and for the learning dP characteristic at step 1335. The counters indicate the number of measurements taken into account in creating the learned dP characteristic. After incrementing the counters at step 1335, process 1300 ends.

If the extended learning time period has expired at step 1305, then process 1300 determines at step 1340 whether the segment and/or characteristic counters are greater than a minimum sample size for the learned dP characteristic. Similar to step 1235, step 1340 can be determined for the learned dP characteristic alone, for each segment of the learned dP characteristic, and/or for the learned dP characteristic in conjunction with its segments.

If the segment and/or characteristic counters are greater than a minimum sample size, then process 1300 indicates that the learning mode was successful for the segment and/or learned dP characteristic at step 1345. In some implementations, step 1345 can also involve setting a confidence level for the segment and/or learned dP characteristic based upon the counters, similar to step 1250. After step 1345, process 1300 ends.

If the segment and/or characteristic counters are not greater than a minimum sample size, then process 1300 indicates that the learning mode failed for the segment and/or learned dP characteristic at step 1350. If the counter for a segment is determined at step 1340 to not greater than the minimum sample size, process 1300 may extrapolate to that segment other segments with corresponding counters that exceeded the minimum sample size, similar to step 1255. After step 1350, process 1300 ends.

FIG. 14 is a flow chart illustrating an example warning check process 1400 that determines whether a lock-up or a fault warning condition exists in flow meter 102. A warning condition indicates the flow meter 102 requires immediate maintenance. A lock-up warning condition can be a condition where the flow meter 102 has negligible flow rate in spite of the gas line 106 containing gas that, but for the lock-up condition, would otherwise be able to flow through the meter 102. A fault warning condition can be a condition where there is still flow, but there is a problem with the flow meter 102 that requires immediate maintenance (e.g., damaged impellers, damaged bearings). Process 1400 can be executed from steps 910, 1025, 1045, and 1110. Examples of a warning check process 1400 are described with reference to FIG. 4 in U.S. Pat. No. 7,295,934 issued to Hairston on Nov. 13, 2007 and with reference to FIG. 4 in U.S. patent application Ser. No. 11/870,758, filed by Hairston on Oct. 11, 2007.

Process 1400 begins at step 1405 by determining whether the measured flow is less than the minimum allowable flow for the flow meter 102. If the flow is less than the minimum allowable flow, then process 1400 enters the lock-up check procedure at step 1410. At step 1410, process 1400 substitutes the retrieved segment for another segment from the learned/predetermined dP characteristic using the minimum allowable flow the measured parameters. The retrieved segment corresponds to the segment retrieved in steps 905, 1020, 1040, and 1105 (each step being performed immediately prior to the execution of process 1400 at steps 910, 1025, 1045, and 1110, respectively). The dP characteristic from which the retrieved segment was produced should be used to provide the substituting segment. Using the minimum allowable flow rate, specified in step 1405, instead of the measured flow rate, step 1410 retrieves the substituting segment from the appropriate dP characteristic.

Next, process 1400 calculates a theoretical dP using the substituting segment and the measured parameters at step 1415. For example, if the substituting segment has a coefficient C, the equation for the segment is $dP = coefficient \times pressure \times flow^2 \times specific\ gravity \times temperature^{-1}$, and the values of the parameters to be used are P (measured pressure), Q (minimum allowable flow), SG (measured specific gravity), and T (measured temperature), then the theoretical $dP = C \times P \times Q^2 \times SG \times T^{-1}$. The calculated theoretical dP can correspond to a value represented, for example, along the learned dP characteristic 610.

Process 1400 then calculates the lock-up dP threshold. The lock-up dP threshold can correspond to a value represented, for example, along the learned dP characteristic threshold 620. The lock-up dP threshold can be determined by multiplying the theoretical dP by a lock-up factor. In some implementations, the lock-up factor is a predetermined factor. In other implementations, the lock-up factor is learned by the flow measurement system.

Next, process 1400 determines if the dP value measured in the differential pressure transducer 132 is greater than the lock-up dP threshold at step 1425. If the measured dP is not greater than the lock-up dP threshold, then process 1400 ends. If the measured dP is greater than the lock-up dP threshold, the process 1400 determines at step 1430 whether a number of sequential measurements where the measured dP is greater than the lock-up dP threshold exceeds a warning size. If the a number of sequential measurements where the measured dP is greater than the lock-up dP threshold does not exceed a warning size, then a warning is not generated and process 1400 ends. If the a number of sequential measurements where the measured dP is greater than the lock-up dP threshold does exceed a warning size, then a lock-up warning has been generated at step 1435.

After generating a lock-up warning, process 1400 determines at step 1440 whether the flow measurement system is configured to control an external device, such as bypass valve 402. If the flow measurement system is configured to control an external device, then process 1400 performs a control function on the external device at step 1445, such as opening bypass valve 402. After performing a control function, process 1400 ends. If the flow measurement system is not configured to control an external device, then process 1400 ends.

If the measured flow is not less than the minimum allowable flow at step 1405, then process 1400 calculates a theoretical dP using the retrieved segment (segment from the predetermined/learned dP characteristic retrieved at step 905, 1020, 1040, or 1105) and the measured parameters, similar to step 1415. Then, process 1400 calculates the fault dP threshold at step 1455. Similar to step 1420, the fault dP threshold can be calculated by multiplying the theoretical dP by a fault factor. In some implementations, the fault factor is predetermined. In other implementations, the fault factor is learned by the flow measurement system.

After calculating the fault dP threshold, process 1400 determines at step 1460 whether the dP measured in the differential pressure transducer 132 is greater than the fault dP threshold. If the measured dP is not greater than the fault dP threshold, then no fault warning is generated and process 1400 ends. If the measured dP is greater than the fault dP threshold, then process 1400 determines at step 1465 whether the number of sequential measurements where the measured dP is greater than the fault dP threshold exceeds a warning size, similar to step 1430. If the number of sequential measurements does not exceed the warning size, then a fault warning is not generated and process 1400 ends. If the number of sequential measurements does exceed the warning size, then process 1400 generates a fault warning at step 1470. After generating a fault warning at step 1470, process 1400 ends.

In some implementations, process 1400 may perform steps 1440 and 1445 after generating a fault warning at step 1470. Additionally, in some implementations the generation of a warning at steps 1435 and 1470 includes the display of a message regarding the warning in the display 162. In other implementations, the generation of a warning at steps 1435 and 1470 includes communicating the generated warning to a source external to the flow measurement system. In other implementations, the generation of a warning at steps 1435 and 1470 includes sending a digital signal through the digital signal conductor 404 to an external communication element, such as light. In other implementations, the generation of a warning at steps 1435 and 1470 includes sending a digital signal through the digital signal conductor 404 to a fluid control element external to the meter, such as bypass valve 402.

FIG. 15 is a flow chart illustrating an example alarm check process 1500 that generates an alarm. An alarm can correspond to a deterioration of the performance of the flow meter 102 that, although it may not require immediate maintenance, may require replacement and/or service (e.g., maintenance) of the flow meter 102 in the near future. Process 1500 may be executed from steps 920 and 1120. Process 1500 begins at step 1505 by calculating a theoretical dP using the retrieved function segment (retrieved in step 905 or 1105) and the measured parameters, similar to steps 1415 and 1450. Examples of an alarm check process 1500 are described with reference to FIG. 4 in U.S. Pat. No. 7,295,934 issued to Hairston on Nov. 13, 2007 and with reference to FIG. 4 in U.S. patent application Ser. No. 11/870,758, filed by Hairston on Oct. 11, 2007.

Similar to steps 1420 and 1455, process 1500 then calculates an alarm dP threshold at step 1510. The alarm dP threshold can be calculated by multiplying the theoretical dP value by an alarm factor. In some implementations, the alarm factor is predetermined. In other implementations, the alarm factor is learned by the flow measurement system.

After calculating the alarm dP threshold, process 1500 determines at step 1515 whether the dP measured in the differential pressure transducer 132 is greater than the alarm dP threshold. If the measured dP is not greater than the alarm dP threshold, then no alarm is generated and process 1500 ends. If the measured dP is greater than the alarm dP threshold, then process 1500 determines at step 1520 whether the number of sequential measurements where the measured dP is greater than the alarm dP threshold exceeds an alarm size, similar to steps 1430 and 1465. If the number of sequential measurements does not exceed the alarm size, then an alarm is not generated and process 1500 ends. If the number of sequential measurements does exceed the alarm size, then process 1500 generates an alarm at step 1525. After generating an alarm at step 1525, process 1500 ends.

Additionally, in some implementations the generation of an alarm at step 1525 includes the display of a message regarding the alarm in the display 162. In other implementations, the generation of an alarm at step 1525 includes communicating the generated alarm to a source external to the flow measurement system. In other implementations, the generation of an alarm at step 1525 includes sending a digital signal through the digital signal conductor 404 to an external communication element, such as light. In other implementations, the generation of an alarm at step 1525 includes sending a digital signal through the digital signal conductor 404 to a fluid control element external to the meter, such as bypass valve 402.

Figure 16:
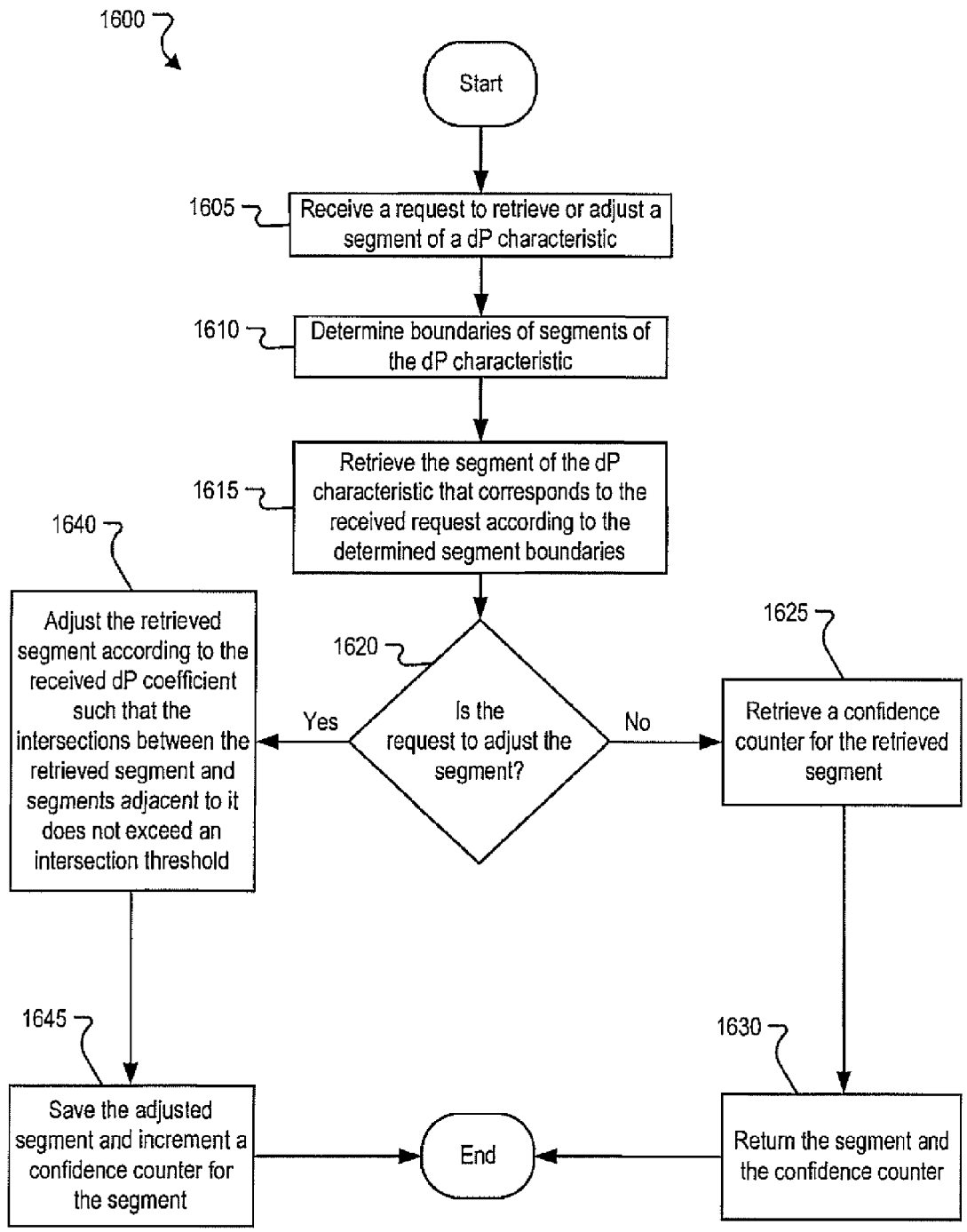
FIG. 16 is a flow chart illustrating an example process to retrieve and/or adjust a segment of a dP characteristic.

FIG. 16 is a flow chart illustrating an example process 1600 to retrieve and/or adjust a segment of a dP characteristic. Process 1600 can be executed throughout processes 700-1500 wherever a segment is retrieved or adjusted. For example, process 1600 may be executed from steps 1325 (retrieving a segment) and 1330 (adjusting a segment). Process 1600 can be performed by processor 152 and may be stored within NVM 154.

Process 1600 begins at step 1605 by receiving a request to retrieve or adjust or adjust a segment of a dP characteristic. The request received at step 1605 can include the measured parameters and/or a coefficient for segment of a dP characteristic. Next, process 1600 determines boundaries of segments of the dP characteristic at step 1610. Process 1600 then, at step 1615, retrieves the segment of the dP characteristic that corresponds to the received request according to the determined segment boundaries. After retrieving the segment, process 1600 determines at step 1620 whether the request is to adjust the segment of the dP characteristic. If the request is not to adjust the segment, process 1600 retrieves a counter for the retrieved segment at step 1625, returns the segment and counter at step 1630, and then ends.

If the request is to adjust the segment at step 1620, then at step 1640 process 1600 adjusts the retrieved segment according to the received dP coefficient such that the intersections between the retrieved segment and segments adjacent to it does not exceed an intersection threshold. Step 1640 can be used to adjust a segment of a dP characteristic such that there is a smooth transition between segments. If segments were adjusted without regard to the transition between adjacent segments, there exists the possibility that similar parameter measurements on either side of a segment transition will produce disparate results. For example, in a system where segments are adjusted without regard for their transition with adjacent segments, a parameter measurement on one side of a transition may register as being within the warning and alarm dP thresholds in processes 1400 and 1500. However, a parameter measurement on the other side of the transition, even though it is nearly identical to the first measurement, may exceed the warning dP threshold in process 1400.

After adjusting the retrieved segment, process 1600 saves the adjusted segment and increments a confidence counter for the segment at step 1645. After step 1645, process 1600 ends. The confidence counter can correspond to the number of measurements that have been used to generate a segment of a dP characteristic. The confidence counter can be a qualitative indicator of the reliability of a segment with regard to accurately depicting a dP characteristic for the flow meter 102.

In some implementations, confidence counters are taken into account when calculating a theoretical dP at steps 1415, 1450, and 1505. For example, a confidence counter for a segment could be represented as a percentage (e.g., 80%). A theoretical dP could then be determined by adding together weighted calculations from a learned dP characteristic (e.g., 0.8×theoretical dP) and a predetermined dP characteristic (e.g., 0.2×theoretical dP). Confidence counters could also be taken into account in a similar fashion when calculating a lock-up dP threshold (step 1420), a fault dP threshold (step 1455), and/or an alarm dP threshold (step 1510).

Although various embodiments have been described with reference to the figures, other embodiments are possible. For example, a coefficient value associated with a segment of a dP characteristic may include an average of coefficients calculated for measured parameter values that fall within a defined range of such parameters for that segments. There could be, for example, 2, 5, 7, 9, 11, 15, 20, 25, 40, 60, 100, 200, 300, 500, 600, 1000, or more segments defined for a multi-dimensional parameter space. Associated with each segment is a predetermined physical relationship among the measured parameters. In general, the predetermined physical relationship in each segment defines dP a function of the calculated coefficient multiplied by a predetermined function of measured parameters, such as gas temperature, line pressure, gas flow rate through the meter, and specific gravity of the gas.

In some embodiments, the line pressure transducer may be included in a pressure sensor module that includes the dP sensor. For example, two pressure sensors may be used to supply inlet and outlet pressure signals to the processor module that computes a differential pressure. One or an average of the two pressure signals may be used to measure line pressure. In some other embodiments, a separate dP sensor is used in combination with a separate line pressure sensor.

Various implementations may be understood in view of the following illustrative example. In this example, a flow meter being installed in a field application may not be programmed with a predetermined dP characteristic. In such cases, the flow measurement system may be configured to enter rapid learning mode in order to generate a dP characteristic for flow meter 102 in order to check for warnings and alarms. In this example, parameters are measured every 30 seconds while the flow measurement system is in rapid learning mode. The measured parameters may include temperature, flow rate, pressure, differential pressure, and specific gravity, which can be measured by gas composition sensor 502. In this example, measurements are filtered out if the measured temperature is not within a desirable range and/or the measured flow has changed too dramatically for inclusion in a learned dP characteristic. In this example, parameter measurements that are not filtered out are then used to generate the learned dP characteristic.

Further in this example, measurements are used to generate the learned dP characteristic by determining a coefficient from the measured parameters. The coefficient can be calculated using the following equation: coefficient=(dP×temp.)/(pressure×flow$^2$×specific gravity). Once a coefficient is calculated in this example, the coefficient is averaged into the coefficient value for a segment of the learned dP characteristic that corresponds to the measured parameters. The learned dP characteristic may be comprised of multiple segments, where each segment is bounded by a range of parameter values. In this example, the learned dP characteristic is comprised of 16 segments which are defined by each parameter being divided into two, non-overlapping ranges. In this example, one of the 16 segments corresponds to the measured parameter values (e.g., all of the measured parameters fall within the bounds of the one segment). Further in this example, the calculated coefficient is averaged into the coefficient value for the one corresponding segment and a counter corresponding to the segment is incremented.

Further in this example, after each measurement the system checks whether a counter for any of the segments exceeds a sample size. Once a sample size has been established in a segment, the system may use the segment to check for warnings when the parameters fall within the segment while still continuing the rapid learning mode. Under this example, after 10 days of the 30 days allotted for the rapid learning mode, 10 of the 16 segments have exceeded the sample size number of measurements. This means that for these 10 segments, the rapid learning mode conducts warning checks for measurements that fall within these 10 segments. However, for measurements in this example that fall within the other 6 segments, no warning checking is conducted.

Further in this example, after the 30 days has expired the system determines that the rapid learning mode succeeded—the number of measurements used to create the segments of the learned dP characteristic exceeded a threshold. The system may then extrapolate the coefficient value stored in segments with a high counter value to segments with a low counter value. After this is completed, the flow measurement system may enter an extended learning mode, during which measurements may be taken and averaged into the learned dP characteristic the same way as during the rapid learning mode. Furthermore, during the extended learning mode the learned dP characteristic may be used to check for warnings over all of its segments. In this example, the warning check weights the coefficients from the segments according to the value of their corresponding counter. A segment with a high counter value may be allocated less of an error margin for measurements than a segment with a low counter value.

Further in this example, once the extended learning period is completed after, for example, 12 months and it is determined that a sufficient number of measurements were used to create the learned dP characteristic, the flow measurement system enters diagnostic mode. During diagnostic mode in this example, the flow meter is checked for warnings and alarms every 30 seconds using the learned dP characteristic. In this example, the flow meter checks for warnings and alarms by measuring parameters (including dP), determining which of the 16 learned dP characteristic segments corresponds to the measured parameters (excluding measured dP), calculating and/or retrieving warning and alarm thresholds for the segment, and comparing the measured dP with the thresholds for the segment. In this example, an alarm and/or warning is detected when the measured dP value exceeds at least one of the warning or alarm thresholds.

When a warning is detected in this example, the system sends a digital signal through the digital signal conductor to a bypass valve, instructing that the valve to be opened. Further in this example, when a warning is detected, an electronic message is transmitted to a computer-based monitoring system, indicating the warning to a technician. The technician may be able to view the history of parameter measurements, theoretical dP calculations, and the learned dP characteristic that was used. From this information, the technician may be able to determine whether the warning was an error, whether the dP transducer has to be replaced, whether the processing system should be replaced, and/or whether the flow meter should be replaced.

Further in this example, if the technician determines the warning was in error, the technician may adjust the dP characteristic that is used by the meter. Such adjustment may involve adjusting the mathematical model that defines the relationship among the parameters (e.g., changing use of flow rate in the equation used to calculate a theoretical dP from flow^2 to flow^2.5) and/or adjusting the learned coefficient. The technician may also adjust some or all of the fixed coefficients used by the processing system, such as the warning and alarm thresholds.

In various embodiments, adaptations may include other features and capabilities. For example, some systems may be implemented as a computer system. For example, various implementations may be implemented in digital electronic circuitry, or in computer hardware, firmware, software, or in combinations of them. Apparatus can be implemented in a computer program product tangibly embodied in an information carrier, e.g., in a machine-readable storage device or data store, for execution by a programmable processor; and methods can be performed by a programmable processor executing a program of instructions to perform functions by operating on input data and generating output. The software can incorporate multi-threading or parallel operations to improve the throughput of the system. One or more computer programs executable on a programmable system may include at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, various embodiments may be implemented on a computer having a display device such as a CRT (cathode ray tube) or LCD (liquid crystal display) monitor for displaying information to the user monitoring the status of the flow meter. A keyboard and a pointing device such as a mouse or a trackball by which the user can provide input to the computer. For example, a service technician may receive status information from each of a number of meters installed in a facility, the received information including meter self-diagnostic information that is displayed on a handheld display device carried by the technician. The technician may operate the handheld device to verify that all the meters are in good working order based on measured dP information from each meter relative to a learned baseline dP characteristic.

The computer system may be implemented as a distributed computing system, and can include clients and servers. A client and server are generally remote from each other and typically interact through a network. The relationship of client and server arises by virtue of computer programs running on the respective computers and having a client-server relationship to each other. For example, a flow meter may act as a client by transmitting messages regarding the status of the flow meter to a server that uses the received messages to provide a status view of multiple flow meters.

Some embodiments can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of analog or digital data communication, including packet-based messages, on a communication network. Examples of communication networks include, e.g., a LAN, a WAN, wireless and/or optical networks, and the computers and networks forming the Internet.

In various embodiments, systems such as those described herein for learning a dP characteristic, among other items, may communicate information using suitable communication methods, equipment, and techniques. For example, the COM port 154 (FIGS. 1, 4, and 5) may communicate with an external monitoring server using point-to-point communication in which a message is transported directly from the source to the receiver over a dedicated physical link (e.g., fiber optic link, point-to-point wiring, daisy-chain). Other embodiments may transport messages by broadcasting to all or substantially all devices that are coupled together by a communication network, for example, by using omni-directional radio frequency (RF) signals, while still other embodiments may transport messages characterized by high directivity, such as RF signals transmitted using directional (e.g., narrow beam) antennas or infrared signals that may be used with focusing optics. Still other embodiments are possible using appropriate interfaces and protocols such as, by way of example and not intended to be limiting, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are contemplated.

What is claimed is:

1. A system for continuously monitoring performance of a rotary-type gas flow meter, the system comprising:
    a pressure sensor module for measuring a differential pressure (dP) of a gas flowing through the gas flow meter, the pressure sensing module having an output signal;
    a processor module; and
    a data store communicatively connected with the processor module, the data store storing instructions executable by the processor,
    wherein the instructions executable by the processor include instructions to calculate a coefficient during a learning phase period, the coefficient based on:
        a plurality of measured dP of the gas flowing through the gas flow meter during the learning phase period,
        a plurality of measured line pressures of the gas flowing through the gas flow meter during the learning phase period,
        a plurality of measured flow rates of the gas flowing through the gas flow meter during the learning phase period,
        a plurality of measured temperatures of the gas flowing through the gas flow meter during the learning phase period, and
        a specific gravity of a gas flowing through a gas flow meter during the learning phase period, and
    wherein the instructions executable by the processor include instructions to calculate a first dP at a first instance of time, the first dP at the first instance of time based on at least the coefficient.

2. The system of claim 1, wherein the data store further comprises instructions to generate an electronic notification signal upon determining that a first parameter has exceeded a threshold, the first parameter calculated base on a measured dP at the first instance of time and the first dP at the first instance of time.

3. The system of claim 2, wherein the pressure sensor module comprises a first input port and a second input port, and the meter further comprises an inlet, an outlet, and a first pneumatic line providing fluid communication between the first input port of the pressure sensor module and the inlet of the meter, and a second pneumatic line providing fluid communication between the inlet of the meter and a second pneumatic line providing fluid communication between the second input port of the pressure sensor module and the outlet of the meter.

4. The system of claim 3, wherein the first and second conduits are sized to substantially attenuate high frequency pressure transients in the inlet or the outlet of the meter.

5. The system of claim 1, further comprising a gas composition sensor.

6. The system of claim 1, wherein the processor is configured to receive and process a gas volume signal, a dP signal, and the at least one measured parameters to diagnose a status of the meter.

7. The system of claim 1, wherein the pressure sensor module includes the line pressure sensor.

8. The system of claim 1, wherein the learning phase period is a year.

9. The system of claim 1, wherein the learning phase period is at defined by a number of events that are detected.

10. The system of claim 1, wherein the learning phase period is about one week.

11. The system of claim 1, wherein the learning phase period is about one month.

12. The system of claim 2, further comprising a device interface to actuate an external device in response to the generated electronic notification signal.

13. The system of claim 1, wherein the external device comprises a valve configured to selectively permit gas to flow through an alternate path external to the meter.

14. A method comprising:
    receiving values, the values comprising:
        a plurality of measured differential pressures (dP) of a gas flowing through a gas flow meter during a learning phase period,
        a plurality of measured line pressures of the gas flowing through the gas flow meter during the learning phase period,
        a plurality of measured flow rates of the gas flowing through the gas flow meter during the learning phase period,
        a plurality of measured temperatures of the gas flowing through the gas flow meter during the learning phase period, and
        a specific gravity of a gas flowing through a gas flow meter during the learning phase period;
    calculating, on a computing device, a coefficient based on at least:
        the plurality of measured dP of the gas flowing through the gas flow meter during the learning phase period,
        the plurality of measured line pressures of the gas flowing through the gas flow meter during the learning phase period,
        the plurality of measured flow rates of the gas flowing through the gas flow meter during the learning phase period,
        the plurality of measured temperatures of the gas flowing through the gas flow meter during the learning phase period, and
        the specific gravity of a gas flowing through a gas flow meter during the learning phase period; and
    generating a first dP at a first instance of time based on at least the coefficient.

15. The method of claim 14, further comprising:
generating an electronic notification signal upon determining that a first parameter has exceeded a threshold, the first parameter calculated based on a measured dP at the first instance of time and the first dP at the first instance of time.

16. The method of claim 15, further comprising:
actuating an external device in response to the generated electronic notification signal, the external device comprising a valve configured to selectively permit gas to flow through an alternate path external to the meter.

17. The method of claim 14, wherein the coefficient is calculated using the equation:

$$\frac{(\sum_{1}^{n}(dPT_{abs}))}{(P_{abs}Q^2 SGU)/n},$$

wherein Q is measured gas flow rate, $P_{abs}$ is a measured line gas pressure, $T_{abs}$ is measured gas temperature, SGU is gas composition described by specific gravity, and dP is a measured differential pressure.

* * * * *

UNITED STATES PATENT AND TRADEMARK OFFICE
CERTIFICATE OF CORRECTION

| | |
|---|---|
| PATENT NO. | : 8,639,464 B2 |
| APPLICATION NO. | : 12/347860 |
| DATED | : January 28, 2014 |
| INVENTOR(S) | : Artiuch et al. |

It is certified that error appears in the above-identified patent and that said Letters Patent is hereby corrected as shown below:

In the Drawings:

In Fig. 8, Sheet 21 of 29, delete " 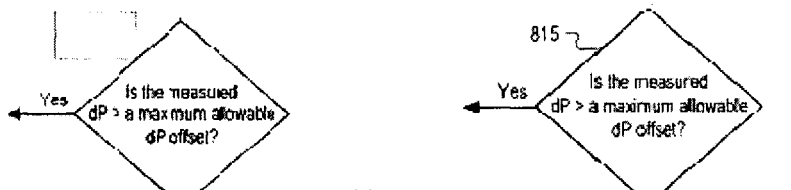 " and insert -- -- , therefor.

In Fig. 9, Sheet 22 of 29, delete " 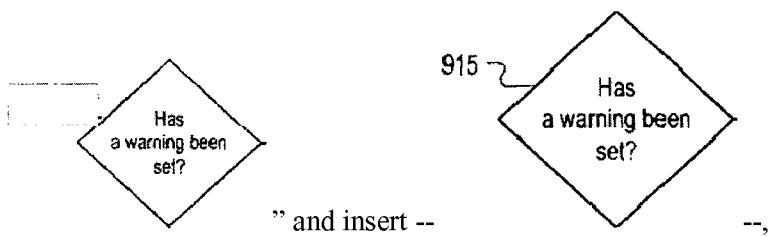 " and insert -- -- , therefor.

In the Specification:

In Column 7, Line 15, delete "meter 104" and insert -- meter 102 --, therefor.

In Column 20, Line 43, delete "and or" and insert -- and/or --, therefor.

In Column 20, Line 48, delete "and or" and insert -- and/or --, therefor.

In Column 22, Line 64, delete "to calculated dP" and insert -- to calculate dP --, therefor.

In the Claims:

Signed and Sealed this
Eighth Day of September, 2015

Michelle K. Lee
*Director of the United States Patent and Trademark Office*

CERTIFICATE OF CORRECTION (continued)
U.S. Pat. No. 8,639,464 B2

In Column 42, Line 23, in Claim 9, delete "is at defined" and insert -- is defined --, therefor.

In Column 42, Line 32, in Claim 13, delete "of claim 1," and insert -- of claim 12, --, therefor.

In Column 43, Lines 16-18, in Claim 17, delete " $\dfrac{(\sum_{1}^{} n(dPT_{abs}))}{(P_{abs} Q^2 SGU)/n}$, " and insert -- $(\Sigma_1^n (dP\ T_{abs})/(P_{abs} Q^2\ SGU))/n$, --, therefor.